(12) United States Patent
Black et al.

(10) Patent No.: US 10,524,124 B2
(45) Date of Patent: Dec. 31, 2019

(54) ROUTING SYSTEMS AND METHODS

(71) Applicant: VM-Robot, Inc., Los Gatos, CA (US)

(72) Inventors: Alistair Black, Los Gatos, CA (US); Ashitosh Swarup, Burbank, CA (US)

(73) Assignee: VM-ROBOT, INC., Los Gatos, CA (US)

( * ) Notice: Subject to any disclaimer, the term of this patent is extended or adjusted under 35 U.S.C. 154(b) by 141 days.

(21) Appl. No.: 15/603,232

(22) Filed: May 23, 2017

(65) Prior Publication Data

US 2017/0272455 A1 Sep. 21, 2017

Related U.S. Application Data

(63) Continuation-in-part of application No. 14/827,144, filed on Aug. 14, 2015, now Pat. No. 10,375,088.

(60) Provisional application No. 62/170,909, filed on Jun. 4, 2015, provisional application No. 62/350,500, filed on Jun. 15, 2016.

(51) Int. Cl.
*G06F 11/00* (2006.01)
*H04W 12/06* (2009.01)
*H04L 29/06* (2006.01)
*H04L 12/701* (2013.01)

(52) U.S. Cl.
CPC ............ *H04W 12/06* (2013.01); *H04L 63/02* (2013.01); *H04L 63/0281* (2013.01); *H04L 63/18* (2013.01); *H04L 45/00* (2013.01)

(58) Field of Classification Search
CPC ... H04L 63/02; H04L 63/0428; H04L 63/067; H04L 63/1466; H04L 63/18; H04L 63/0861; H04L 63/0281; H04L 2209/84
USPC .......................................................... 726/23
See application file for complete search history.

(56) References Cited

U.S. PATENT DOCUMENTS

| 6,321,337 | B1 * | 11/2001 | Reshef | .................... | G06F 21/53 |
| | | | | | 726/14 |
| 8,006,117 | B1 * | 8/2011 | Lutter | .................... | G01S 19/37 |
| | | | | | 714/1 |
| 10,009,325 | B1 * | 6/2018 | David | .................... | H04L 12/40 |
| 2014/0123221 | A1 * | 5/2014 | Farina | ................ | H04L 63/0272 |
| | | | | | 726/3 |
| 2015/0150124 | A1 * | 5/2015 | Zhang | ................ | H04L 63/1408 |
| | | | | | 726/22 |
| 2016/0072781 | A1 * | 3/2016 | Zhang | .................. | H04L 63/065 |
| | | | | | 726/4 |

* cited by examiner

*Primary Examiner* — Samson B Lemma
(74) *Attorney, Agent, or Firm* — David R. Stevens; Stevens Law Group

(57) ABSTRACT

Example routing systems and methods are described. In one implementation, a first set of routing systems is interfaced with a network connection via a network interface. A second set of routing systems interfaced with a secure system is configured to receive information from the first set of routing systems via a first unidirectional data channel. In some embodiments, the first set of routing systems is configured to receive information from the second set of routing systems via a second unidirectional data channel. The secure system is not visible from the network interface.

17 Claims, 62 Drawing Sheets

FIG. 33

ROUTING SYSTEMS AND METHODS

RELATED APPLICATION

This application claims the priority benefit of U.S. Provisional Application Ser. No. 62/350,500, entitled "Robot Router—Implementation Details for Secure Records Access", filed Jun. 15, 2016. This application is also a continuation-in-part, and claims priority to U.S. application Ser. No. 14/827,144, entitled "Routing Systems and Methods", filed on Aug. 14, 2015. U.S. application Ser. No. 14/827,144 claims the priority benefit of U.S. Provisional Application Ser. No. 62/170,909, entitled "Robot Router," filed on Jun. 4, 2015. The disclosures are hereby incorporated by reference herein in their entirety.

TECHNICAL FIELD

The present disclosure relates to systems and methods that implement, for example, a data routing system that serves to secure and protect a secure network or database from network attacks via a public network.

BACKGROUND

Network security and the protection of sensitive information stored on networked databases is an ongoing area of study and development. Typically, network security is provided by methods that include firewalls and proxy servers. These methods are limited in the fact that they rely on the use of standard networking protocols and software stacks for communicating with a public network. The standardized nature of these communication protocols implies that the systems that use these protocols are vulnerable to attacks via the public network using methods such as SQL injection. In order to work around this vulnerability, the next evolutionary step in the area of network security is to introduce an additional layer of security over the existing network communication protocols.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6 also depicts the internal structure of one embodiment of the routing system.

FIG. 33 is a block diagram that depicts the structure of a patient medical file in the patient medical records system, wherein the patient medical file is comprised of multiple patient medical records for each patient.

DETAILED DESCRIPTION

Figure 1:
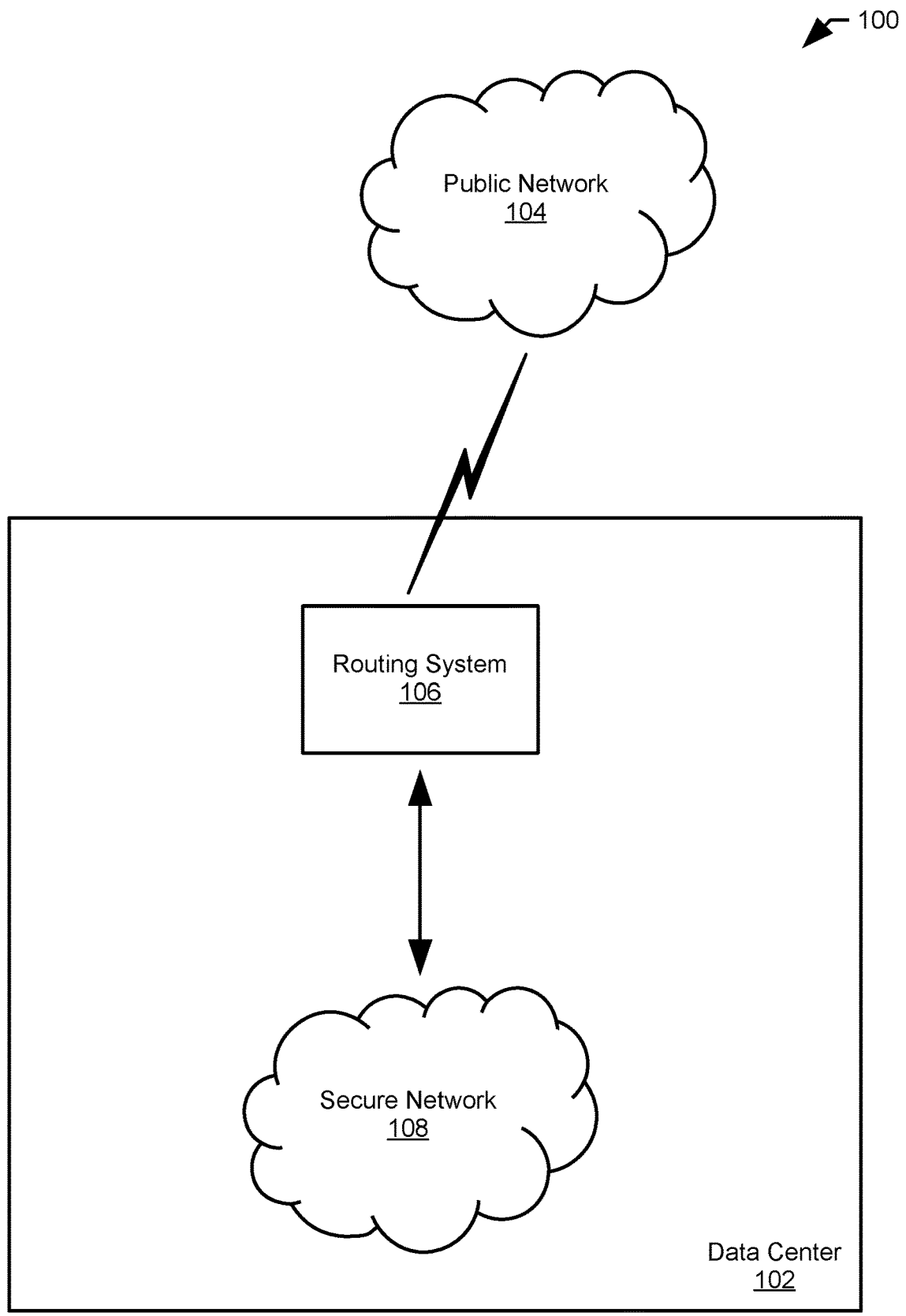
FIG. 1 is a block diagram depicting a routing system disposed between a public network and a secure network.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein support a secure routing system that is disposed, for example, between a public network and a secure network or secure database. The routing system serves to isolate the secure network or secure database from the public network, and protect the secure network or secure database from attacks via the public network. In some embodiments, the secure network or secure database that may be replaced by any type of secure system that may include one or more of a database, secure database, secure computing device, secure network, computing system, and so on.

The security offered by the routing system is achieved by designing the routing system to operate over a limited, very specific instruction set. This instruction set is not implemented by using standardized software stacks or networking protocols. Instead, the instruction set is implemented in a lookup table or picklist-like format, which is different from contemporary system implementations that use methods that include procedural coding implemented using structured programming languages. Due to the specific nature and limited number of the commands included in the instruction set of the routing system, any commands received by the routing system that are not included in this instruction set (for example, commands that attempt to execute malicious code) are ignored. In this way, the integrity of the data in the secure network or secure database is preserved. In order to further enhance the security of the system, the instruction set of the routing system is not publicly shared; only the machine of an authenticated user is allowed access to the instruction set of the routing system.

The interface between the routing system and the public network, as well as the interface between the routing system and the secure network or secure database, are realized via either non-electrical coupling or electrical coupling methods described herein, that preserve the security features of the routing system.

FIG. 1 is a block diagram 100 depicting a routing system 106 disposed between a public network 104 and a secure network 108. The public network 104 is generally defined as a network that allows open public access, such as the Internet. In some embodiments, the routing system 106 and the secure network 108 may be within physical proximity of each other. For example, the routing system 106 and the secure network 108 may reside in a data center 102. In some embodiments, the routing system 106 is implemented using a virtual machine running on a host operating system of a computing system. In alternate embodiments, the routing system 106 and the secure network 108 may be in different geographic locations.

The routing system 106 acts as a secure router between the secure network 108 and the public network 104. In some embodiments, the secure network 108 includes a secure database containing sensitive information. In some embodiments, all communication between the routing system 106 and the public network 104, as well as all communication between the routing system 106 and the secure network 108, is via a communication syntax that is not based on contemporary structured programming languages and procedural coding. In some embodiments, the communication syntax is implemented by using lookup tables. In other embodiments, the communication syntax is implemented by using picklists. In other embodiments, the communication syntax is implemented by using rules and templates. In some embodiments, the communication syntax used to communicate between the public network 104 and the routing system 106 is different from the communication syntax used to communicate between the routing system 106 and the secure network 108. The communication syntax used to communicate between the routing system 106 and the secure network 108 is not shared with the outside world, and is not made publicly available. Access to the communication syntax used to communicate between the routing system 106 and the secure network 108 is limited to authorized personnel such as system designers and system administrators.

In essence, the routing system 106 acts as a network defender with a nonstandard, limited instruction set that responds only to specific commands and communication requests from the outside world received via the public network 104, with a correspondingly limited function set of commands that the routing system 106 is able to perform. External requests are translated to the communication syntax that the routing system 106 uses to communicate with the secure network 108. The routing system 106 thus maintains a one-to-one map between communication requests from the outside world received via the public network 104 and communication requests associated with the secure network 108. Any request received from the outside world via the public network 104 that does not map to a command or communication element in the associated communication syntax is ignored by the routing system 106, and is not transmitted to the secure network 108. Thus, any attempt to maliciously attack the secure network 108 is completely blocked. For example, an attack by an Internet bot that uses one or more attack techniques (such as SQL injection) to attack the secure network 108 is completely ignored by the routing system 106. A human could attempt to manually attack the secure network 108 by trying to hack into the secure network 108 via a trial-and-error method aimed at deciphering the communication syntax that is used by the routing system 106 to communicate with the secure network 108. However this would be very difficult for even an experienced hacker.

Without correct credentials for authentication the hacker is ignored completely. Because of the unique capabilities of the described systems and methods, this authentication process can be highly secure including methods (in any combination) such as password, biometric (fingerprint recognition, retina recognition, facial recognition, voice recognition, etc.), behavior (tracked activity such as previous location, proximity to tracked assets, etc.), reference (use of digital signatures from trusted sources, photos of known associates in attendance, photos of known personal assets, etc.), knowledge (items of personal history, items of personal knowledge, data history, etc.), location (current tracked location, cell phone text verification, etc.) or specific known activity. Such information regarding authorized users may be maintained, for example, in a secure database or other storage mechanism accessible by systems and methods described herein.

Furthermore, the routing system 106 can be programmed to lock down after a certain number of illegal communication requests or even eliminated completely in the event that the routing system 106 is implemented. For example, a virtual machine used with the routing system 106 can be terminated after a certain number of illegal attempts, making it very difficult for any sort of hacking attempt to be successful.

In some embodiments, the security proxy system realized by using the routing system 106 is a high level, software-defined router with no observability offered to the outside world about the internal communication that occurs within the data center 102, i.e. between the routing system 106 and the secure network 108. This proxy system is thus able to thwart any malicious attempt to attack the secure network 108, thereby offering a great degree of protection and robustness to the secure network 108.

Figure 2:
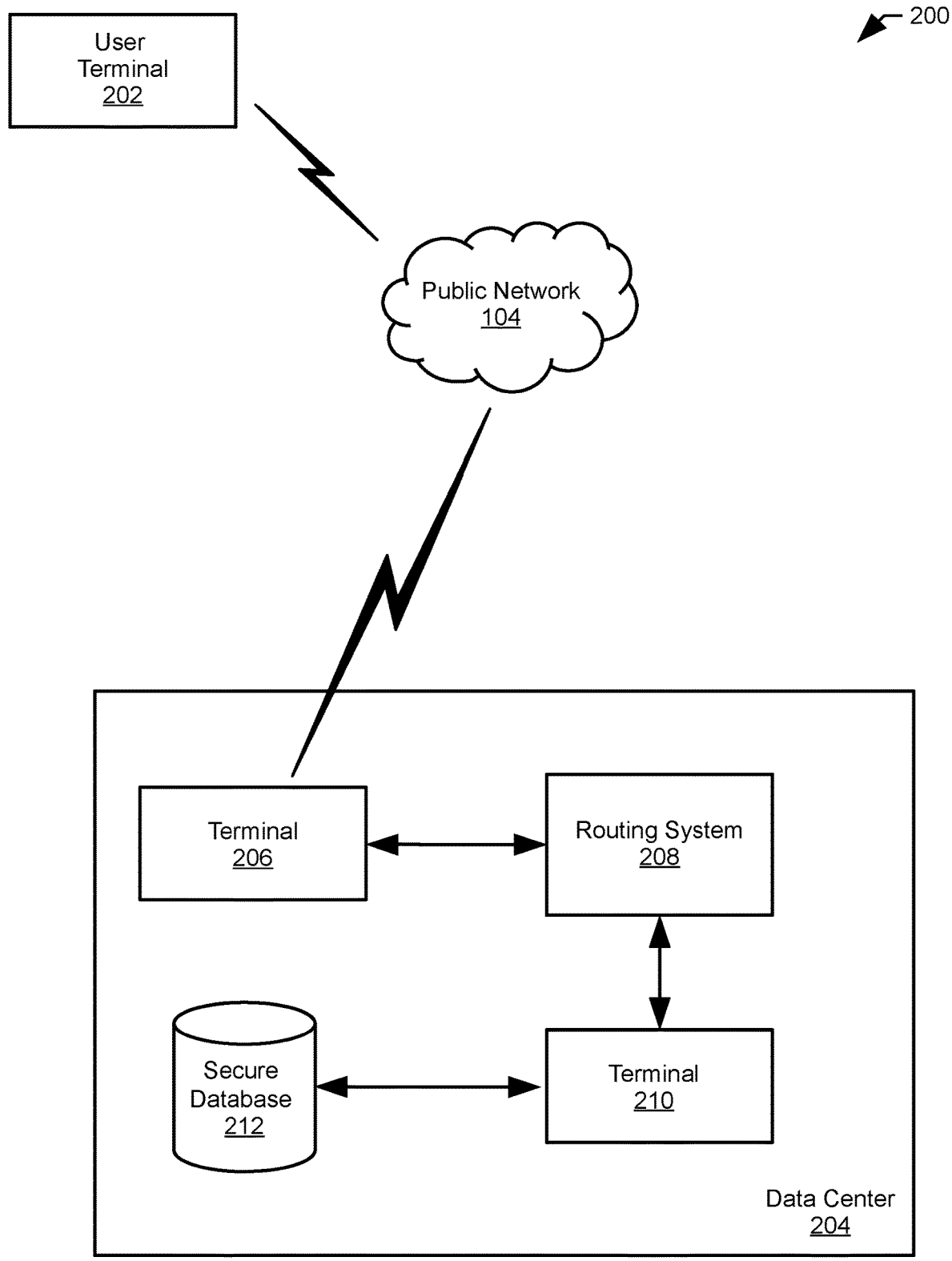
FIG. 2 is a block diagram depicting an embodiment of a routing system environment that allows a user to securely communicate with a secure database via a public network.

FIG. 2 is a block diagram depicting an embodiment of a routing system environment 200 that allows a user to securely communicate with a secure database via a public network. In this embodiment, a user terminal 202 wishes to access information stored in a secure database 212, wherein the user terminal 202 requests access to the information stored in the secure database 212 via the public network 104. In some embodiments, the user terminal 202 can be a desktop computer, a laptop computer, a mobile device, a tablet computer, or any other device capable of connecting to a public network such as the Internet. The secure database 212 is located in a data center 204. A routing system 208, also located in the data center 204, is used to provide security to the secure database 212. A terminal 206, located in the data center 204, provides an interface between the routing system 208 and the public network 104, while another terminal 210, also located in the data center 204, provides an interface between the routing system 208 and the secure database 212. In some embodiments, the terminal 206 comprises a video display monitor and a virtual keyboard and virtual mouse interface, such that the terminal 206 outputs data to the video display monitor and receives data input via the virtual keyboard and virtual mouse interface from the routing system 208. In some embodiments, the video display monitor associated with terminal 206 presents the information received from the user terminal 202 via the public network 104 as a web page in plaintext on the video display monitor associated with terminal 206. In some embodiments, the routing system 208 reads in the plaintext off of the video display monitor associated with terminal 206 via a machine vision algorithm. In other embodiments, the routing system 208 reads in the plaintext off of the video display monitor associated with terminal 206 via an optical character recognition (OCR) algorithm. The routing system 208 sends information to the terminal 206 via the virtual keyboard and virtual mouse interface associated with terminal 206, and terminal 206 transmits this information to the user terminal 202 via the public network 104.

With regards to the information flow from the terminal 206 to the routing system 208, there is a non-electrical, or "air-gap", coupling along this communication channel. Due to this non-electrical coupling, and by using a limited instruction set that operates only on the text read in off a video display monitor via machine vision, the routing system 208 provides robust security to the secure database 212. Since the routing system 208 operates based on text-only input off of the video display monitor associated with terminal 206, there is no way any malicious attack can be successfully carried out by trying to hack into the secure database 212, due to the limited instruction set and associated limited functionality of the routing system 208. Furthermore, the virtual keyboard and virtual mouse input from the routing system 208 to the terminal 206 is a one-way communication protocol, wherein information flows only from the routing system 208 to the terminal 206. Thus, there is no way in which this channel can be exploited by an attacker. In this way, a robust bidirectional communication link is established between the terminal 206 and the routing system 208. This "air gap" architecture allows many new advantages when used in conjunction with other security techniques such as protected key management and creation (discussed subsequently) that allow more complex authentication and encryption or more personalized authentication of users due to relative safety of secure databases that are not connected to the public network 104, for example. Furthermore, the intelligence associated with routing system 208 also allows a more complex set of user authentication functions to be performed, as mentioned previously and as will be discussed further subsequently.

Terminal 210 provides an interface between the routing system 208 and the secure database 212, wherein this interface is similar to the interface between terminal 206 and routing system 208. In some embodiments, terminal 210 comprises a video display monitor interface, and a virtual keyboard and virtual mouse interface. In some implementations, the video display monitor associated with terminal 210 presents the information received from the secure database 212 as a web page in plaintext on the video display monitor. In some embodiments, the routing system 208 reads in the plaintext off of the video display monitor associated with terminal 210 via a machine vision algorithm. In other embodiments, the routing system 208 reads in the plaintext off of the video display monitor associated with terminal 210 via an optical character recognition (OCR) algorithm. The routing system 208 sends information to the terminal 210 via the virtual keyboard and virtual mouse interface associated with terminal 210, which transmits this information to the secure database 212. The interface between the routing system 208 and the secure database 212 using the terminal 210 provides similar security advantages as discussed above for the interface between the public network 104 and the routing system 208 using terminal 206.

Any request from the user terminal 202 to access sensitive data in the secure database 212 is managed by the routing system 208 by using a novel authentication procedure and secure connection in conjunction with existing and well-known authentication and security protocols such as AES encryption, the details of which will be provided subsequently.

In one embodiment, the terminal 206, the routing system 208, the terminal 210 and the secure database 212 are all contained within the data center 204. More importantly, the configuration of the terminal 206, the routing system 208, the terminal 210 and the secure database 212 allow the routing system 208 and the secure database 212 to be isolated from each other, and also be individually isolated from the public network 104, wherein the term "isolated" may be used to denote the lack of any direct network connection between two entities. As described herein, the term "isolate," "isolated," and other such related terms may also be used to refer to, for example, the notion that the secure database 212 is not visible from the public network 104 via a network interface (not shown) which may be used for communication between the secure database 212 and the public network 104 via the routing system 208. The term "visible," as described herein, may be used to denote, for example, whether a party connected to the public network 104 is able to, for example, see, observe, or directly attempt an access to the secure database 212 via the public network 104. The term "visible," as described herein, may also be used to denote whether a party connected to the public network 104 can determine the functionality of the routing system 208 or the activities being performed by the routing system 208. In some embodiments, the functionality of the routing system 208 is not visible to a party connected to the public network 104. In some embodiments, secure database 212 may instead be a secure system that may include one or more of a database, secure database, secure computing device, secure network, computing system, and so on.

Any communication between the public network 104 and the secure database 212 must pass through a robustly designed authentication and verification protocol implemented by the routing system 208. This virtually guarantees that the secure database 212 is never accessible from any network outside the data center 204, such as the public network 104. As a result, there is virtually no way a malicious attacker can hijack the routing system 208 and execute malicious code or implement any other nefarious attack. The routing system 208 enforces security rules that are extremely robust. The physical separation between public network 104, the routing system 208, and the secure database 212 prevents any standard network connection and the many hacks known for various chips, devices and software used in network connections. This standard stack of vulnerable network communications is replaced by the much more limited communication syntax that is isolated within the routing system 208. The high level semantic nature of the communication syntax greatly reduces the number of possible combinations that need to be tested to assure a secure network interface, whereas a standard network interface may have millions of possible combinations of devices, commands and software, and this makes full security testing nearly impossible.

In some embodiments, an autonomously functioning routing system 208 is designed with artificial intelligence and machine vision as an analog of a human operator physically working at a computer terminal. Just as a human operator parses text displayed on a screen and authorizes purchases based on s/he determining that the purchaser is legitimate and the purchase request is authentic, the routing system 208 performs similar text parsing and authentication functions.

In other embodiments, the output from terminal 206 to the routing system 208 can be implemented by methods other than a video display monitor and a machine vision interface, using methods that include, but are not limited to, wireless optical (ultraviolet, infrared or laser) links, radio frequency identification (RFID), and ultrasonic communication channels. A similar interface can be used for the communication link from terminal 210 to routing system 208.

In some embodiments, one way to implement a suitable instruction set for the routing system 208 is to do away with procedural coding routines, replacing them instead by a lookup table approach. There are many advantages to this method. First, if the instruction set of the routing system 208 is fixed, there are only the limited number of instructions that the routing system 208 is allowed to execute. Any other command outside of this instruction set is ignored. Thus, any attempt to fool the routing system 208 into executing a nefarious action is unsuccessful. Additionally, the lookup tables can be in a syntax that is completely different from any contemporary structured programming language, and this prevents an attacker from using known techniques to attack the system. Furthermore, the information in the look-up tables can be encrypted so as to not make any sense to an attacker. This will prevent any reverse-engineering effort, which is the second advantage offered by a lookup table approach. Thirdly, the lookup table philosophy is easily upgradable. The disadvantage of procedural code is that it needs to be continually modified for current and future compatibility, and this results in code modules growing large and bulky. A lookup table-based approach, instead, does not need to be modified as such. If additional commands need to be added in the future, the lookup table can be expanded. Obsolete commands can be deleted as required, which provides a simple and elegant approach to programming the routing system 208. This approach substantially eliminates any ability of an attacker to inject malicious commands into the system resulting in unauthorized leakage of data from the secure database. In some embodiments, the described systems and methods "interpret" every command and data symbol.

In some embodiments, the only physical connection between the routing system 208 and either of the two terminals 206 and 210 is a virtual keyboard and virtual mouse. Since no harmful code can be transmitted via either of these two channels (in the reverse direction from terminal 206 to routing system 208), there is no issue of security here. The respective interfaces between the routing system 208 and the terminals 206 and 210 can be implemented in different ways. For example, the information presented on the terminals 206 and 210 can be further independently encrypted, with only the routing system 208 being able to decipher this information. Alternatively, the machine vision approach can be replaced with a wireless encrypted link that could be acoustic (ultrasound), optical (laser, infrared, ultraviolet), or radio frequency or radio frequency identification (RF/RFID). The data transmitted along this link is limited to what would be displayed on the screen. This data is limited to text only, displayed in a barebones browser which is not able to execute any code or display any images. In this way, the security of the system is preserved. A less secure realization of the system can use a virtual terminal input system for the routing system 208, wherein the terminals 206 and 210 are virtual terminals, instead of physical terminals that use video display monitors.

Figure 3:
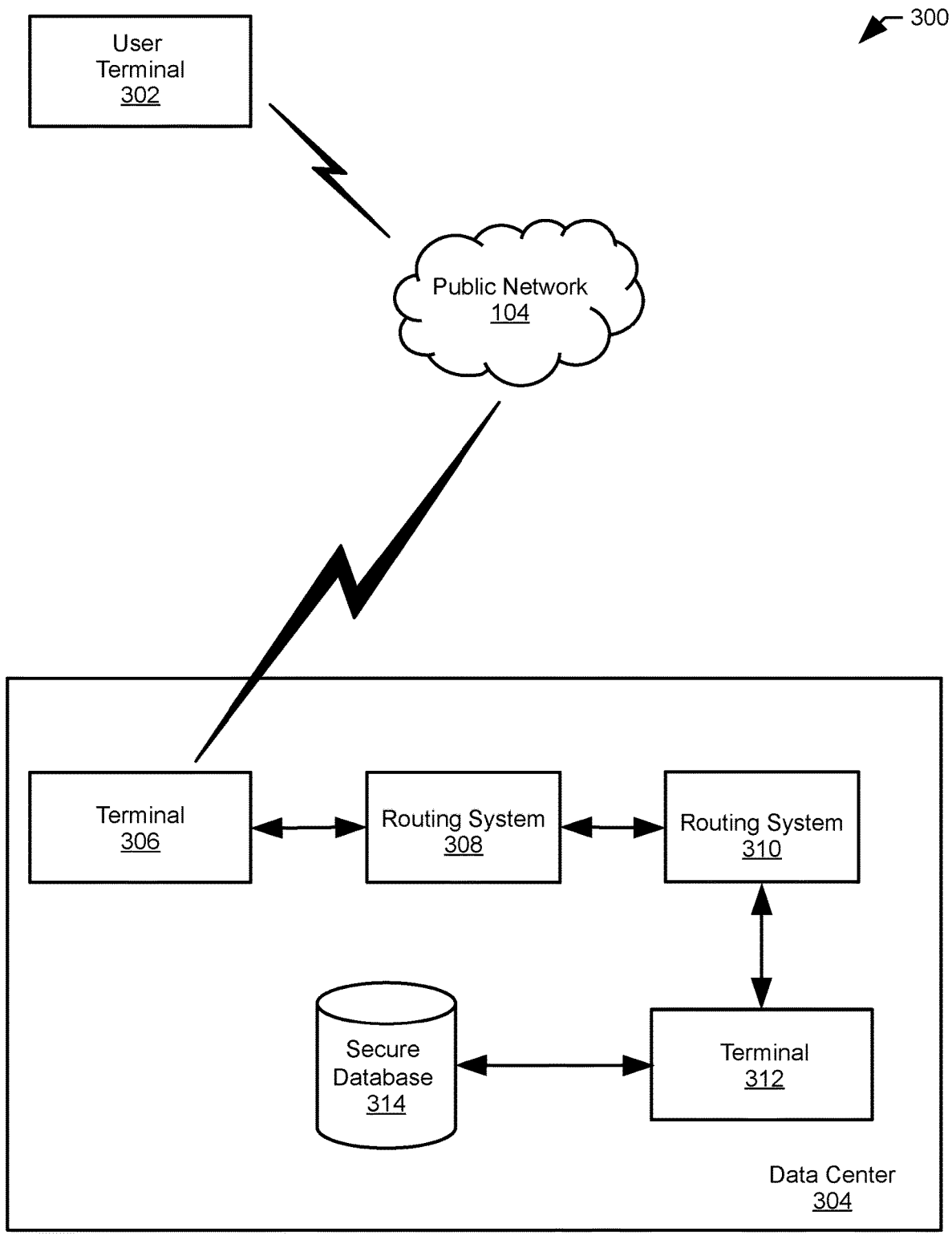
FIG. 3 is a block diagram depicting an embodiment that uses two routing systems that allow a user to securely communicate with a secure database via a public network.

FIG. 3 is a block diagram depicting an embodiment 300 that uses two routing systems that allow a user to securely communicate with a secure database via a public network. In this embodiment, a user terminal 302 wishes to access information stored in a secure database 314, wherein the user terminal 302 requests access to the information stored in the secure database 314 via the public network 104. In some embodiments, the user terminal 302 can be a desktop computer, a laptop computer, a mobile device, a tablet computer, or any other device capable of connecting to a public network such as the Internet. The secure database 314 is located in a data center 304. Routing systems 308 and 310 are also located in the data center 304 and are used to provide security to the secure database 314. A terminal 306, located in the data center 304, provides an interface between the routing system 308 and the public network 104, while a terminal 312, also located in the data center 304, provides an interface between the routing system 310 and the secure database 314. The interfaces between terminal 306 and the public network 104, between terminal 306 and routing system 308, between terminal 312 and routing system 310, and between terminal 312 and secure database 314 are similar to the corresponding interfaces described in routing environment 200. The routing system 308 and the routing system 310 communicate with each other using a communication syntax that is similar to the communication syntax described with respect to routing environment 200. The advantage of using two routing systems (routing system 308 and routing system 310) is that if an unsecure network segment needs to be crossed between routing system 308 and the secure database 314, it can be accomplished by the additional syntactic communication link along the data communication path.

Figure 4:
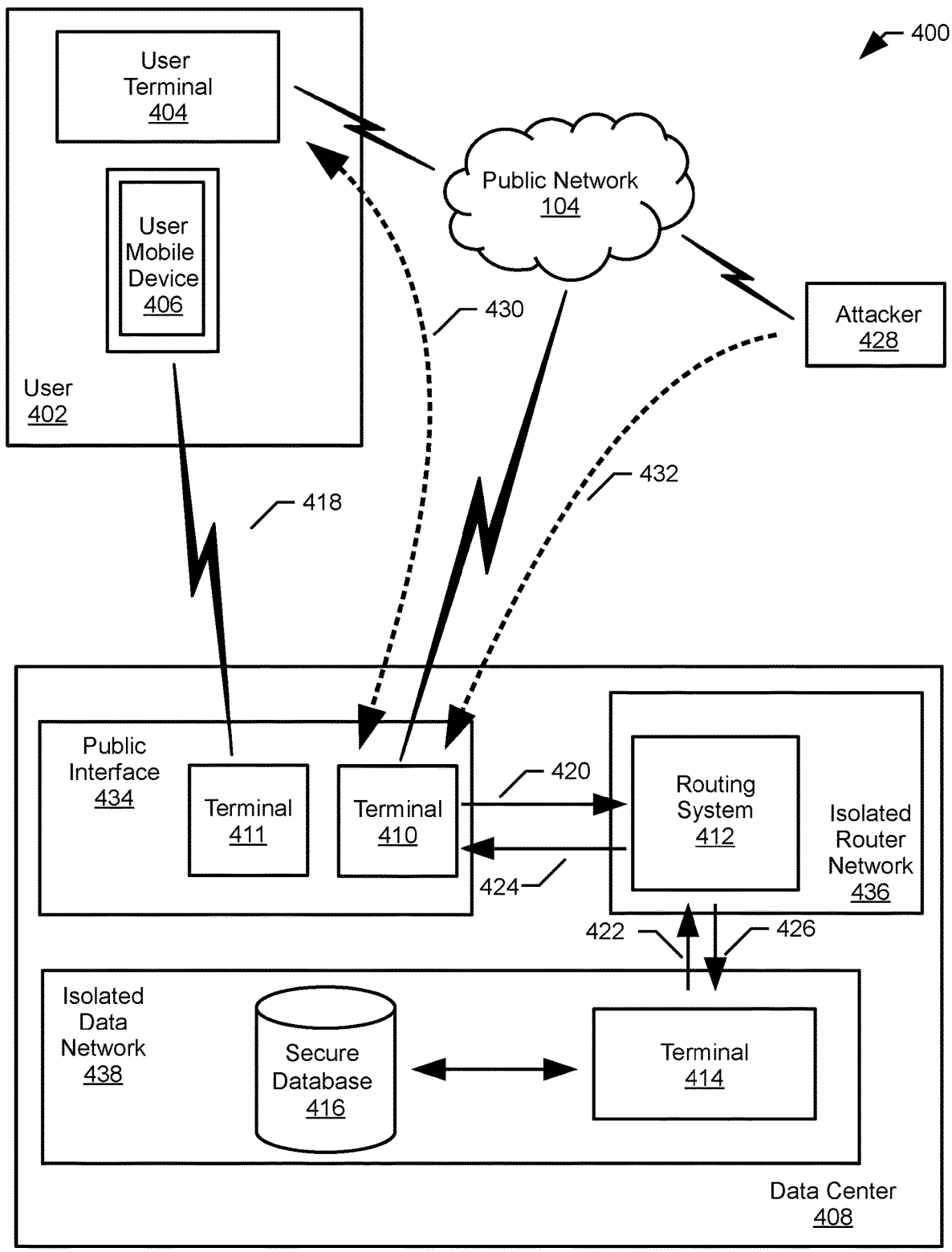
FIG. 4 is a block diagram depicting an embodiment of a routing system that uses an additional authentication channel for user authentication.

FIG. 4 is a block diagram depicting an embodiment of a routing system 400 that uses an additional authentication channel for user authentication. This figure also illustrates how the general concept of the routing system provides immunity from attacks via a public network.

User 402 has access to a user terminal 404 and a user mobile device 406. In some embodiments, the user terminal 404 can be a desktop computer, a laptop computer, a mobile device, a tablet computer, or any other device capable of connecting to a public network such as the Internet, while the user mobile device 406 is a separate device from the user terminal. The user mobile device 406 is any device such as a mobile phone, tablet computer, or any device capable of connecting to an alternate communication network other than the public network 104. In this example, user 402 wishes to access data on a secure database 416 located in an isolated data network 438 in a data center 408. The user 402 requests access to the data on the secure database 416 using the user terminal 404, via the public network 104. The data center 408 includes a public interface 434 which includes terminal 410 that is interfaced with public network 104. An isolated router network 436 includes a routing system 412, which is interfaced with terminal 410 via communication channels 420 and 424. Communication channel 420 is a unidirectional communication channel from terminal 410 to the routing system 412, and communication channel 424 is a unidirectional communication channel from routing system 412 to the terminal 410. In some embodiments, communication channel 420 is implemented by using a video display monitor at the terminal 410 to display data, with the data being read in by the routing system 412 via a machine vision algorithm. In other embodiments, communication channel 420 is implemented by using a video display monitor at the terminal 410 to display data, with the data being read in by the routing system 412 via an optical character recognition (OCR) algorithm. In some embodiments, communication channel 424 is implemented by using a virtual keyboard and virtual mouse combination.

Routing system 412 is also interfaced with terminal 414, wherein terminal 414 is contained within the isolated data network 438. The interface between routing system 412 and terminal 414 is via communication channels 422 and 426. Communication channel 422 is a unidirectional communication channel from terminal 414 to the routing system 412, and communication channel 426 is a unidirectional communication channel from routing system 412 to the terminal 414. In some embodiments, communication channel 422 is implemented by using a video display monitor at the terminal 414 to display data, with the data being read in by the routing system 412 via a machine vision algorithm. In other embodiments, communication channel 422 is implemented by using a video display monitor at the terminal 414 to display data, with the data being read in by the routing system 412 by using an optical character recognition (OCR) algorithm. In some embodiments, communication channel 426 is implemented by using a virtual keyboard and virtual mouse combination. Terminal 414 is directly interfaced with the secure database 416.

In order to improve the security of the system, the routing system embodiment 400 may also include a communications link 418 between terminal 411 and user mobile device 406. The communications link 418 is separate from and operates independently of the public network 104. In some embodiments, the communications link 418 is a short message service (SMS) link, which is a non-public network. In other embodiments, the communications link 418 is implemented via the telephone network. Communications link 418 is used to perform additional user authentication by the routing system 412 sending the user verification codes or messages from terminal 411, via communications link 418, to the user mobile device 406. The responses of the user 402 to the verification codes or messages are used to determine whether the requested access is genuine. In some embodiments, the routing system 412 sends a message to the user 402 from terminal 411, via communications link 418, to the user mobile device 406, requesting verification of an authentication code. The authentication code can be further encrypted or mapped as an alphabet that is generated by a high entropy signal such as a pseudorandom noise or chaotic sequence. Increasing the amount of entropy in the system allows the message to be hidden as a small subset of the high entropy sequence. Alphabet sharing can be done in part when the user password is shared, and subsequently in synchronized bursts during the transaction. Sending the message over a non-public SMS network is a further way of enhancing security.

It is important to note that the isolated router network 436 and the isolated data network 438 are isolated not only from each other, but also from the public network 104. This is accomplished by the use of the communication channels 420, 422, 424 and 426. This makes any unauthorized access from the public network 104 very difficult.

From a security perspective, it is straightforward to see that once a user 402 is authenticated and allowed secure access to the system, the information flow between the user 402 and the data center 408 follows a bidirectional path 430, wherein data flows between user terminal 404 and the data center 408 in both directions. In contrast, if an attacker 428 attempts to hack into or hijack the secure database 416, the routing system 412 ignores all invalid commands, and there is no data flow from the data center 408 to the attacker 428. The data flow 432 from the attacker 428 to the data center 408 follows a unidirectional path as there is no response from the data center 408 to the attacker 428 due to the presence of the routing system 412.

Figure 5:
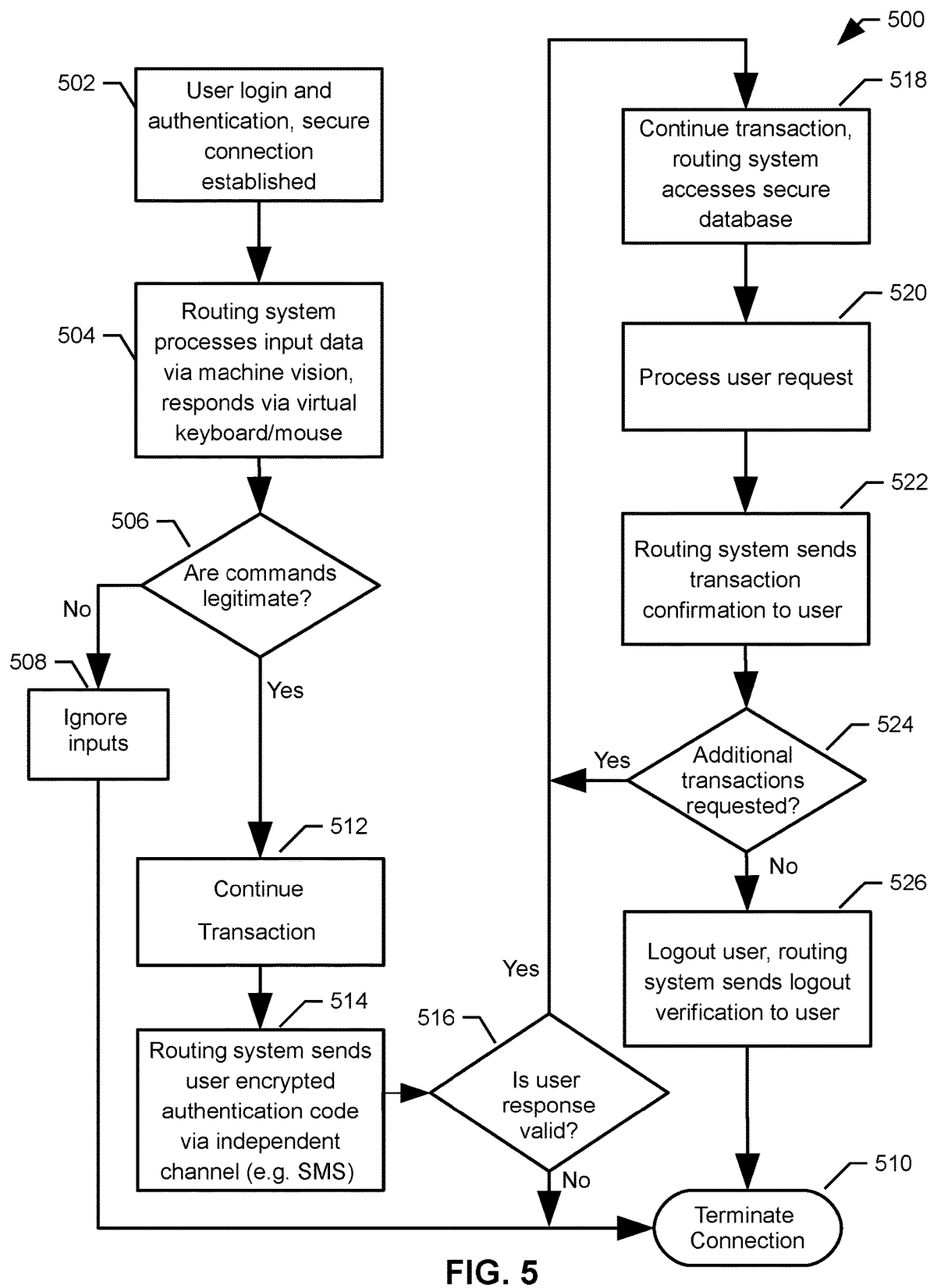
FIG. 5 is a flow diagram depicting an embodiment of a method for using the routing system to service a user request to access a secure database.

FIG. 5 represents a flow diagram depicting an embodiment of a method 500 for using the routing system to service a user request to access a secure database. This embodiment services a user request to login to the system and complete a specific transaction with a secure database. At 502, the user is logged in with the appropriate authentication, and a secure connection is established. The process of authentication may use any number of mechanisms known in the art and referenced in this document, with secure connection created using private/public key technology coupled with AES as described elsewhere in this document. At 504, the routing system processes input data from the user via a machine vision algorithm, wherein the input is read off of a video display monitor. The routing system responds to the user inputs via a virtual keyboard and virtual mouse. At 506, the routing system checks to see if the user commands are legitimate. In other words, the routing system determines whether the user command corresponds to one of the allowable commands in the limited instruction set of the routing system. If the user commands are not legitimate, the routing system ignores these inputs at 508 and terminates the connection at 510. Once the connection is terminated, the user is not allowed to interact with the system anymore, and a fresh login must be established. If the user commands are legitimate, the method continues the transaction at 512.

At 514, the routing system sends the user an encrypted authentication code via an independent channel such as the short message service (SMS). At 516, the system checks to see if the user response to the encrypted authentication code is valid. In this way, additional authentication via this independent channel enhances the authentication performed in step 502. If the user response to the authentication code is not valid or if there is no response from the user within a specific time interval, the system terminates the connection at 510. If the user response to the authentication code is valid, then the method proceeds to 518, where the system continues the transaction, with the routing system accessing the secure database. At 520, the system processes the user input. Next, at 522, the routing system sends a transaction confirmation to the user. At 524, the method checks to see if the user is requesting any additional transactions. If yes, the method goes back to 518, to process the next user transaction. This loop continues until at 524, the user does not request any more transactions, in which case the method proceeds to 526, where the user is logged out of the system, with the appropriate verification being sent to the user. Finally, at 510, the connection is terminated.

Figure 6:
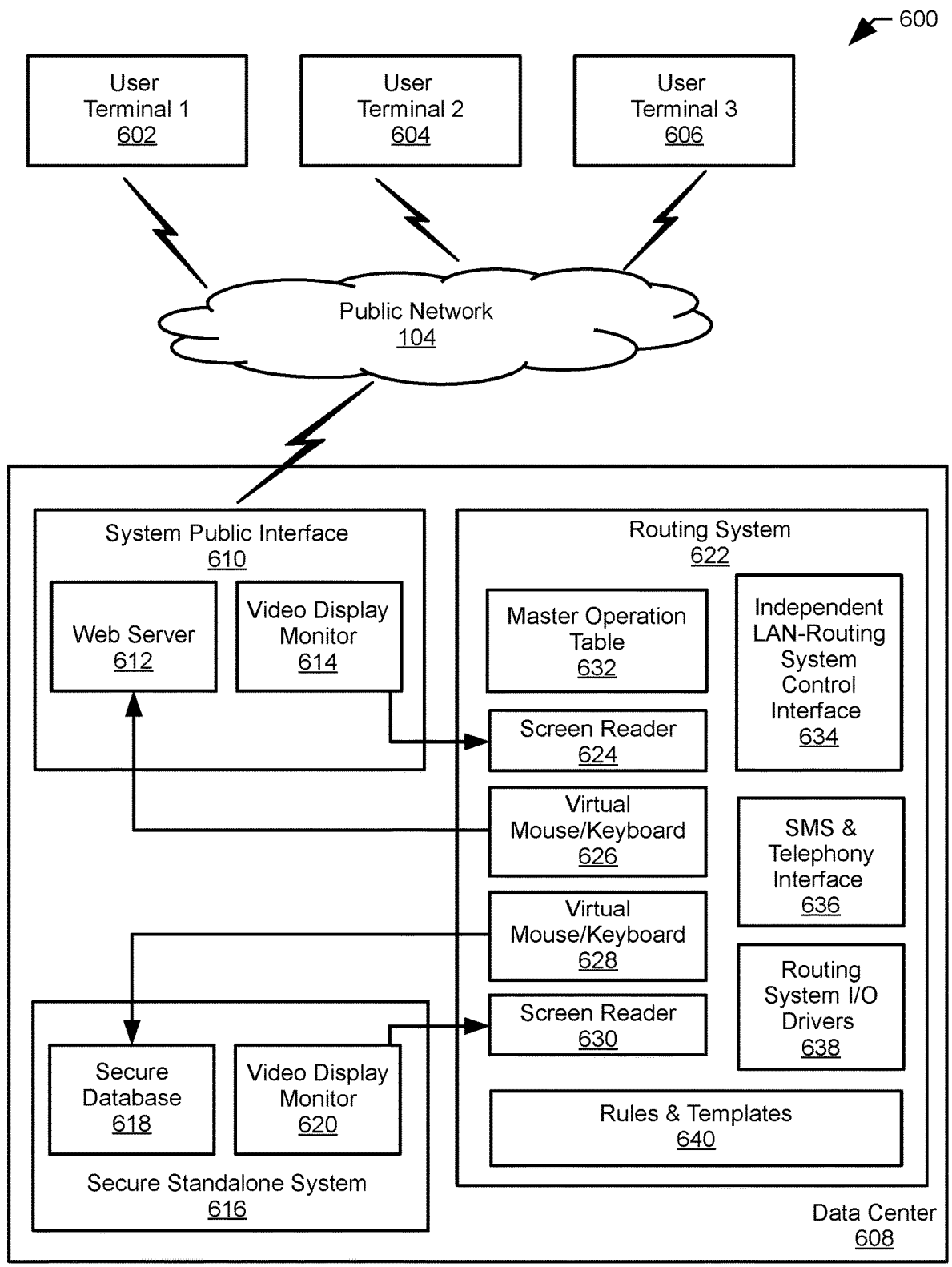
FIG. 6 is a block diagram depicting an embodiment of a routing system that serves multiple users.

FIG. 6 is a block diagram depicting an embodiment of a routing system 600, that serves multiple users. FIG. 6 also depicts the internal structure of one embodiment of the routing system. In this embodiment, three user terminals—user terminal 1 602, user terminal 2 604 and user terminal 3 606—wish to access, via public network 104, a secure database 618 in a secure standalone system 616 located in a data center 608. In some embodiments, user terminal 1 602, user terminal 2 604 and user terminal 3 606 can be any combination of desktop computers, laptop computers, mobile devices, tablet computers, or any such devices that are capable of connecting to a public network such as the Internet. The data center 608 interfaces with the public network 104 via the system public interface 610 which comprises a web server 612 and a video display monitor 614. The secure standalone system 616 includes a video display monitor 620. Data center 608 also includes a routing system 622. Routing system 622 is comprised of a master operation table 632, a screen reader 624, a virtual mouse and virtual keyboard 626, a virtual mouse and virtual keyboard 628, a screen reader 630, a set of rules and templates 640, a routing system input/output drivers 638, an SMS & telephony interface 636, and an independent LAN-routing system control interface 634.

The routing system 622 is built around the set of rules and templates 640 for specific operations. Appropriate encryption schemes are included, e.g. AES, RSA and so on. Other building blocks that comprise the routing system 622 are the master operation table 632 that is the set of explicit operating rules, routing system I/O drivers 638 that allow the routing system 622 to interact with the public network 104 and the secure database 618 using the appropriate I/O protocols (for example, an optical character recognition screen reader and a virtual keyboard and virtual mouse combination), and an SMS & telephony interface 636 that the routing system 622 uses to initiate communication with a client via an independent communications channel. The routing system 622 itself is programmed and/or controlled by an independent LAN-routing system control interface 634 that is kept private and secure from the both the public network 104 and the secure database 618. The routing system 622 uses screen reader 624 to read data from video display monitor 614 via a machine vision algorithm or an optical character recognition approach. The routing system 622 uses screen reader 630 to read data from video display monitor 620 via a machine vision algorithm or an optical character recognition approach. The routing system 622 uses virtual mouse/keyboard 626 to write data to the web server 612. The routing system 622 uses virtual mouse/keyboard 628 to write data to the secure database 618. User terminal 1 602, user terminal 2 604 and user terminal 3 606 can independently access the secure database 618 with appropriate independent authentication and verification by routing system 622.

Figure 7:
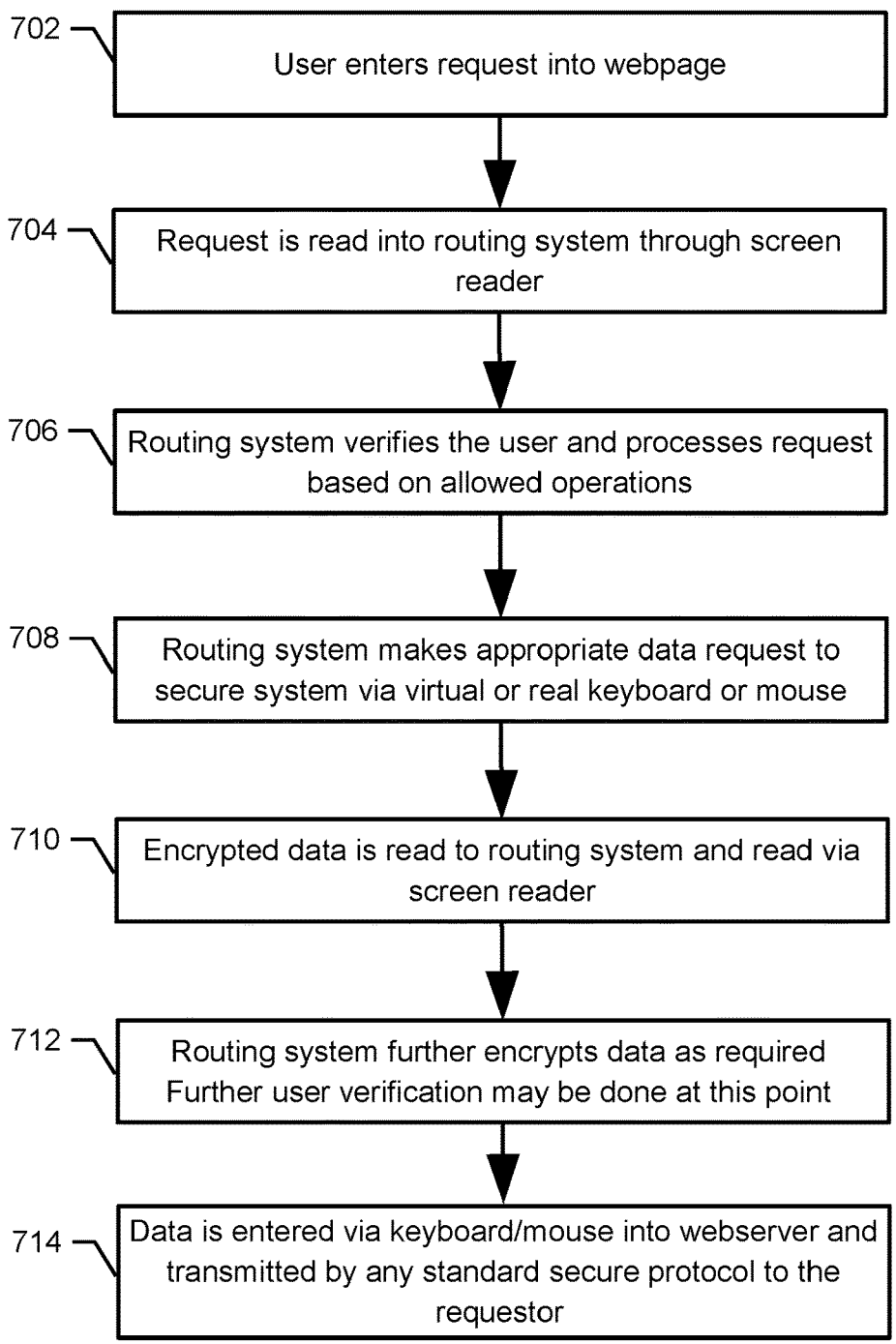
FIG. 7 is a flow diagram depicting an embodiment of a method for servicing a user request by a routing system that uses a machine vision and virtual keyboard and mouse implementation.

FIG. 7 represents a flow diagram 700 depicting an embodiment of a method for servicing a user request by a routing system that uses a machine vision and virtual keyboard and mouse implementation. At 702, a user enters a request into the appropriate webpage. This request is read into the routing system via a screen reader at 704. At 706, the routing system verifies the user and processes the request based on allowed operations. At 708, the routing system makes an appropriate data request to the secure system via a real or virtual keyboard and/or mouse interface. Next, at 710, encrypted data is read to the routing system and read via a screen reader. At 712, the routing system further encrypts the data as required. Further user verification may be done at this point. Finally, at 714, data is entered via the real or virtual keyboard and/or mouse interface into the webserver and transmitted by any standard secure protocol to the requestor.

Figure 8:
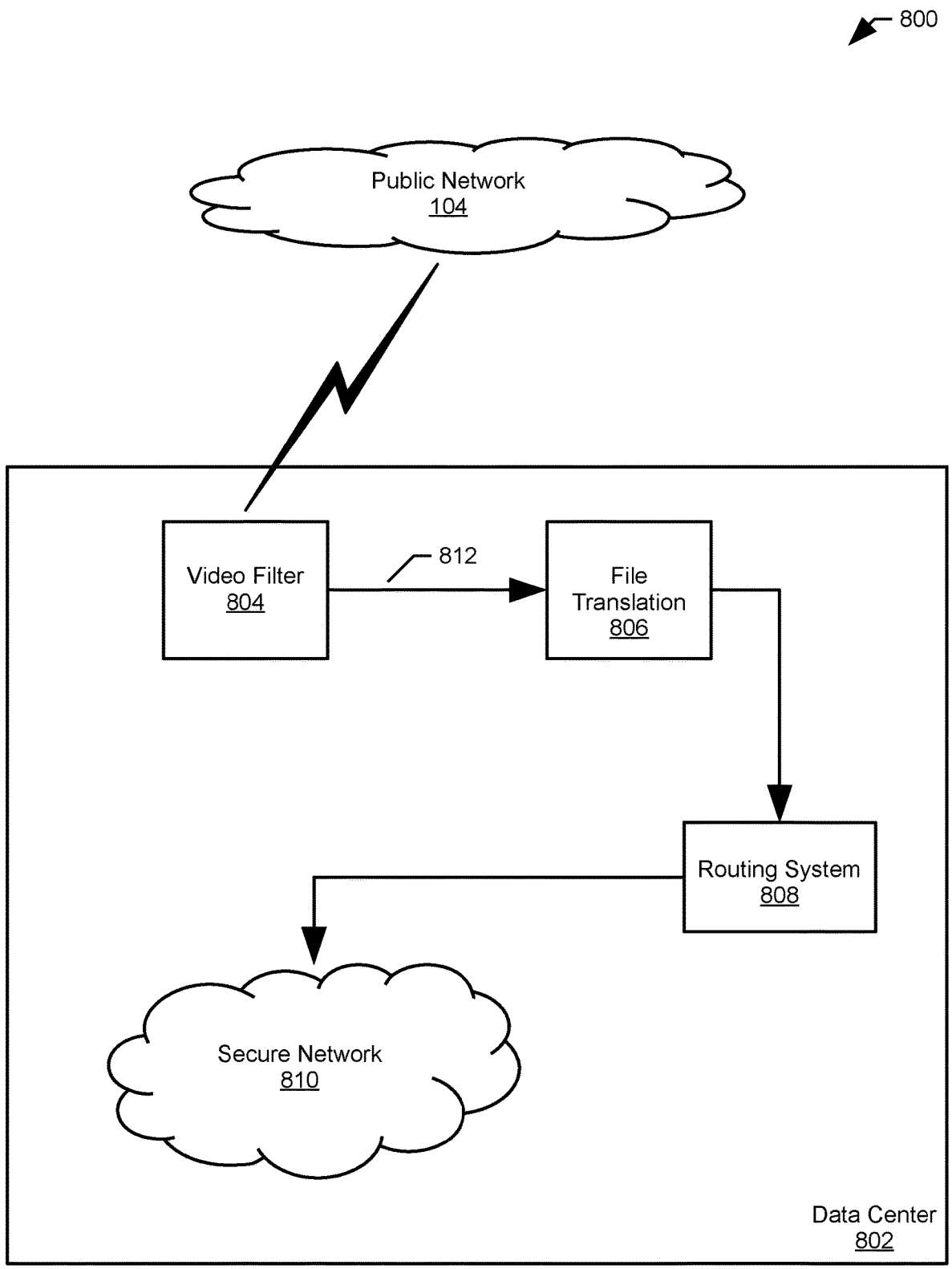
FIG. 8 is a block diagram depicting an embodiment of the routing system that uses a video filter approach.

FIG. 8 is a block diagram depicting an embodiment 800 of the routing system that uses a video filter approach. This embodiment comprises a data center 802, interfaced with public network 104. The data center 802 contains a secure network 810. The secure network 810 is interfaced with a routing system 808. In this embodiment, the video display monitor, for example 614, is replaced by a video filter 804, wherein the routing system 808, instead of using a machine vision algorithm in order to read the input data from a video display monitor interfaced with the public network, uses the video filter 804. Here, instead of a direct visual image, visual symbols are transmitted to the routing system 808 from the video filter 804. These visual symbols could also include the raw data transmitted to the video card that drives a computer display. The routing system 808 is programmed to decode the raw video data and extract the video symbols for processing. The data stream could be encrypted ASCII or ASCII-like characters. In some embodiments, the visual symbols are transmitted over a wireless link for improved security. The inputs from the routing system 808 to the secure network 810 are via a combination of a virtual keyboard and a virtual mouse. While the embodiment 800 depicts data flow in the direction from the public network 104 to the secure network 810, a reverse data path from the secure network 810 to the public network 104 can be easily embodied as a straightforward extension of the embodiment 800.

In other embodiments, the routing system 808 can reside on a user's mobile device and act as an arbiter, providing additional network security. From the discussion so far, it is seen that the routing system 808 is complicated in its understanding while following a relatively simple set of commands—the routing system 808 operates on a bounded instruction set. The command set is deliberately kept simple in order to limit the functionality of the routing system 808 which, in turn, reduces the vulnerability of the routing system 808 to being attacked. As an entity, the routing system 808 cannot be "logged in to," and operates as the master of the local network associated with the secure network 810. If required, it is possible to give the routing system 808 extended functionality that enables it to perform more complex tasks. However this comes at the expense of reduced security and increased vulnerability to attack. Intuitively speaking, it is straightforward to see that the larger the task list of routing system 808, the easier it becomes to hijack the routing system 808 or exploit a vulnerability as it executes its increased function set.

From a computational perspective, the routing system 808, especially an ensemble comprising a large number of routing system such as 808, can be computationally intensive. This is not considered to be a limiting factor, since computing power is likely to increase in the near future to a point where implementing even the most complex routing system architectures will be feasible. In most cases the routing system 808 is already fast enough and cheap enough for most practical uses.

Figure 9:
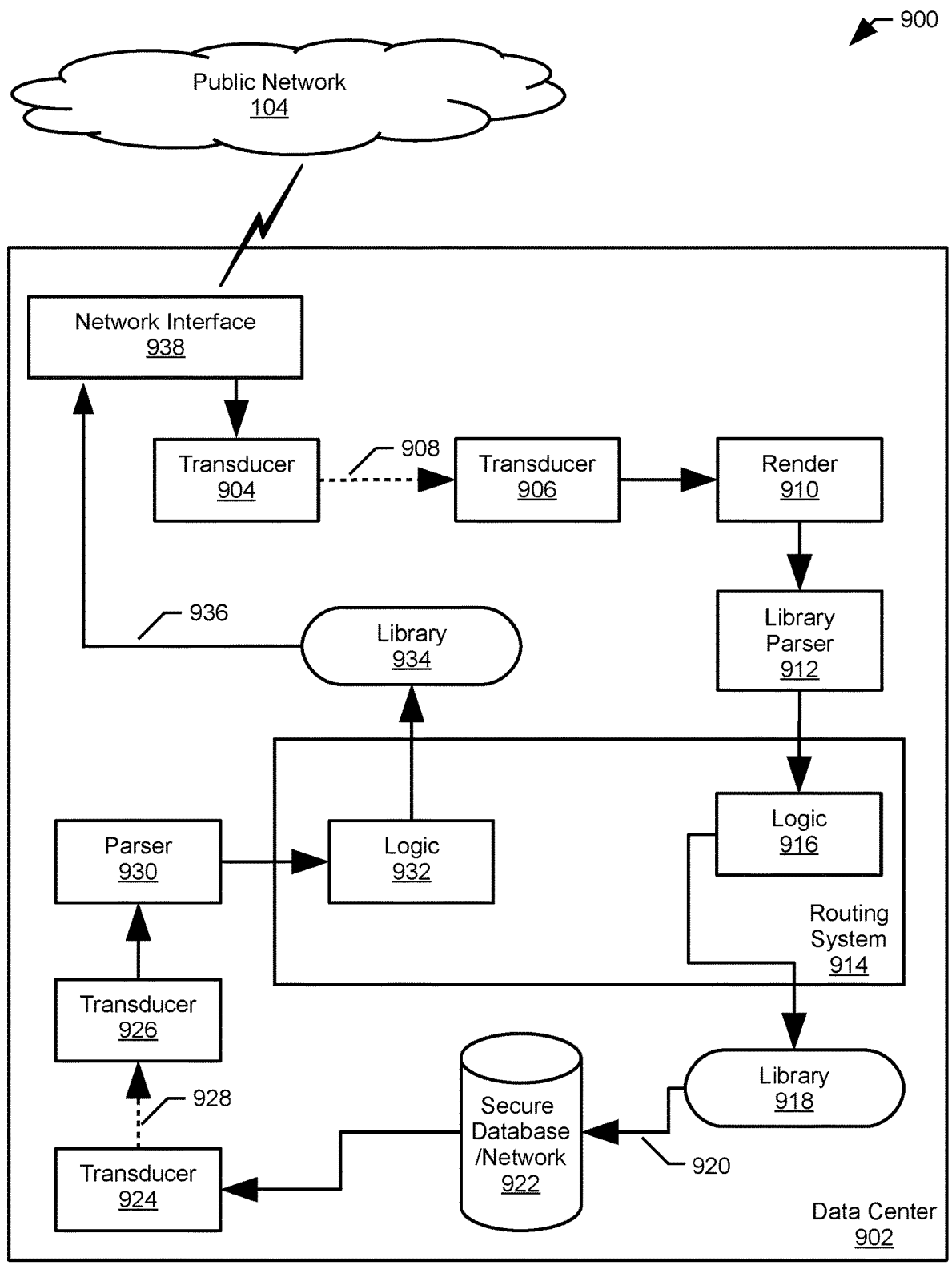
FIG. 9 is a block diagram depicting components that comprise an embodiment of a networking system based on the routing system.

FIG. 9 is a block diagram depicting components that comprise an embodiment 900 of a networking system based on the routing system. Data center 902 is interfaced with public network 104 via network interface 938 within the data center 902. Information from public network 104 is received by network interface 938, which transmits this data to transducer 904. Transducer 904 transmits this received data to transducer 906 via communication link 908. In some embodiments, communication link 908 is configured to be such that there is no electrical coupling between transducer 904 and transducer 906. In some embodiments, transducer 904 is a video display monitor and transducer 906 is a camera module with an optical character recognition (OCR) back-end that decodes the input data. In other embodiments, transducer 904 is an ultrasonic transmitter and transducer 906 is an ultrasonic receiver. In yet other embodiments, transducer 904 is a radio frequency (RF) transmitter while transducer 906 is an RF receiver. The information received by transducer 906 is then rendered into a format that is understood by routing system 914. In some embodiments, the rendering process is performed by render block 910. In other embodiments, the routing system 914 itself can be configured to perform the rendering operation. The output of the render block 910 is input to library parser 912, which translates the received data into a piece of data and/or an instruction for routing system 914. The routing system 914 contains a logic block 916 that performs the necessary operations on the received data and/or instruction. The logical functions performed by the routing system 914 could include filling in forms, handling passwords and pushing buttons on a webpage. These logical functions are then sent to library 918. Library 918 features look-up tables that implement interactions with the secure database/network 922 corresponding to the inputs from the routing system 914. The inputs are transmitted to the secure database/network 922 via a virtual keyboard and virtual mouse combination via communication link 920.

On the reverse path, data from the secure database/network 922 is input to a transducer 924, which transmits this data to transducer 926 via communication link 928. In some embodiments, communication link 928 is configured to be such that there is no electrical coupling between transducer 924 and transducer 926. In some embodiments, transducer 924 is a video display monitor and transducer 926 is a camera module with an optical character recognition (OCR) back-end that decodes the input data. In other embodiments, transducer 924 is an ultrasonic transmitter and transducer 926 is an ultrasonic receiver. In yet other embodiments, transducer 924 is a radio frequency (RF) transmitter while transducer 926 is an RF receiver. The data is parsed by parser 930 and input to the logic block 932 within routing system 914. Logic block 932 performs the necessary operations on the received data and/or instruction, after which this data is transmitted to library 934, which translates the data into an appropriate format for transmission over public network 104. The transmission of the translated data to the public network 104 is done via network interface 938. In some embodiments, the data output from the library 934 to the network interface 938 is done via a virtual keyboard and virtual mouse combination, along 936.

Figure 10:
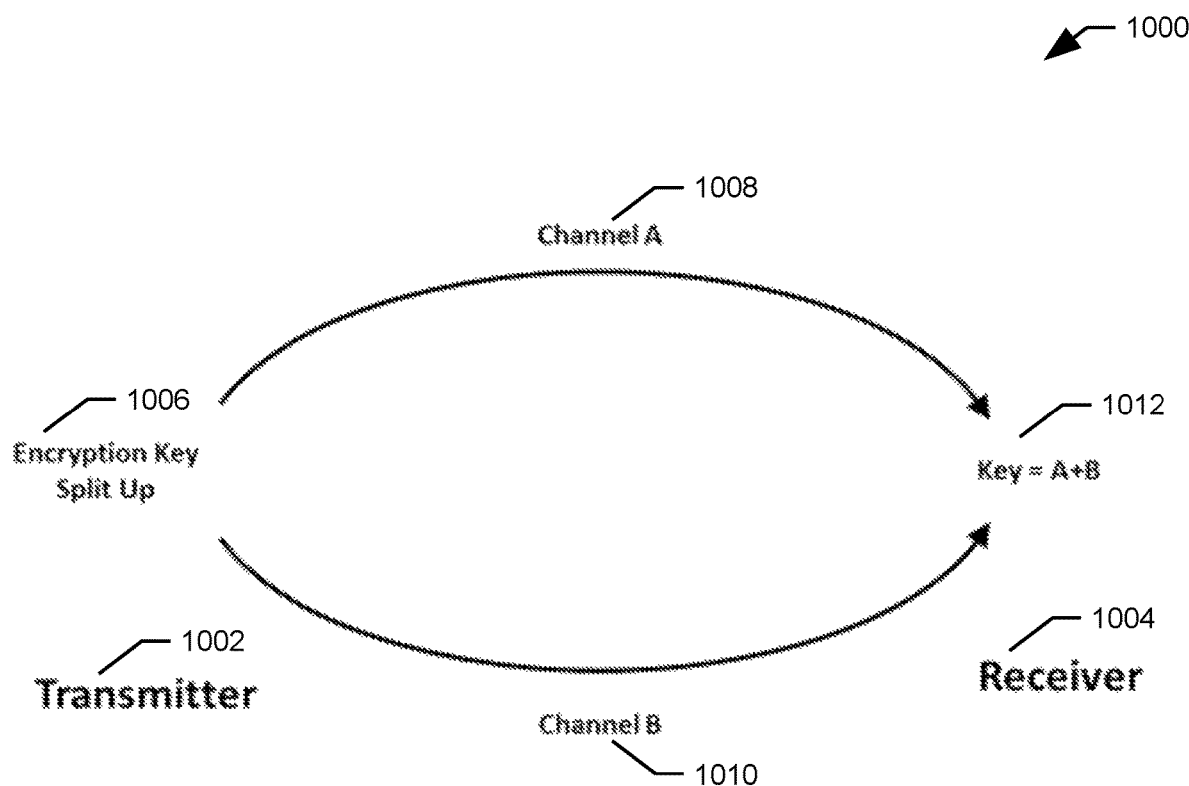
FIG. 10 is a diagram depicting a scheme for secure distribution and recovery of encryption keys used by the routing system.

FIG. 10 is a diagram depicting a scheme 1000 for secure distribution and recovery of encryption keys used by the routing system. At 1006 at transmitter 1002, the encryption key is split up into two parts. These parts are transmitted to the receiver 1004 over two independent channels—channel A 1008, and channel B 1010. The receiver 1004 receives the two parts of the encryption key and combines these two parts at 1012 to recover the required encryption key. By using multiple channels, the encryption keys can be broken up and distributed over the parallel communication channels. The recipient receives these keys and assembles the composite key.

The description of FIG. 4 discusses the inclusion of a separate authentication channel which could involve a connection between the routing system 412 and the user mobile device 406. It should be noted here that separate authentication channel is not necessary to operation of the routing system 412. It is an enhancement to security but not required for significant security improvements over conventional systems to be realized by the routing system 412. One aspect of security that needs to be addressed is the distribution of security encryption keys. In this regard, the use of multiple channels to communicate with the user is of great advantage. By using multiple channels, the encryption keys can be broken up and distributed over the parallel communication channels, as shown in FIG. 10. The key generation can use standard encryption techniques such as public/private keying and AES encryption, as well as relatively standard techniques such as pseudorandom numbers that can include chaotic waveforms. By using two independent channels to share the security keys, the probability of both the parts of the key being simultaneously intercepted is greatly reduced. In order to successfully intercept the keys, an attacker has to successfully intercept the key components being transmitted on both channels and then successfully use the pieces to reconstruct the original key. Furthermore, in order to increase the difficulty of key interception, the synthesis of the key itself could be made nonstandard. While example 1012 shows an addition operation, other operations such as multiplication, convolution or any transform method can be used in order to lend diversity to the encryption method.

Figure 11:
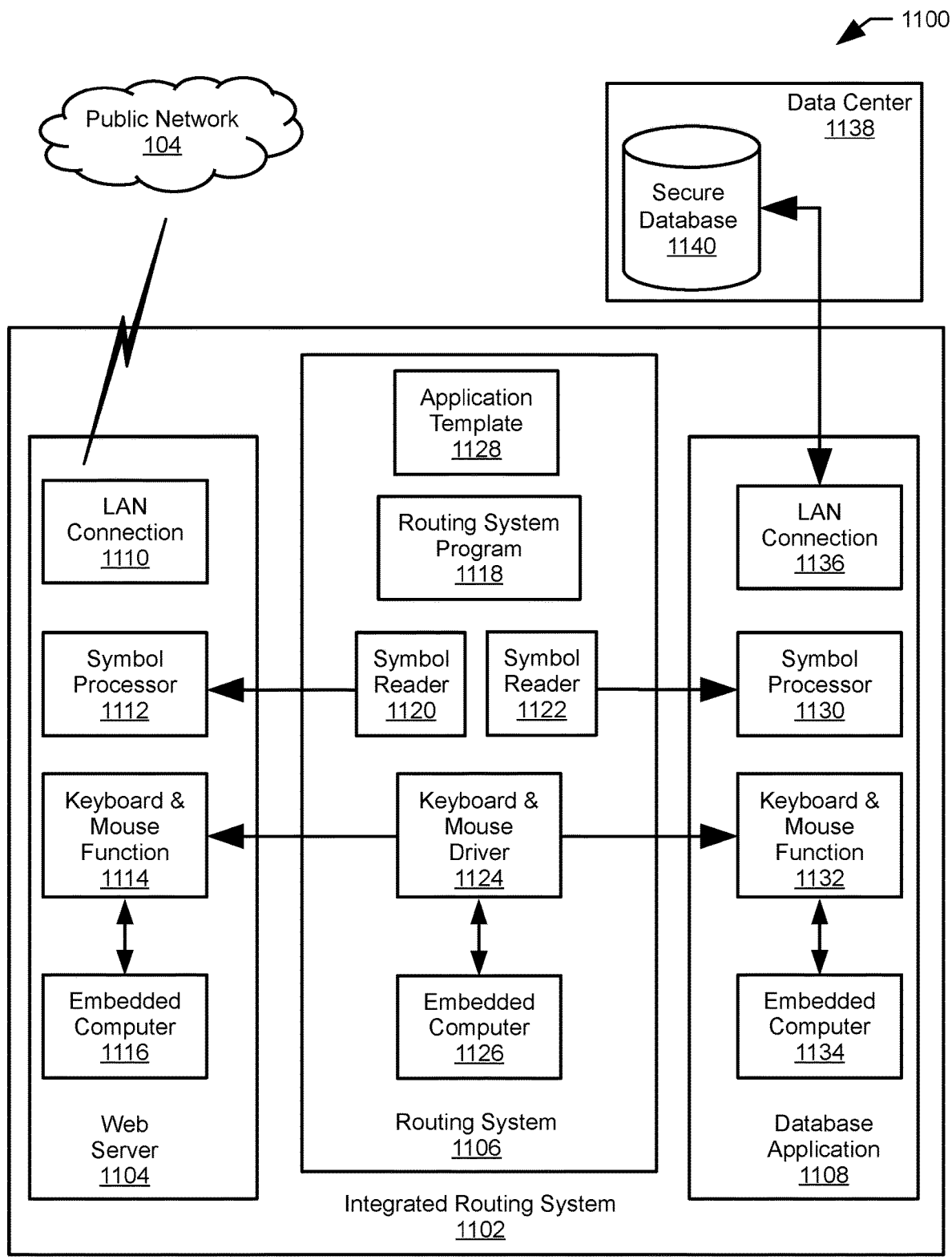
FIG. 11 is a block diagram depicting the internal structure of one embodiment of an integrated routing system.

FIG. 11 is a block diagram depicting the internal structure 1100 of one embodiment of an integrated routing system. In some embodiments, the entire routing system along with the associated peripherals can be realized on a single system such as an integrated circuit, or "chip," presented here as integrated routing system 1102. In some embodiments, integrated routing system 1102 can be implemented on a digital signal processor (DSP). In other embodiments, integrated routing system 1102 can be implemented on a field-programmable gate array (FPGA) or any similar processing device.

Integrated routing system 1102 comprises web server 1104, routing system 1106 and database application 1108. In come embodiments, web server 1104 includes a LAN connection 1110 that interfaces with public network 104. Web server 1104 may also include symbol processor 1112 that converts data received from public network 104 via LAN connection 1110 into appropriate symbols that can be read by the routing system 1106. Web server 1104 may also include a keyboard & mouse function 1114 that receives inputs from a virtual keyboard and virtual mouse, wherein these inputs are processed by embedded computer 1116 that is also included in web server 1104.

Integrated routing system 1102 also includes database application 1108. In come embodiments, database application 1108 includes a LAN connection 1136 that interfaces with secure database 1140 located in the secure data center 1138. Database application 1108 may also include symbol processor 1130 that converts data received from secure database 1140 via LAN connection 1136 into appropriate symbols that can be read by the routing system 1106. Database application 1108 may also include a keyboard & mouse function 1132 that receives inputs from a virtual keyboard and virtual mouse, wherein these inputs are processed by embedded computer 1134 that is also included in database application 1108.

Integrated routing system 1102 also includes routing system 1106. In some embodiments, routing system 1106 includes an application template 1128 that is a set of predefined templates and rules for specific operations of the routing system 1106. Routing system 1106 also includes a routing system program block 1118. Routing system program block 1118 contains the basic definitions of the operating structure of the routing system 1106.

Routing system 1106 includes symbol reader 1120 that reads in symbols from symbol processor 1112. Routing system 1106 also includes symbol reader 1122 that reads in symbols from symbol processor 1130. Keyboard and mouse driver 1124 that is a part of routing system 1106 outputs data to keyboard and mouse function 1114 and keyboard and mouse function 1132. Embedded computer 1126 within routing system 1106 processes the data for output via the keyboard and mouse driver 1124.

Figure 12:
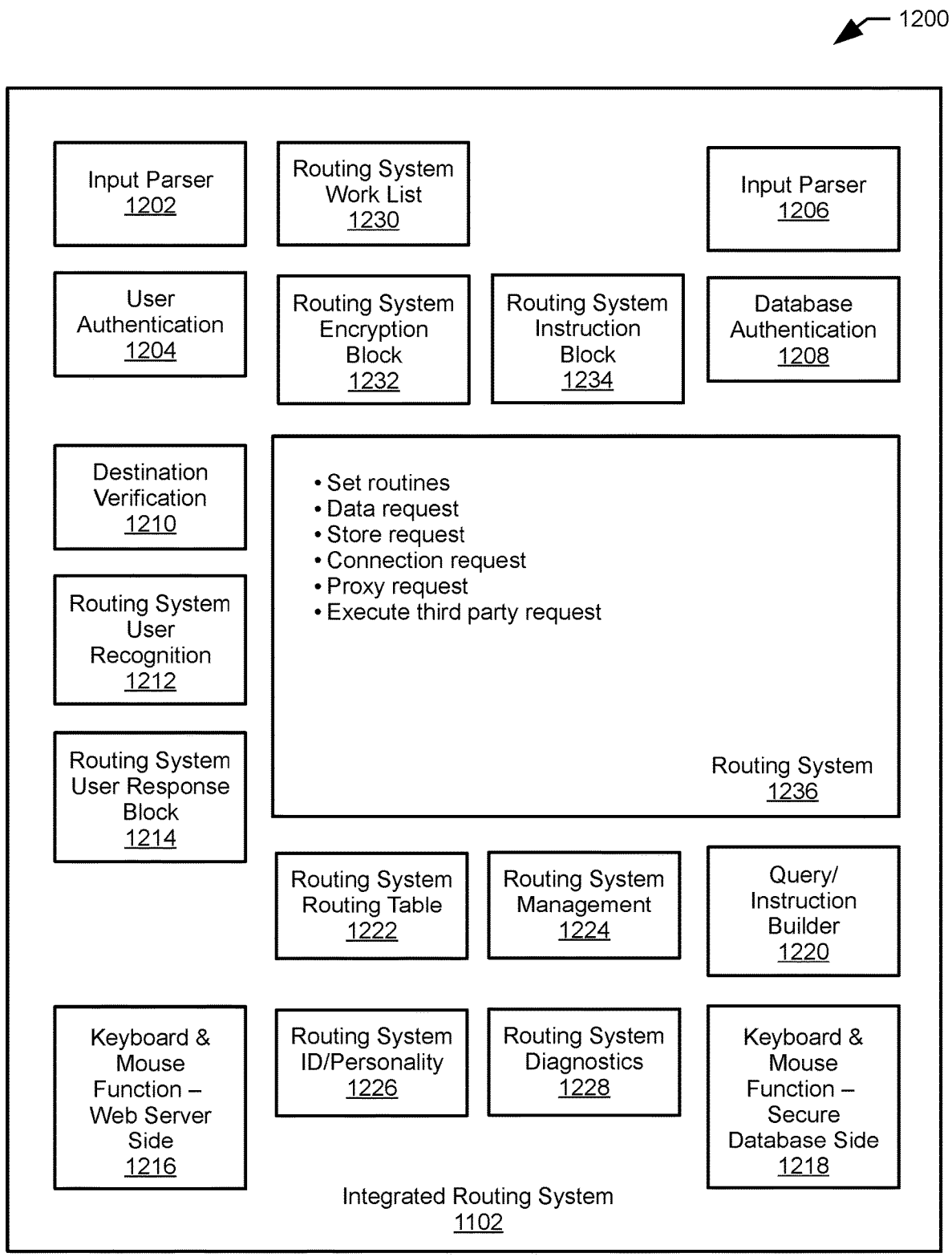
FIG. 12 is a block diagram depicting the details of the internal structure of one embodiment of the integrated routing system.

FIG. 12 is a block diagram depicting the details of the internal structure 1200 of one embodiment of the integrated routing system. The integrated routing system (often referred to as 'the robot' is responsible for four critical functions. First is the authentication of the user, second is the encryption and decryption of data and requests, third is the interpretation of the user request to create the data request that is actually forwarded to the secure database, and finally is the action of retrieving the requested data from the secure database.

Authentication (1204, 1210, 1212, and 1214) of the user can be as simple as checking the user password or as complex as checking the user behavior (user location (GPS location), response to mobile phone text code, previous user online activity, timing of user requests, user request as compared to normal user request, user reaction to a set of authentication questions, checking user detailed information (user questions regarding certain information such as previous residence, children, location of landmarks, etc., user IP address, browser fingerprint, ISP location, cookies), checking user biometric data (facial recognition photo as requested by authentication process, fingerprint, voice print, iris, etc.) as well as checking the user password to assure that the user is authorized to access the secure data. This authentication process can be very detailed and the routing system must score the results to determine whether a given user should be allowed into the system. The routing system can be made even more intelligent if it "learns" more about the user over time in order to detect changes in "behavior" during the authentication process. Further, because of the level of security of the connection due to the routing system 1102 isolation from the public network, this authentication information is much less likely to be exposed to hackers which would make the questions less useful in evaluating the user.

The second process is the encryption (1232). This routing system uses very strong encryption and because the routing system is completely isolated from the public network, there is no way to compromise the security of the router side of the conversation. The hacker must attack the user side. Thus, authentication is critical as well as limiting access to information by user.

Next is the interpretation of commands by the routing system (1234, 1230). When the router reads the incoming requests from a user, the router changes the request into a specific command set that is used to get the data needed to fulfill the request. Since the routing system interprets requests for the user by translating user requests into sequences of commands, there is no way for a user to insert dangerous commands into the system or trick the router into providing more data that a particular user is allowed to see.

Finally the system uses a fixed set of access methods to pull data from the secure database (in this example) so that dangerous commands that would leak data from the database cannot be made from the routing system at all (1218, 1220, 1206, and 1208).

Integrated routing system 1102 comprises an input parser 1202 that parses inputs received by the integrated routing system 1102 from the public network 104. Integrated routing system 1102 also comprises an input parser 1206 that parses inputs received by the integrated routing system 1102 from a secure database or secure network that is interfaced with the integrated routing system 1102. User authentication module 1204 in the integrated routing system 1102 performs all necessary user authentications, including authentication performed via an independent authentication channel, as discussed earlier. Destination verification block 1210 is used to verify the destination node for all data transfers.

Routing system user recognition block 1212 may perform certain authentication functions including, but not limited to, pattern recognition, photo recognition and so on as described previously. Routing system user response block 1214 may provide a process for checking user "behavior" for better authentication. Keyboard and mouse function— web server side 1216 performs the function of outputting data to the web server via a virtual keyboard and virtual mouse operation. This is an example of how data can be securely typed into the webserver and sent to the user, or typed into the secure database application to query the secure database for information. However, there are other methods of accomplishing this process as mentioned elsewhere in this application. Keyboard and mouse function— secure database side 1218 performs the function of outputting data to the secure database via a virtual keyboard and virtual mouse operation. Routing system work list 1230 comprises a list of tasks for the routing system 1236. Routing system encryption block 1232 handles all encryption processes, including standard encryption methods (e.g. AES), as well as routing system-specific encryption methods such as symbolic https (to be discussed subsequently). Routing system instruction block 1234 comprises a list of instructions to be carried out by the routing system 1236. Database authentication block 1208 performs authentication functions on the secure database operations. Routing system 1236 is the core of the integrated routing system 1102, and performs a variety of functions that include but are not limited to setting routines, handling data requests, handling store requests, handling connection requests, handling proxy requests and executing third party requests.

Routing system routing table 1222 contains a list of the network routes to a specific network destination. Routing system management 1224 may be used to manage or optimize network routing connections. Query/instruction builder 1220 may be used to build and/or handle queries such as SQL queries. Routing system ID/personality block 1226 defines the personality or identification, including unique traits or characteristics, of the routing system 1236. The routing system diagnostics block 1228 allows the routing system 1236 to perform self-diagnostics including error correction and security checks.

Figure 13:
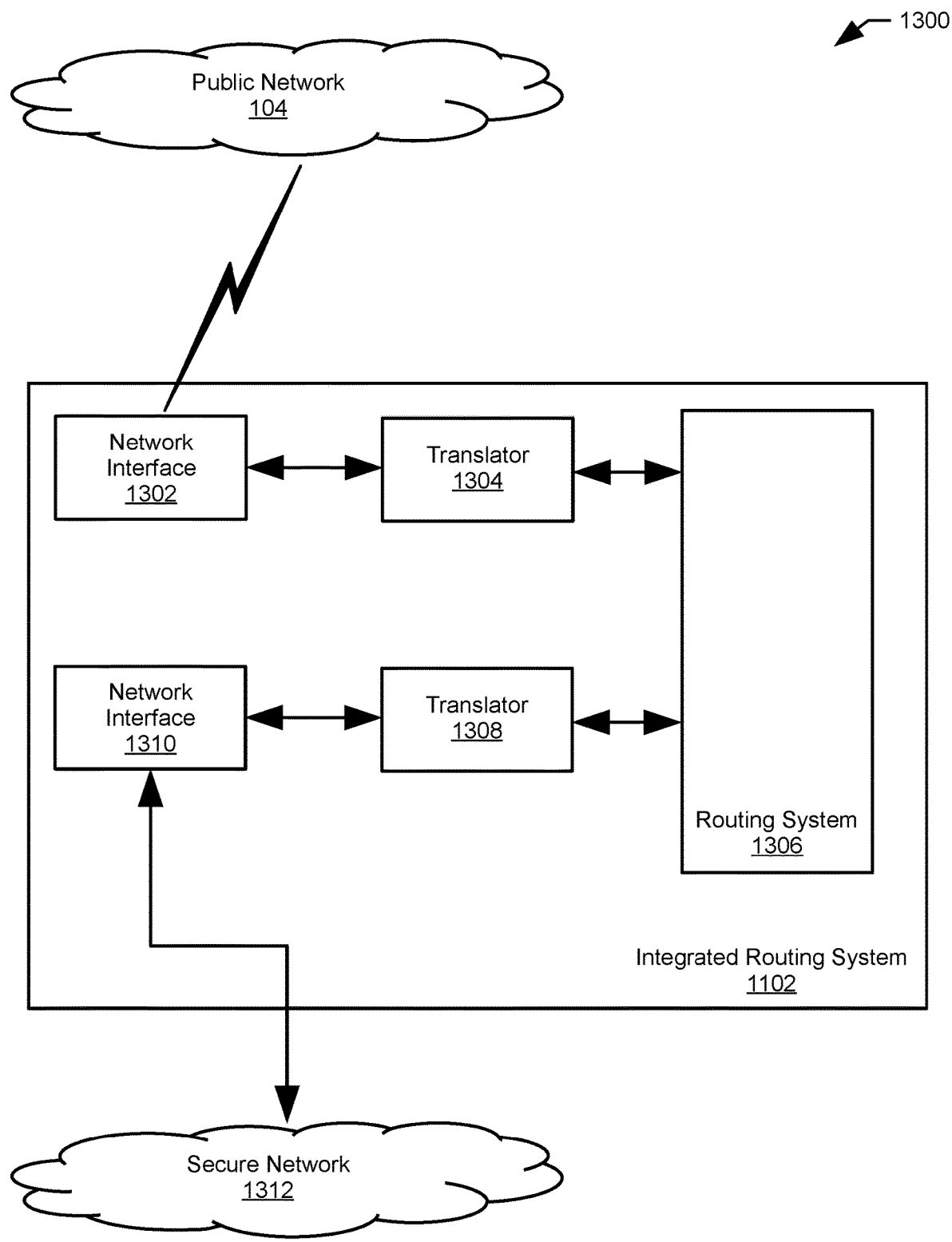
FIG. 13 is a block diagram depicting an embodiment of the integrated routing system disposed between a public network and a secure network.

FIG. 13 is a block diagram depicting an embodiment 1300 the integrated routing system disposed between a public network and a secure network. Integrated routing system 1102 includes a routing system 1306. Integrated routing system 1102 also includes a network interface 1302 and a network interface 1310, wherein network interface 1302 interfaces with the public network 104 while network interface 1310 interfaces with a secure network 1312. Functionally, network interface 1302 and network interface 1310 are the same. A translator 1304 serves as an interface between network interface 1302 and routing system 1306, while a translator 1308 serves as an interface between network interface 1310 and routing system 1306. Translator 1304 and translator 1308 are generalized representations of the machine vision input and virtual keyboard/mouse methods discussed earlier; functionally, translator 1304 and translator 1308 are the same.

In some embodiments, translator 1304 is implemented using a special disk drive that is constructed by using a normal (or virtualized disk drive) connected to a server via a SCSI, SATA or USB connection. The network interface 1302 then writes (and only is allowed to write) network data that it receives to this specific disk drive. The disk drive, however, is specialized such that the memory (either the disk platter or a computer memory in the virtualized case) can be read by a second process which is entirely invisible to the network interface 1302, which is writing data to the drive, such that the second process belongs to the routing system 1306 and is capable of reading (and only reading) the data directly from the memory. In this embodiment, the network interface 1302 can write data but cannot see what happens to it. Thus, no attacker on the public network 104 can see the routing system 1306, but the routing system 1306 can get the data sent to it. In this way, the data is sent to the routing system 1306 where it is decrypted, analyzed, parsed for user authentication, requests, and data. This approach is equivalent to, and another way of achieving, the effect of "machine vision" for the routing system 1306. In this case, the data is rendered not on the webpage to be read by the routing system 1306, but instead on a disk drive which can be read by the routing system 1306.

The data returned by the routing system 1306 to the user can still use the keyboard/mouse emulator to "type" the data into the network interface to be returned to the user, or it can use some combination of the special disk drive described above and the virtual keyboard/mouse described earlier.

Generally speaking, the function of translator 1304 and translator 1308 is to transform the standard network inputs into commands that the routing system 1306 can understand and vice versa. In other words, a translator transforms the network I/O commands to/from higher level semantics that constitute the vocabulary of the routing system 1306.

Network interface 1302 and network interface 1310 function as peripherals for the integrated routing system 1102. Network interface 1302 and network interface 1310 run standard software stacks (e.g. TCP/IP) for network interfacing. In some embodiments, network interface 1302 receives data and requests via public network 104. Translator 1304 receives this data and translates the data from the Internet protocol standard to a set of symbols that are processed by the routing system 1306. For the integrated routing system 1102, the machine vision approach can be simulated on the system architecture without actually having to implement the video display monitor/camera setup as discussed earlier. The received Internet data can be translated into a raw video data format that would normally be input to a video card that would display a web page on a computer monitor. Instead of sending the raw video data to a video display monitor, this raw video data can then be read in by the routing system 1306. This is equivalent to the routing system 1306 browsing a video display monitor using a camera and parsing information off of the screen using an OCR algorithm. Both text and images are parsed and read in. Again, there are several levels of security that are implemented in the algorithm. For example, an attacker might embed malicious code into an image that could be passed through to the secure database by the routing system 1306. The routing system 1306 avoids this by reading in only the raw bitmap of the image, and stripping the image data off of any possible attachments. In other words, data is read in as fixed set of primitives and translated into a fixed set of primitives that correspond to one of the entries in the pick-list of the routing system 1306. Any possible executable code in the data is stripped off and only the raw data is sent to the routing system 1306 for execution. If the raw data received by the routing system 1306 does not correspond to any of the instructions in the pick-list or look-up table set, the command is ignored.

On the side of the secure network 1312, a similar set of operations as discussed above for the interface to the public network 104 can be implemented, wherein data flows to and from the routing system 1306 and the secure network 1312 via translator 1308 and network interface 1310.

The network interface 1302 can integrate the entire Web server that connects to the public network 104 onto the same integrated routing system 1102. This would allow the rendition of the webpage in memory in a much simpler manner, and will also keep the webpage that is put up on the Internet very simple. For example it would put out exactly what webpage is rendered on a user's screen, and that would be very difficult to modify by any hacker. This what-you-see-is-what-you-get (WYSIWYG) Web server would still be treated as if it was completely not secure as it does touch the public network 104, but if it is integrated into the same carrier while still maintaining completely separate sets of connections, the rendering process of the symbolic data transfer can be greatly simplified.

The input to the routing system 1306 from the public network 104 thus reduces the instruction and data set from a large metric space to a much smaller, unambiguous subspace of commands in a language that is different from the one used by the public network. This greatly reduces the number of vulnerabilities and holes in the system, and consequently, reduces the probability of any security breach.

Standard and nonstandard authentication processes as discussed earlier apply to this system. In addition to SMS verification, the routing system 1306 can include GPS information for location verification, wherein the routing system 1306 requests the user to input their location and verifies that location with the GPS system on the user's mobile device. Biometric authentication that includes voice, fingerprint and other such metrics can also be used for authentication, along with other standard challenge-response type authentication measures.

Just as a switchboard operator in a public network routes calls to the appropriate party, the routing system 1306 routes authenticated user connections to the requested database. In an extreme example, we can present a switchboard operator that can connect a phone line to the President. The operator will perform several rigorous authentication procedures in order to determine the incoming caller's authenticity before actually routing the call to the President. This kind of security is the basis for the routing system 1306. In fact, the processing capability of the routing system 1306 will give it far greater capability than any human operator.

Integrating the structure of the routing system 1306 structure along with the network connections and translators onto a processing chip that is referred to as the integrated routing system 1102 gives the basic routing system 1306 tremendous computing power, with the capability to handle large amounts of throughput. At the same time, the proper implementation of the translator ensures that the routing system 1306 is isolated from each network—there is virtually no standard network connection between the routing system 1306 and either the public network 104 or the secure network 1312. In fact, what is desired is that both the routing system 1306 and the secure network 1312 are isolated from the public network 104, and that is exactly what this system accomplishes.

Figure 14:
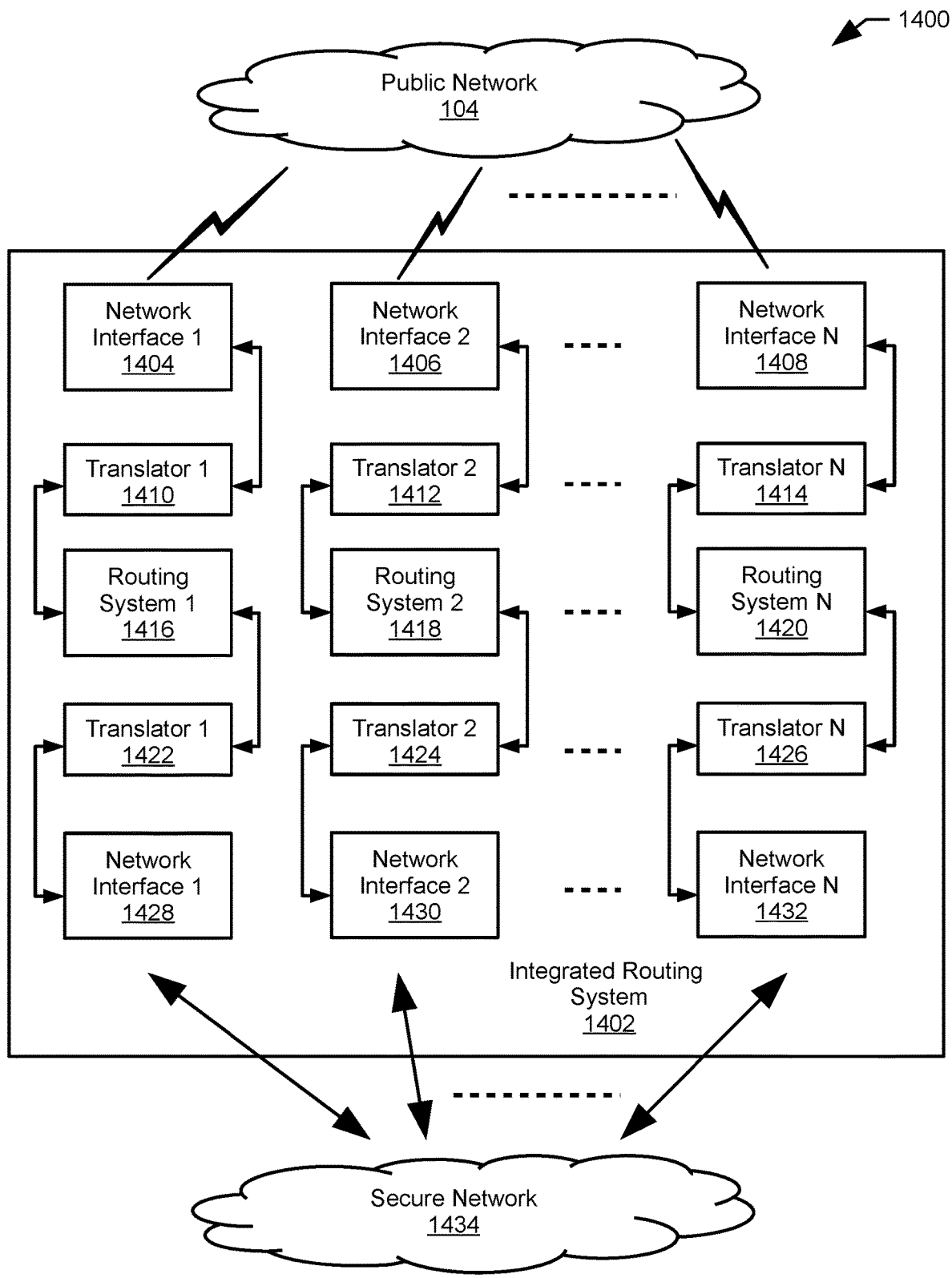
FIG. 14 is a block diagram depicting an embodiment of an integrated routing system comprising multiple routing systems disposed between a public network and a secure network.

FIG. 14 is a block diagram depicting an embodiment 1400 of an integrated routing system comprising multiple routing systems disposed between a public network and a secure network. In one embodiment, integrated routing system 1402 comprises N routing systems—routing system 1 1416, routing system 2 1418, through routing system N 1420. These routing systems are respectively independently interfaced to the public network 104 with N network interfaces—network interface 1 1404, network interface 2 1406, through network interface N 1408, via translator 1 1410, translator 2 1412, through translator N 1414 respectively. Routing system 1 1416, routing system 2 1418, through routing system N 1420 are also respectively independently interfaced to secure network 1404 with N network interfaces—network interface 1 1428, network interface 2 1430, through network interface N 1432, via translator 1 1422, translator 2 1424, through translator N 1426 respectively. In some embodiments, each of the N routing systems in integrated routing system 1402 has its own independent processing thread that is not shared with the other N−1 routing systems in integrated routing system 1402. In other words, each routing system contained within integrated routing system 1402 is agnostic to the processing threads of the other N−1 routing systems within integrated routing system 1402. This deters any hacker from being able to traverse from one routing system within integrated routing system 1402 to another routing system within integrated routing system 1402 via any shared threads in an attempt to execute malicious code on the system. In other embodiments, the computing power available can allow the instantiation of multiple routing systems, allowing a significant increase in the throughput of the system.

Figure 15:
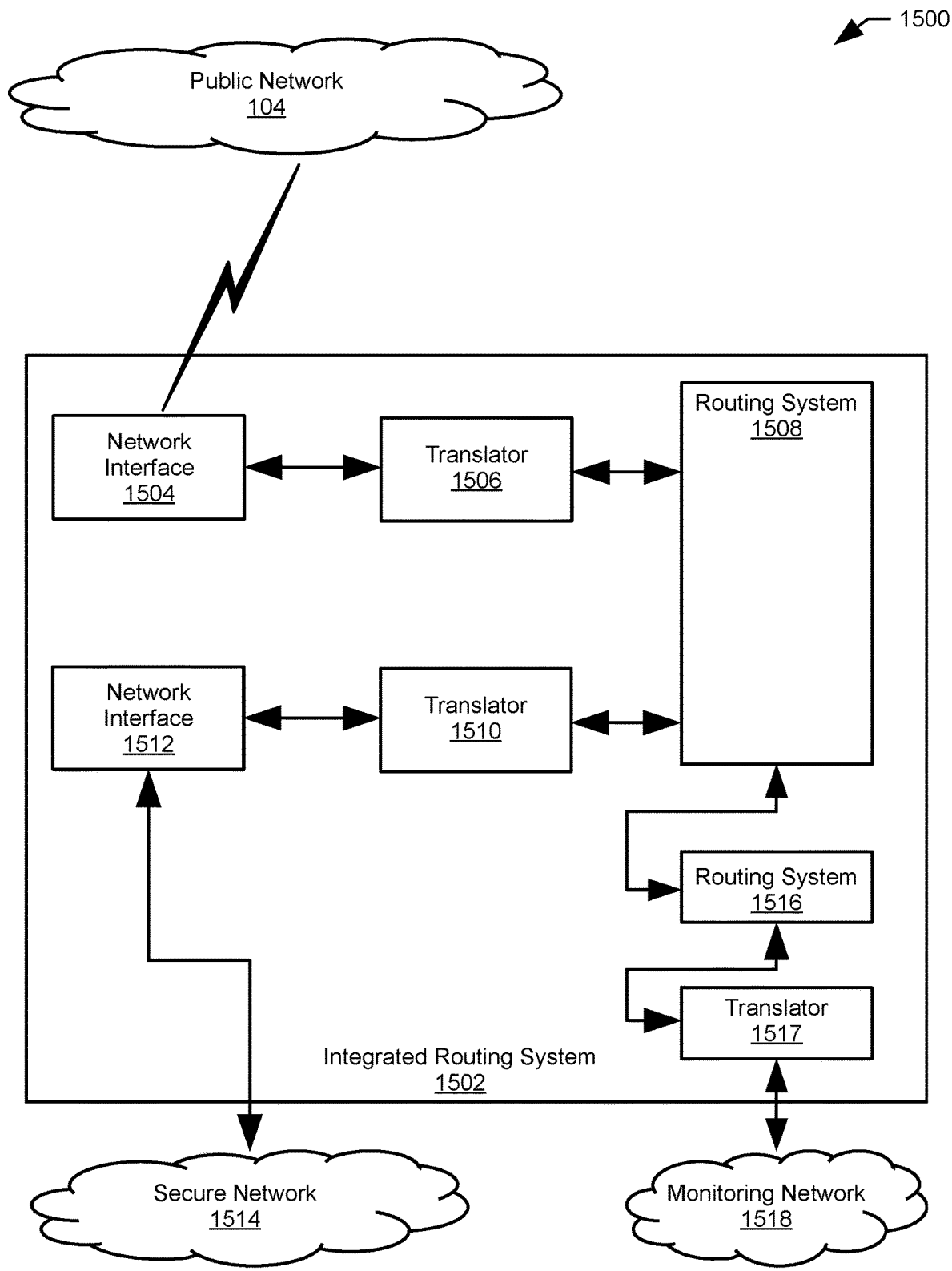
FIG. 15 is a block diagram that depicts an embodiment of an integrated routing system comprising a first routing system disposed between a public network and a secure network, and a second routing system disposed between the first routing system and a monitoring network.

FIG. 15 is a block diagram that depicts an embodiment 1500 of an integrated routing system comprising a first routing system disposed between a public network and a secure network, and a second routing system disposed between the first routing system and a monitoring network. In one embodiment, integrated routing system 1502 contains two routing systems—a routing system 1508 and a monitor routing system 1516. Routing system 1508 is interfaced to public network 104 via translator 1506 and network interface 1504. Routing system 1508 is also interfaced to secure network 1514 via translator 1510 and network interface 1512. Routing system 1508 services user requests to access data from secure network 1514 via the public network 104, following the methods described previously. Monitor routing system 1516 is interfaced with routing system 1508, and with monitoring network 1518. The monitor routing system 1516 acts as a monitoring system that monitors the routing system 1508 via the monitoring network 1518. Translator 1517 interfaces monitor routing system 1516 with monitoring network 1518. In some embodiments, monitoring network 1518 is a separate secure network for additional security.

The routine security protocols associated with routing systems described above ensure that the monitor routing system 1516 is also isolated from the public network. For example, the monitor routing system 1516 can conduct mostly read operations, with minimal write operations to the routing system 1508, wherein the latter is dedicated to performing tasks of a data router. Furthermore, the monitor routing system 1516 and the routing system 1508 can share their own high-level communication syntax that is independent of the communication syntax that is associated with the access to the secure network from the public network. This high-level communication syntax is not made public, and is accessible only to trusted personnel such as system designers and system administrators. In this way, the chances of the monitor routing system 1516 being hacked are minimal. In order to hack into the monitor routing system 1516, an attacker has to hack into the routing system 1508 first. The multiplicative probabilities associated with decoding two uncorrelated language sets makes this task very difficult, with a very small net probability of hacking two routing systems. In any event, if the monitor routing system 1516 detects that the routing system 1508 has been hacked, the monitor routing system 1516 can dissolve the hacked routing system 1508 and isolate the system back end from the public network. In this sense, the monitor routing system 1516 functions as a "guardian's guardian."

In order to provide additional security, temporal burst data transfer modes of operation can be used. Here, both parties at either end of a communication channel agree on a specific time at which data will be transferred. The timing of the data transmission as well as the burst length can be changed with each transaction in order to add pseudorandomness to this exchange process. At the specified time, both parties transfer a burst of data and then stop all transfers. For an eavesdropper, monitoring the channel and accurately intercepting the burst when it occurs is very difficult, thus adding to the security of the system. Also, the enhanced throughput of the integrated routing system 1102 is evident here—fast, short data bursts can be pushed through the system with its enhanced computing power.

Figure 16:
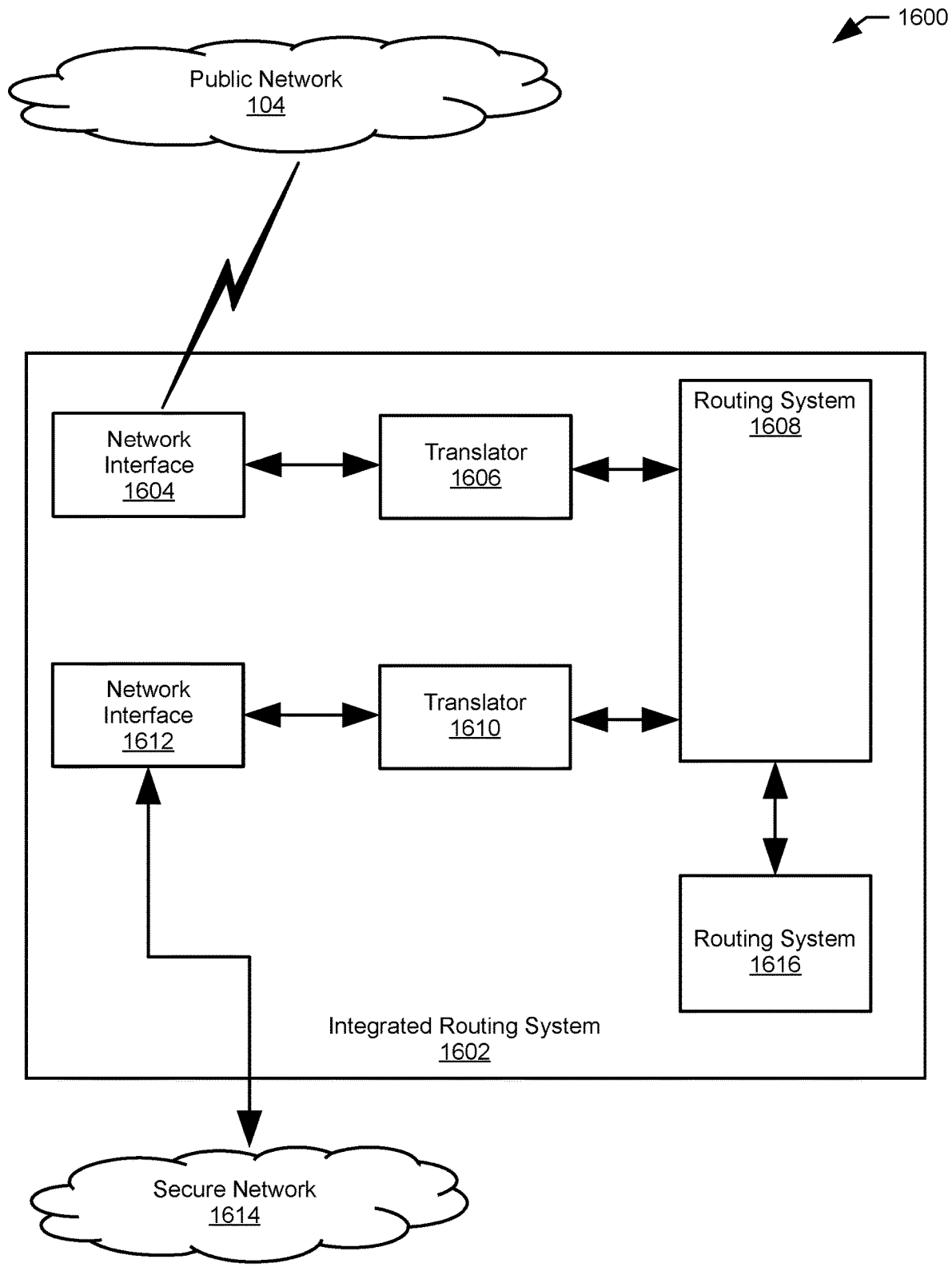
FIG. 16 is a block diagram that depicts an embodiment of a networking system comprising a first routing system disposed between a public network and a secure network, and a second routing system that is coupled to the first routing system.

FIG. 16 is a block diagram that depicts an embodiment 1600 of a networking system comprising a first routing system disposed between a public network and a secure network, and a second routing system that is coupled to the first routing system. This figure shows an embodiment of the routing system—user identity protection. In one embodiment, an integrated routing system 1602 contains two routing systems—a routing system 1608 and an identity protection routing system 1616. Routing system 1608 is interfaced to public network 104 via a translator 1606 and a network interface 1604. Routing system 1608 is also interfaced to a secure network 1614 via a translator 1610 and a network interface 1612. Routing system 1608 services user requests to access data from secure network 1614 via the public network 104, following the methods described previously. Identity protection routing system 1616 handles anonymization and IP scrambling. In addition, identity protection routing system 1616 can also provide authentication and fraud detection functions. The identity protection routing system 1616 can do more than guard a user's information; it can also provide verification functions of a user to routing system 1608 for data transfer. The identity protection routing system 1616 could use biometric data such as fingerprints, while also adding voice recognition as well as GPS and password data. The identity protection routing system 1616 can also perform the function of taking a user's password, login information and voice print from the user and using that for verification. Upon verification, the routing system 1608 is authorized to continue with the transaction. In this sense, the identity protection routing system 1616 functions as a personal routing system, since each user is assigned a unique identity protection routing system. Identity protection routing system 1616 can also act as an alias for a user, so that the user's real identity is never revealed. Also, the identity protection routing system 1616 can perform the function of IP scrambling, which goes further towards protecting identity. The routing system 1608 can link to an application on the mobile device and/or computer of a user, and this application is used to create a secure link to the user's identity protection routing system 1616. All data transfer via the application to and from the routing system 1608 is monitored by the identity protection routing system 1616. It should also be noted that to maintain secure data for uses by router 1616 there may be a small secure database incorporated inside router 1616. This database can be contained in a non-volatile memory device or disk drive. It can also be configured to be tamper proof such that physical disturbance destroys the secure data in the system.

Figure 17:
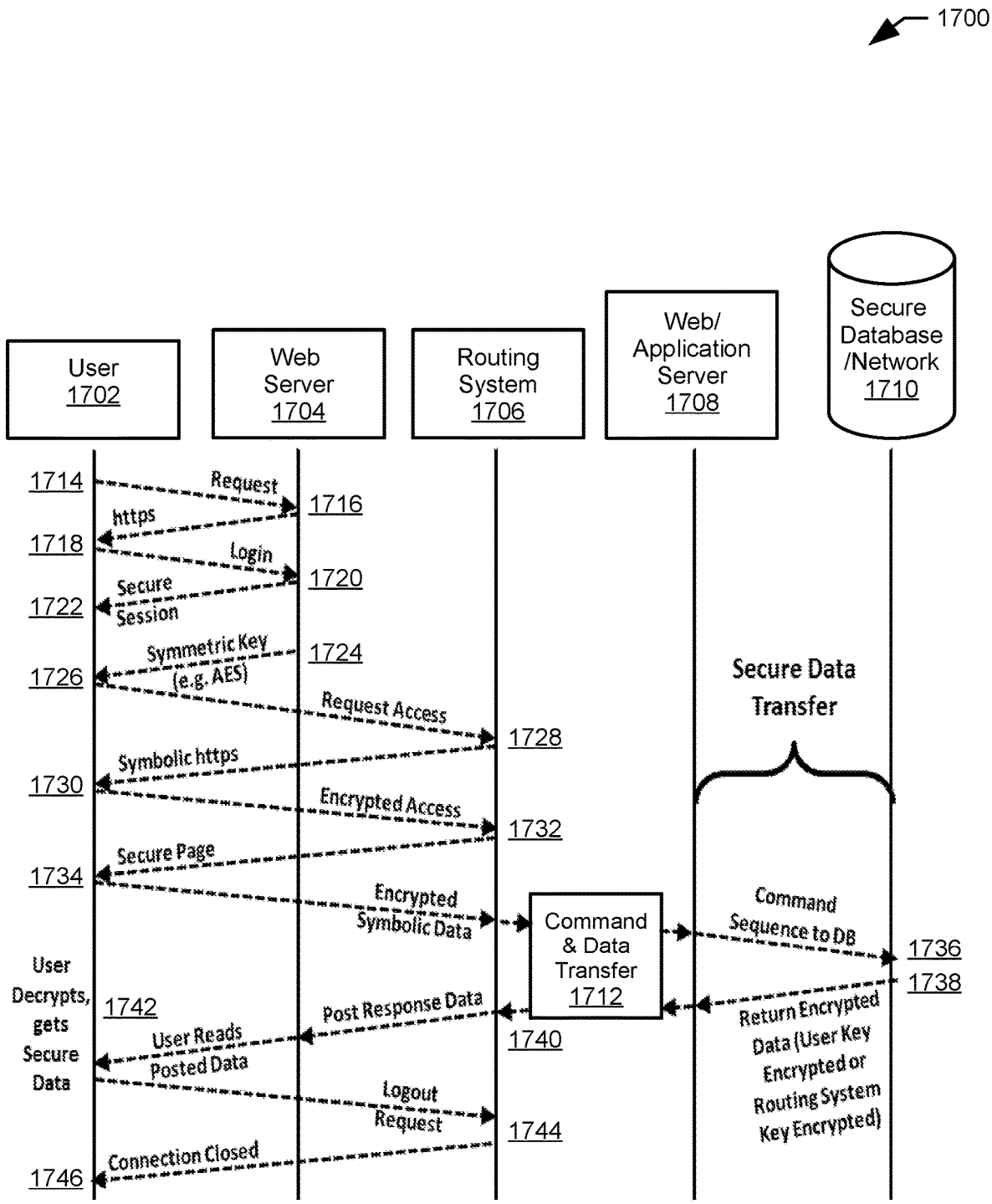
FIG. 17 depicts an information flow associated with an example user interaction with a secure database or secure network via the routing system.

FIG. 17 depicts an information flow 1700 associated with an example user interaction with a secure database or secure network via the routing system. The figure shows a user 1702, a web server 1704, a routing system 1706, a web/application server 1708, and a secure database/network 1710, with functions as described in the preceding sections. In one embodiment, user 1702 wishes to read data from the secure database/network 1710. At 1714, the user 1702, via a client browser, sends a login request to web server 1704. At 1716, the web server 1704 responds with an https session initialization. The user 1702 logs in with a user name and password at 1718 and at 1720 an https secure session is established between client and the web server in the industry standard way, and presented to the user 1702 at 1722. Upon the establishment of an https secure connection, the web server 1704 exchanges a secure symmetric encryption key with the user 1702 at 1724. Symmetric key exchange is well-known in the prior art, and can take the form of the Advanced Encryption Standard (AES) key exchange protocol. At 1726, the user 1702 requests the routing system 1706 for access. What follows at 1728 is the establishment of a "symbolic https" connection between the routing system 1706 and the client browser of the user 1702. This process, unique to the routing system concept, is an extension of the higher-level communication syntax described in the preceding sections. This version of https is the same public/private key encryption scheme used in standard computer communications with the difference that only a character set (symbol set) that can be entered into a web server form can be used. Symbolic https is based on the same principle of key sharing as is done via regular https, only that in the case of symbolic https, all data that is being shared, including encryption keys, is shared via a symbolic higher-level communication syntax. Once the symbolic connection is established the routing system 1706 sends a symmetric encryption key (this may be an AES key for example) at 1728 back to the client browser of the user 1702 to use to encrypt any messages sent to the routing system 1706. If this approach is used then any messages are encrypted by this symmetric encryption key rather than the public encryption key of the destination. Next, at 1730, the user 1702 logs into system using user password H encrypted with destination key D. The web server 1704 receives the encrypted user password, HD, which is passed via the symbolic link to the routing system 1706 which decrypts it with destination key, D*, to retrieve the user password as HDD*. The web server 1704 then hashes the user password H, which is then used to authenticate the user 1702. The password is then destroyed.

As an optional step, if further authentication is desired the routing system 1706 then requests additional authentication from user 1702, for example, via a separate authentication channel, such as texts to the mobile device of the user 1702. Further authentication methods include biometrics (iris images, voice recognition, fingerprints, etc.), GPS, further passwords, personal questions, routing system-generated codes and so on. The advantage of this feature is that it provides greatly enhanced security; even if an attacker compromises the password login method, the additional authentication creates assurance that the user 1702 is correct. Also the use of the independent channel for authentication can further enhance the certainty of user identity, and the associated symbolic https connection ensures that an attacker has a very small likelihood of compromising the authentication and data transfer process. Once symbolic keys are shared, all communication is performed via this symbolic https protocol.

It is important to note that from this point on, all communication takes place via a symbolic https, under additional protection of AES encryption. In other words, all commands, requests and data that are passed between the client browser of the user 1702 and the routing system 1706 are encrypted with the symbolic encryption keys such that all information can pass through the symbolic link between the routing system 1706 and web server 1704.

One way to see how this can work is by thinking of a webpage posted by the web server 1704. The web server 1704 is connected to the public network 104 (not shown) and thus must be considered unsecure. However text posted into the webpage by the client browser of the user 1702 is encrypted by the 'symbolic key' and the questions posted in the webpage from the routing system 1706 can be encrypted as well. Thus to anyone who compromises the webserver they can see a webpage where the questions and answers are posted but they are encrypted so as not to be understandable.

At 1732, the routing system 1706 presents a limited set (something like a pick-list) of available options to user on a secure page via the encrypted API. The user 1702 cannot select any option than what is presented to him or her. In this way only a limited set of functions exist that the routing system 1706 can perform is available, thus preventing the routing system 1706 from being able to be commanded to perform tasks that might compromise the data.

In one embodiment, at 1734, the user 1702 requests option $O_1$ on the webpage presented by the routing system 1706, for example retrieving a secure data file from secure database/network 1710. This request is encrypted with the symbolic encryption key $S_1$ and sent to the destination as $O_1S_1$. The routing system 1706 receives the request and decrypts the request using the corresponding symbolic key as $O_1S_1S_1^*$. The routing system 1706 requests record R stored in the secure database/network 1710 via the command and data transfer block 1712, which acts as a translator, that sends a command sequence to the secure database/network 1710 via secure internal data transfer 1736 to the separate secure database/network 1710. Thus in the way that symbols are used to send the request from the client browser of the user 1702 to the routing system 1706, similar methods can be used for the routing system 1706 to execute a secure application that retrieves the data from the secure database/network 1710. At 1738, the secure database/network 1710 encrypts the requested record with the symbolic https encryption key and posts the response data for the user 1702 as $RS_2$, wherein R is the record and $S_2$ is the symbolic https encryption key.

At this point 1740, there are several options. If the symbolic https encryption key $S_2$ used by the secure database/network application is the same as that used for the transaction from the routing system 1706 to the user 1702, then the data is simply forwarded by the routing system 1706 to the user 1702 as $RS_2$. If the symbolic https encryption key $S_2$ is different from the key $S_1$ then the routing system 1706 must decrypt the data with the key $S_2^*$ and re-encrypt the data with key $S_1$ before sending the data to the user 1702. At 1742, the user 1702 reads and decrypts the posted data in order to receive the record and decrypts the record using the appropriate symbolic encryption key $RS_2S_2^*$, or $RS_1S_1^*$ depending on which encryption key is used.

At 1744 user 1702 requests logout, and the secure connection is terminated by the routing system 1706 at 1746; the routing system 1706 can optionally be removed, purging all memory contents. If the user 1702 forgets to request a logout, then the routing system 1706 can autonomously terminate the connection after a period of time (server timeout).

It is important to also note that there can be a further layer of encryption where the user 1702 has encrypted the data stored on the secure database/network 1710 using some secret key held by the user 1702 which further protects the data. Of course if the user 1702 loses the secret key this data is lost forever.

The use of symbolic https is a critical aspect of this system, since it allows the AES encrypted data to pass from the web server 1704 to the routing system 1706 via the "Routing System Vision" algorithm, while any exploits of the stack are blocked by the fact that the public network 104 (not shown) has no standard connection to the routing system 1706. This eliminates the possibility of a man-in-the-middle attack that uses an exploit in the web server 1704 to capture credentials of the user 1702. Client authentication via further identifying information and/or an independent channel is also key to system security; such an implementation makes it that much more difficult for an attacker to pose as the user 1702 in order to intercept and hack into any data being transmitted over the public network 104 (not shown). Authentication via the alternate channel can include one or multiple methods such as user biometric information (fingerprinting, iris imaging, voice recognition and so on), encrypted codes, or even personal questions drawn from a secure database of personal information (e.g. past addresses, past employment history, past bank accounts and so on).

Figure 18:
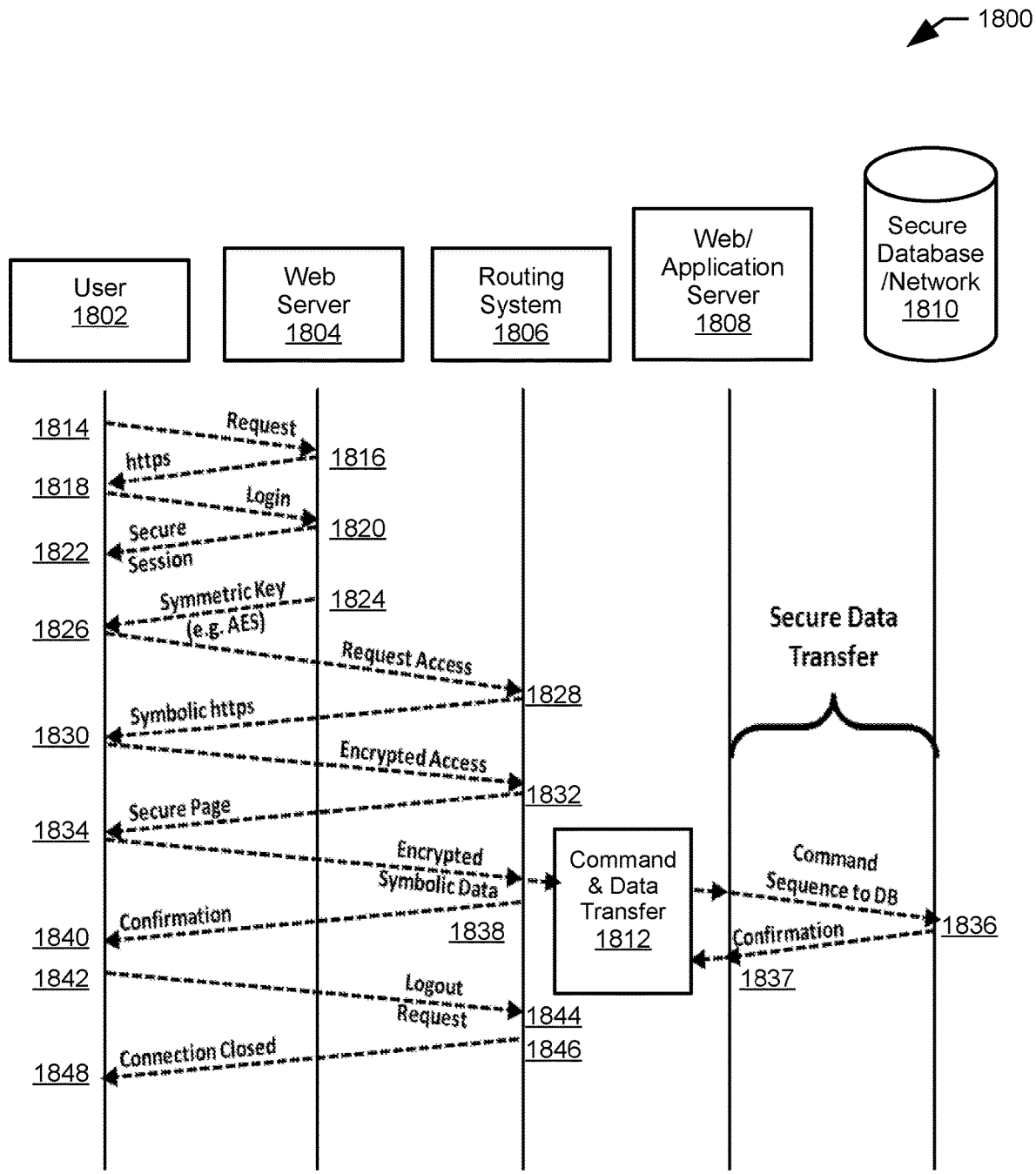
FIG. 18 depicts an information flow associated with another example user interaction with a secure database or secure network via the routing system.

FIG. 18 depicts an information flow 1800 associated with another example user interaction with a secure database or secure network via the routing system. The figure shows a user 1802, a web server 1804, a routing system 1806, a web/application server 1808, and a secure database/network 1810, with functions as described in the preceding sections. In one embodiment, user 1802 wishes to write data to the secure database/network 1810. At 1814, the user 1802, via a client browser, sends a login request to web server 1804. At 1816, the web server 1804 responds with an https session initialization. The user 1802 logs in with a user name and password at 1818 and at 1820 an https secure session is established between client and the web server in the industry standard way, and presented to the user 1802 at 1822. Upon the establishment of an https secure connection, the web server 1804 exchanges a secure symmetric encryption key with the user 1802 at 1824. Symmetric key exchange is well-known in the prior art, and can take the form of the Advanced Encryption Standard (AES) key exchange protocol. At 1826, the user 1802 requests the routing system 1806 for access. What follows at 1828 is the establishment of a "symbolic https" connection between the routing system 1806 and the client browser of the user 1802. This process, unique to the routing system concept, is an extension of the higher-level communication syntax described in the preceding sections. This version of https is the same public/private key encryption scheme used in standard computer communications with the difference that only a character set (symbol set) that can be entered into a web server form can be used. Symbolic https is based on the same principle of key sharing as is done via regular https, only that in the case of symbolic https, all data that is being shared, including encryption keys, is shared via a symbolic higher-level communication syntax. Once the symbolic connection is established the routing system 1806 sends a symmetric key (this may be an AES key for example) at 1828 back to the client browser of the user 1802 to use to encrypt any messages sent to the routing system 1806. If this approach is used then any messages are encrypted by this symmetric key rather than the public encryption key of the destination. Next, at 1830, the user 1802 logs into system using user password H encrypted with destination key D. The web server 1804 receives the encrypted user password, HD, which is passed via the symbolic link to the routing system 1806 which decrypts it with destination key, D*, to retrieve the user password as HDD*. The web server 1804 then hashes the user password H, which is then used to authenticate the user 1802. The password is then destroyed.

As an optional step, if further authentication is desired the routing system 1806 then requests additional authentication from user 1802, for example, via a separate authentication channel, such as texts to the mobile device of the user 1802. Further authentication methods include biometrics (iris images, voice recognition, fingerprints, etc.), GPS, further passwords, personal questions, routing system-generated codes and so on. The advantage of this feature is that it provides greatly enhanced security; even if an attacker compromises the password login method, the additional authentication creates assurance that the user 1802 is correct. Also the use of the independent channel for authentication can further enhance the certainty of user identity, and the associated symbolic https connection ensures that an attacker has a very small likelihood of compromising the authentication and data transfer process. Once symbolic keys are shared, all communication is performed via this symbolic https protocol.

It is important to note that from this point on, all communication takes place via a symbolic https, under additional protection of AES encryption. In other words, all commands, requests and data that are passed between the client browser of the user 1802 and the routing system 1806 are encrypted with the symbolic encryption keys such that all information can pass through the symbolic link between the routing system 1806 and web server 1804.

One way to see how this can work is by thinking of a webpage posted by the web server 1804. The web server 1804 is connected to the public network 104 (not shown) and thus must be considered unsecure. However text posted into the webpage by the client browser of the user 1802 is encrypted by the 'symbolic key' and the questions posted in the webpage from the routing system 1806 can be encrypted as well. Thus to anyone who compromises the webserver they can see a webpage where the questions and answers are posted but they are encrypted so as not to be understandable.

At 1832, the routing system 1806 presents a limited set (something like a pick-list) of available options to user on a secure page via the encrypted API; the user 1802 cannot select any option than what is presented to him or her. In this way only a limited set of functions exist that the routing system 1806 can perform is available, thus preventing the routing system 1806 from being able to be commanded to perform tasks that might compromise the data.

In one embodiment, at 1834, the user 1802 requests option $O_2$ on the webpage presented by the routing system 1806, for example sending data file to secure database/network 1810. This request along with the corresponding data file are encrypted with the symbolic encryption key $S_1$ and sent to the destination as $O_2S_1$. The routing system 1806 receives the request and decrypts the request and data file using the corresponding symbolic key as $O_2S_1S_1^*$. The routing system 1806 establishes a secure communication path to the secure database/network 1810. The routing system 1806 encrypts the data to send to the secure database/network 1810, where the data is decrypted and written to the database/network 1810. This process is accomplished at 1836, via command and data transfer block 1812 that sends a command and data sequence to the secure database/network 1810 via secure internal data transfer. The secure database/network 1810 accepts the requested data and stores it. At 1837, the secure database/network 1810 responds with a confirmation to the web/application server, causing the command and data transfer 1812 to generate a confirmation to the user at 1838.

Since the routing system 1806 to secure database/network 1810 link, under certain implementations, may be considered secure then it may be permissible to write the data directly into the secure database/network 1810 without special encryption. However, in general the communication between the routing system 1806 and the secure database server should also be encrypted.

The routing system 1806 sends confirmation to the user that file transfer has been successful at 1838, received by the user at 1840. If needed, the user 1802 can encrypt the file with his or her own secret key that is not shared with anyone. The file is thus stored encrypted on the secure database/network 1810. Of course, if the encryption key is lost then the user 1802 loses the ability to access to the data in the file forever.

After successfully transferring the file, the user 1802 requests a logout at 1842, received by the routing system 1806 at 1844, and the routing system 1806 responds at 1846 by closing the connection with a confirmation message to the client browser of the user 1802 at 1848. If the user 1802 does not request a logout, then for security purposes the connection can be timed out by the routing system 1806. If required, the routing system 1806 can be eliminated, with the result that all memory contents are purged.

In another embodiment that combines the embodiments 1700 and 1800, one user, User 1, wishes to send a data file to another user, User 2. Both users are assumed to be legitimate users of the system, with each having their own independent user account. The users individually log into the system as discussed above, with separate symbolic https connections being used for the all data transfer, and independent multi-channel authentication being used for each user. A routing system serves as an intermediary between the public network and the secure database/network, with both the routing system and the secure database/network being isolated from each other and from the public network. The key addition to this case over the two examples discussed above is user identity within the secure database/network. In order to exchange files and other information, user profiles must be stored in the secure database. After logging in, User 1 selects the option of sending a file to a registered user on the database. The user is asked to enter a form of identification that corresponds to the profile of User 2, assuming that User 2 has voluntarily shared this information with User 1 a priori. Once again, the keystrokes and other inputs of User 1 are converted to symbolic https as discussed earlier, and transmitted to the secure database via the symbolic https protocol. User 1 is prompted to transfer the file to the secure database, where it is stored. The system then, via the symbolic https protocol, sends a notification to User 2 on the encrypted API, that a file from User 1 is awaiting download. User 2 has the option of canceling the transfer, in which case the file is deleted from the secure database, or User 2 can download the file. In either case, User 1 is notified accordingly. The file transfer to User 2 takes place just as discussed in the first example. If required, User 1 can encrypt the file with a key, and this key can be shared separately with User 2.

Figure 19:
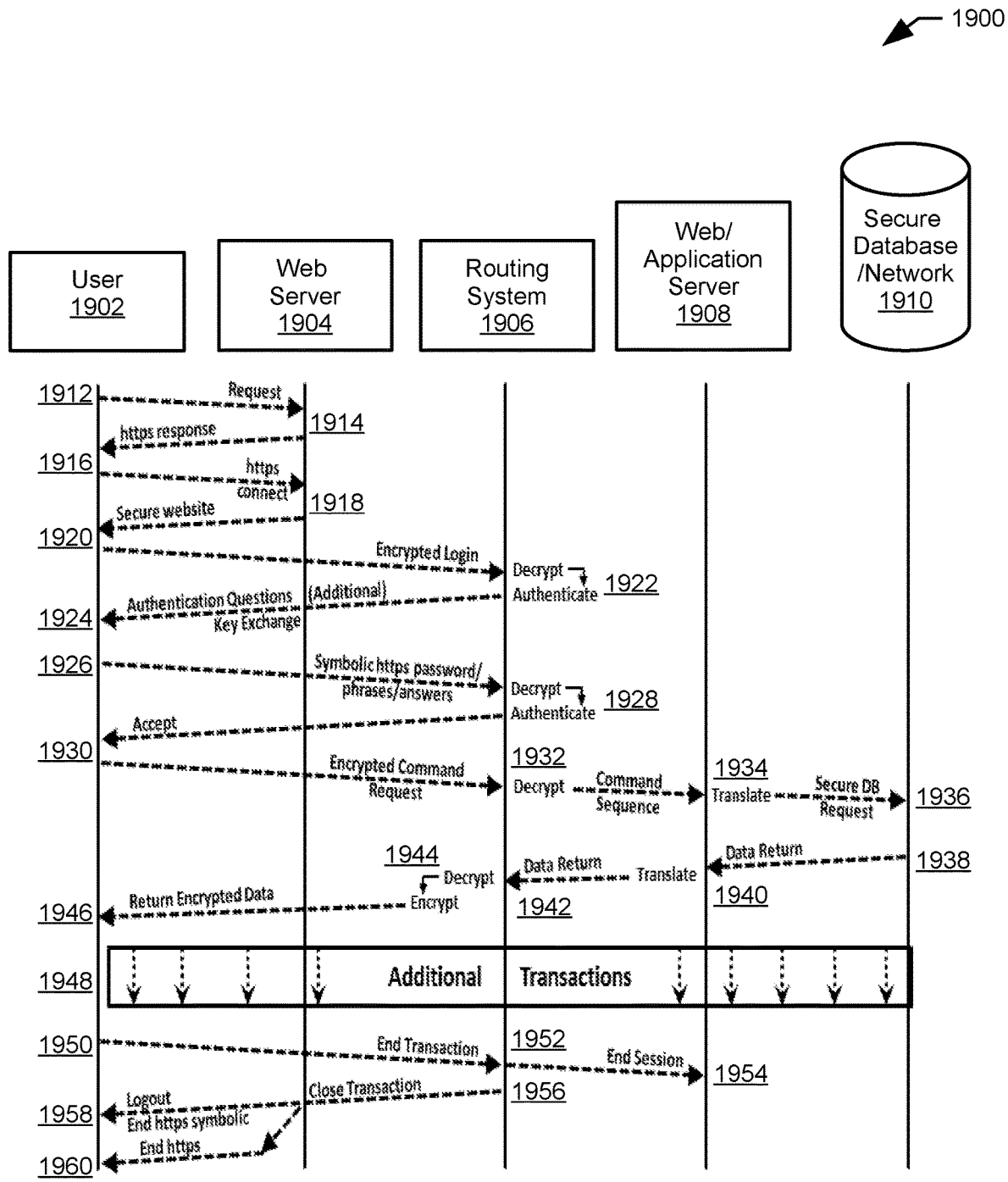
FIG. 19 depicts an information flow associated with another example user interaction with a secure database or secure network via the routing system.

FIG. 19 depicts an information flow 1900 associated with another example user interaction with a secure database or secure network via the routing system. This figure shows a detailed and more generalized sequence of operations based on 1700 and 1800. The figure shows a user 1902, a web server 1904, a routing system 1906, a web/application server 1908, and a secure database/network 1910, with functions as described in the preceding sections. At 1912, the user 1902 first submits a login request to the web server 1904, which sends back an https response to the user 1902 at 1914. The user 1902 then submits an https connection request at 1916, to which the web server 1904 responds with a secure website at 1918. The handshake process is conducted via a standard secure handshaking and authentication protocol, including verifying and sharing certificates. Once this step has been accomplished, the web server 1904 presents the user 1902 with a secure website at 1918, via which the user submits login information. The encrypted login information of the user 1902 is transmitted to the routing system 1906 at 1920, which reads in this data appropriately translated into a higher level symbolic language. Upon the decryption of this login information and after successfully authenticating the user 1902 at 1922, the routing system 1906 sends back additional authentication questions to the user 1902. This process can be done via an independent authentication channel (e.g. by simultaneously connecting the routing system 1906 to a mobile network). At this point 1922, the routing system 1906 and the computing device of user 1902 share symmetric encryption keys. These keys include standard encryption keys (e.g. AES), as well as higher level symbolic https keys (e.g. chaotic sequence keys) that the routing system 1906 uses to communicate with the client browser of the user 1902. From this point on, all communication between the client 1902 and the routing system 1906 is via this higher level symbolic https protocol. The client browser of the user 1902 responds back with the symbolic https password along with the phrases or answers to the security questions at 1924. If all the questions are correctly answered based on decryption and authentication at 1926, then the routing system 1906 accepts the login request at 1928, and the user 1902 is now fully logged into the system.

The user can now send encrypted commands and/or requests to the routing system 1906. For example, the user can request access to a secure database via the routing system 1906 at 1930. All commands and requests are sent to the routing system 1906 via symbolic https, and these commands are decrypted at 1932 by the routing system 1906 before being sent to the web/application server 1908 at 1934. The commands from the routing system 1906 to the web/application server 1908 are once again in a higher level format (e.g. via a virtual mouse and/or keyboard combination). The web/application server 1908 translates these requests into the appropriate format for the secure database access at 1936. The secure database/network 1910 returns the requested data at 1938, which is then translated into the higher level format routing system 1906 language by the web/application server 1908 at 1940 and transmitted to the routing system 1906 at 1942. If the data is stored encrypted by the routing system 1906, then this data is decrypted, and then re-encrypted by the symbolic https key that had been shared earlier between the routing system 1906 and the client browser of the user 1902 at 1944. This encrypted data is returned to the client browser of the user 1902 at 1946, where it is decrypted and used as required. Multiple such transactions can occur, depending on the user's need, shown by 1948. At the end of the transaction, the user 1902 requests that s/he be logged out at 1950. The routing system 1906 responds by sending a command to the web/application server 1904 at 1952 and 1954 to end the session, while at 1956 also ending the symbolic https and regular https sessions at 1958 and 1960 respectively, with the user 1902, thus terminating the secure symbolic https connection.

If there is also a routing system present at the user side of the transaction (not shown) there can be significant security and usability enhancements. The user side routing system can perform all of the symbolic encryption operations for the user to assure secure data transfer. It can also aid in authentication of the user and the secure database target. Finally the user side routing system can allow legacy applications to be used that are unable to encrypt output data to avail of the highest level of security possible if their communications are routed through the user side routing system.

Figure 20:
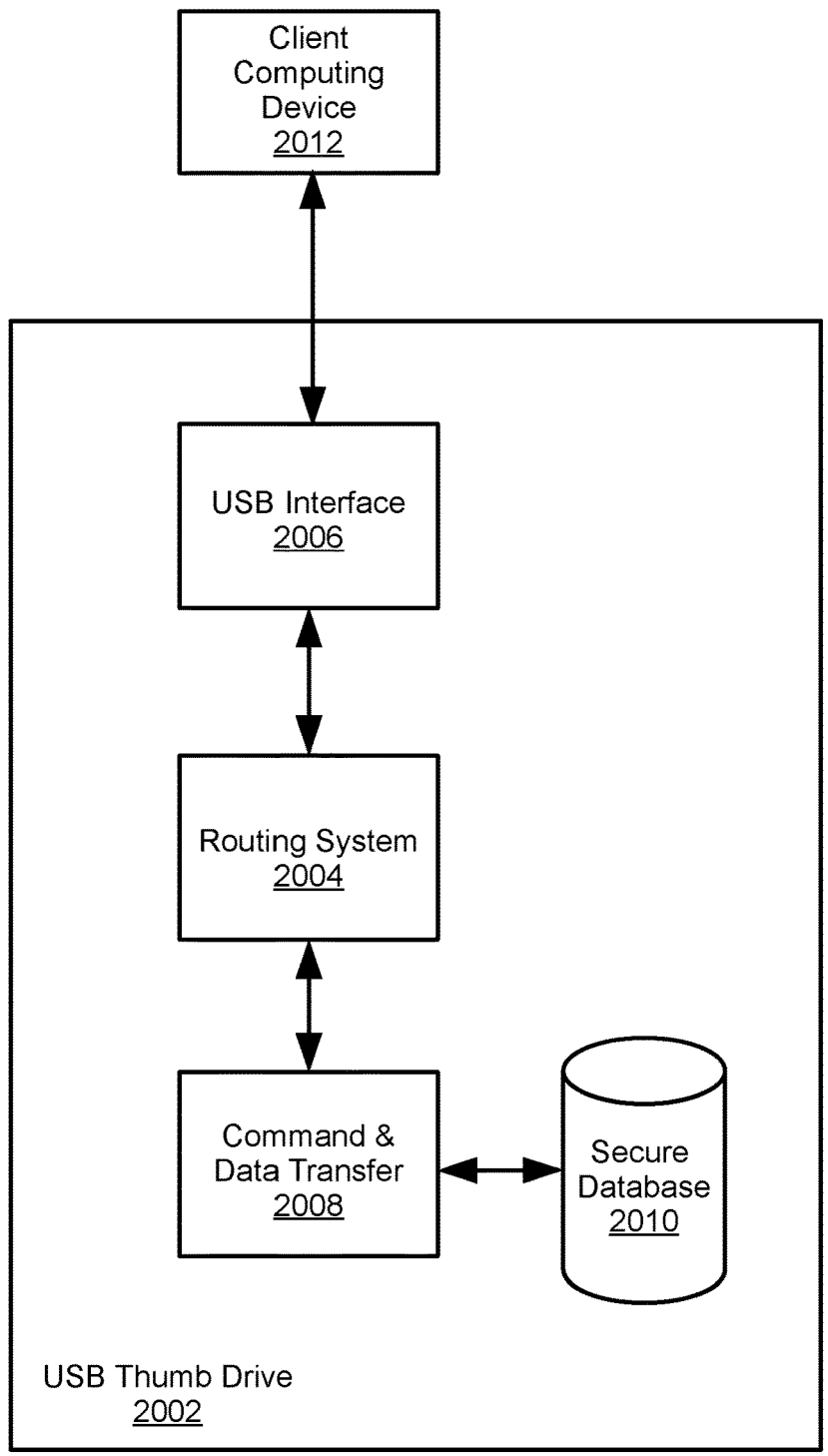
FIG. 20 is a block diagram that depicts an embodiment of the routing system on a USB device such as a thumb drive.

FIG. 20 is a block diagram that depicts an embodiment 2000 of the routing system on a USB device such as a thumb drive. Some embodiments comprise a USB thumb drive 2002, which is interfaced with a client computing device 2012 via a USB interface 2006. In some embodiments, the USB interface 2006 may work in conjunction with, or be replaced by, equivalent interfaces in the present or in the future, which may perform equivalent functions of the USB interface 2006. In some embodiments, a client computing device 2012 can include a desktop computer, a laptop computer, a mobile device with USB connectivity, or any other device with USB connectivity capable of connecting to public network 104 (not shown). A routing system 2004 interfaces with secure database 2010 via command and data transfer 2008. Routing system also interfaces with USB interface 2006. The basic principles of the routing system discussed earlier apply to the operation of the system 2002, including the security features offered by routing system, as well as the isolation of both the routing system 2004 and the secure database 2010 from the client computing device 2012.

Figure 21A:
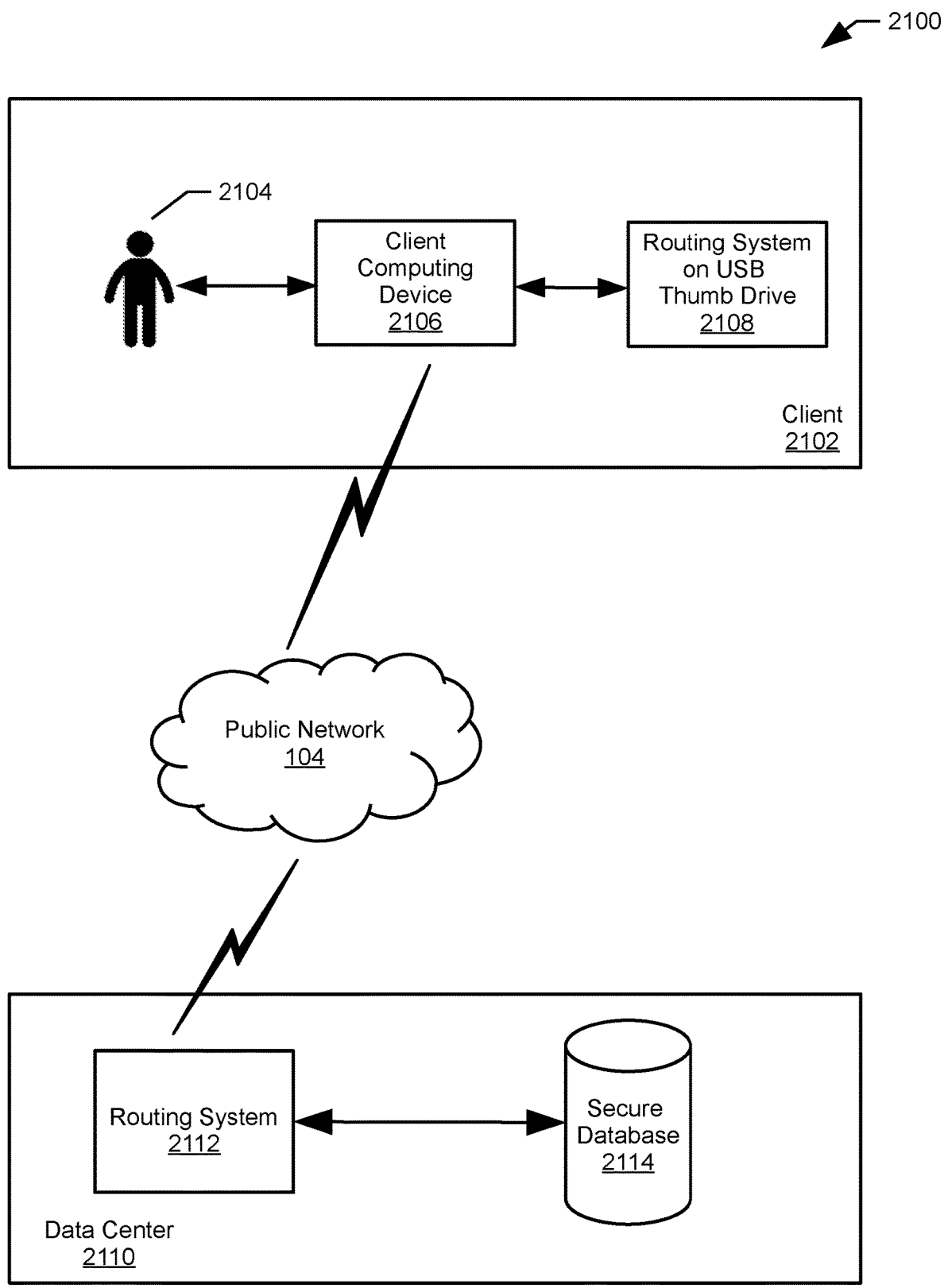
FIG. 21a is a block diagram that depicts an embodiment of the routing system embodied on a USB device, such as a thumb drive.

FIG. 21*a* is a block diagram that depicts an embodiment 2100 of the routing system embodied on a USB device such as a thumb drive. In one embodiment, client 2102 wishes to access secure database 2114 in data center 2100 via public network 104. Client 2102 comprises human user 2104, client computing device 2106, and routing system on USB thumb drive 2108 as presented in 2000. In some embodiments, client computing device 2106 can include a desktop computer, a laptop computer, a mobile device with USB connectivity, or any other device with USB connectivity also capable of connecting to public network 104. Data center additionally contains routing system 2112, which interfaces with public network 104. In this embodiment, routing system 2112 has all the essential functionalities described previously. Routing system on USB thumb drive 2108 connects to the client computing device 2106 via a USB connection. Thus, instead of directly connecting to the public network 104, the routing system on USB thumb drive 2108 connects to the client computing device 2106 via a USB connection. The secure user data is stored on the routing system on USB thumb drive 2108 in an encrypted format, as discussed in the description for 2000. When the routing system on USB thumb drive 2108 is plugged into the client computing device 2108, it first authenticates the human user 2104 before allowing any connection between the secure database on the routing system on USB thumb drive 2108 and the client computing device 2106. Once a secure connection between the routing system on USB thumb drive 2108 and the client computing device 2106 is established, the routing system on USB thumb drive 2108 can then initialize a secure symbolic https connection with the routing system 2112 in order to carry out the desired transaction of the human user 2104. Here, the routing system on USB thumb drive 2108 acts both as an authentication manager (for the local client access) as well as the encryption manager. In order to further enhance security, the routing system on USB thumb drive 2108 can optionally be made to be a one-time use routing system, which self-destructs after each operation. By doing so, the routing system on USB thumb drive 2108 purges all memory contents, eliminating any data that can be extracted in case the USB device is stolen. Also, the routing system on USB thumb drive 2108 can be made to have a certain lifespan, self-destructing if not used (or re-used) within a certain amount of time. All the features of the routing system described earlier, including the severing of direct connection with the standardized software stacks, along with the symbolic routing system-to-routing system communication syntax, are incorporated in the routing system on USB thumb drive 2108. In this case, the routing system on USB thumb drive 2108 is disconnected from both the USB software stack and the network stack of the client computing device 2106. This is important in order to minimize the probability of attack via either or both of these two standardized communication channels.

Figure 21B:
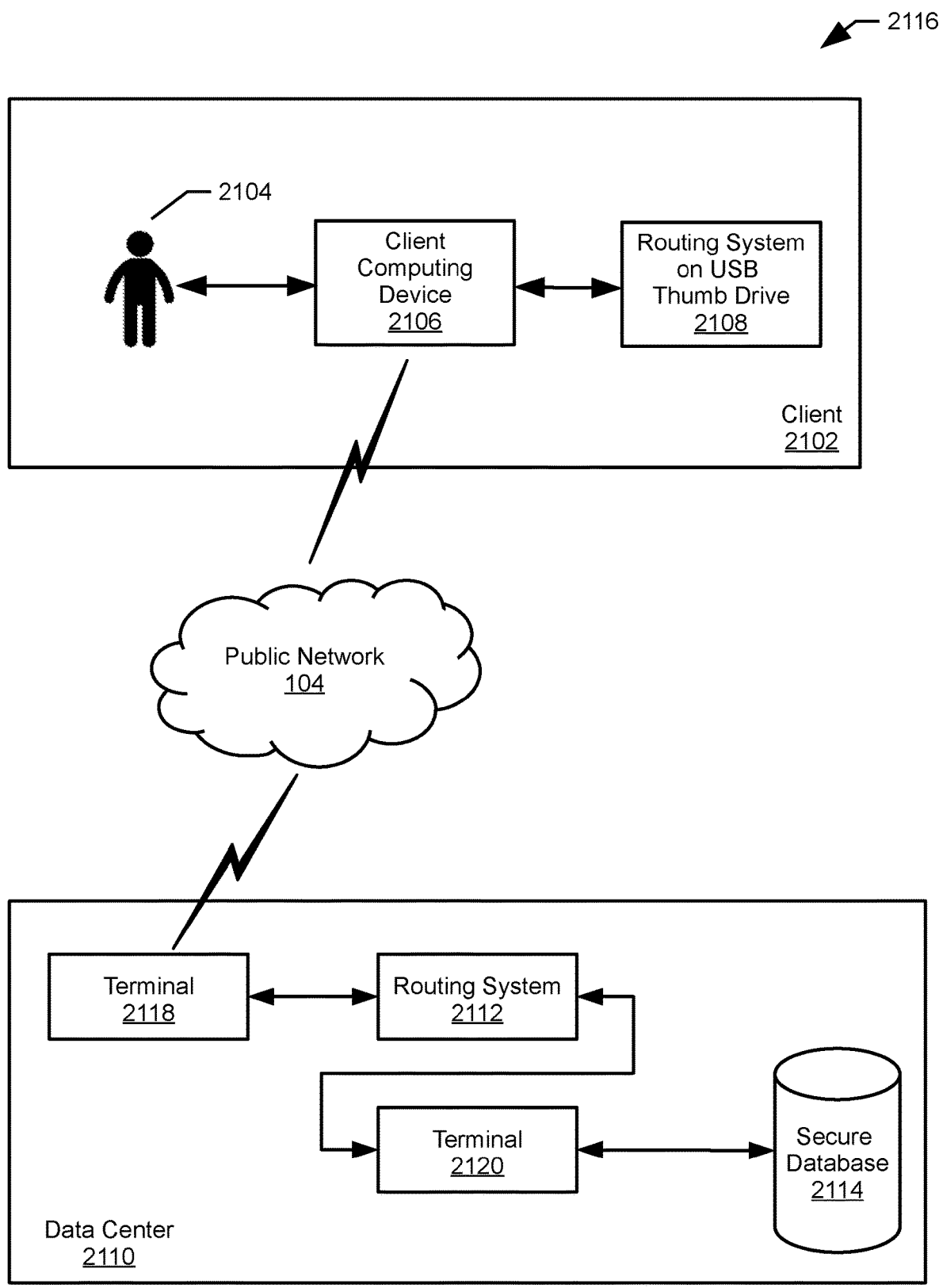
FIG. 21b is a block diagram that depicts another embodiment of the routing system embodied on a USB device, such as a thumb drive.

FIG. 21b is a block diagram that depicts another embodiment 2116 of the routing system embodied on a USB device such as a thumb drive. In one embodiment, client 2102 wishes to access secure database 2114 in data center 2100 via public network 104. Client 2102 comprises human user 2104, client computing device 2106, and routing system on USB thumb drive 2108 as presented in 2000. In some embodiments, client computing device 2106 can include a desktop computer, a laptop computer, a mobile device with USB connectivity, or any other device with USB connectivity also capable of connecting to public network 104. Data center additionally contains routing system 2112, which interfaces with public network 104 via terminal 2118. Routing system also interfaces with the secure database 2114 via terminal 2120. Terminal 2118 and 2120 have the same functionality described earlier. In this embodiment, routing system 2112 has all the essential functionalities described previously. Routing system on USB thumb drive 2108 connects to the client computing device 2106 via a USB connection. Thus, instead of directly connecting to the public network 104, the routing system on USB thumb drive 2108 connects to the client computing device 2106 via a USB connection. The secure user data is stored on the routing system on USB thumb drive 2108 in an encrypted format, as discussed in the description for 2000. When the routing system on USB thumb drive 2108 is plugged into the client computing device 2108, it first authenticates the human user 2104 before allowing any connection between the secure database on the routing system on USB thumb drive 2108 and the client computing device 2106. Once a secure connection between the routing system on USB thumb drive 2108 and the client computing device 2106 is established, the routing system on USB thumb drive 2108 can then initialize a secure symbolic https connection with the routing system 2112 in order to carry out the desired transaction of the human user 2104.

Here, the routing system on USB thumb drive 2108 acts both as an authentication manager (for the local client access) as well as the encryption manager. In order to further enhance security, the routing system on USB thumb drive 2108 can optionally be made to be a one-time use routing system, which self-destructs after each operation. By doing so, the routing system on USB thumb drive 2108 purges all memory contents, eliminating any data that can be extracted in case the USB device is stolen. Also, the routing system on USB thumb drive 2108 can be made to have a certain lifespan, self-destructing if not used (or re-used) within a certain amount of time. All the features of the routing system described earlier, including the severing of direct connection with the standardized software stacks, along with the symbolic routing system-to-routing system communication syntax, are incorporated in the routing system on USB thumb drive 2108. In this case, the routing system on USB thumb drive 2108 is disconnected from both the USB software stack and the network stack of the client computing device 2106. This is important in order to minimize the probability of attack via either or both of these two standardized communication channels.

Figure 22:
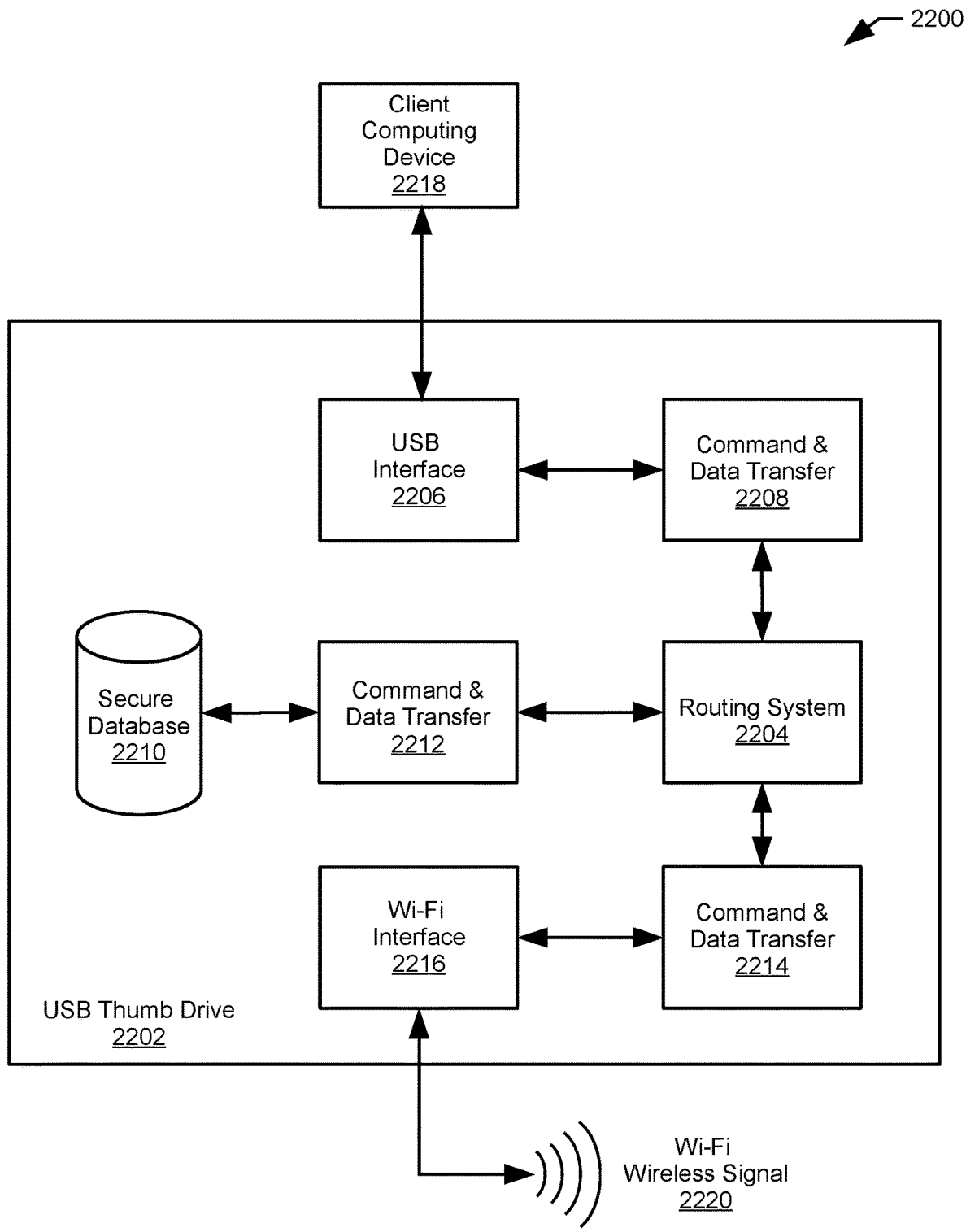
FIG. 22 is a block diagram that depicts an embodiment of the routing system on a USB device, such as a thumb drive, and configured to wirelessly connect to a network using a standard wireless protocol such Wi-Fi®.

FIG. 22 is a block diagram that depicts an embodiment 2200 of the routing system on a USB device such as a thumb drive, and configured to wirelessly connect to a network using a standard wireless protocol such Wi-Fi®. In one embodiment, a USB device such as a USB thumb drive 2202 is interfaced with client computing device 2218 via USB interface 2206. Routing system 2204, instantiated within USB thumb drive 2202, is interfaced command and data transfer block 2208 which, in turn, is interfaced with client computing device 2218 via USB interface 2206. In some embodiments, client computing device 2218 can include a desktop computer, a laptop computer, a mobile device with USB connectivity, or any other device with USB connectivity. Routing system 2204 is also interfaced with secure database 2210, also contained within USB thumb drive 2202, via command and data transfer block 2212. Routing system is also interfaced with Wi-Fi interface 2216, via command and transfer block 2214. The Wi-Fi interface 2218 interfaces with a standard Wi-Fi wireless network as is well known in the art, using Wi-Fi wireless signal 2220. In this embodiment, routing system 2204 and secure database 2210 are both individually isolated from both the client computing device 2218 and Wi-Fi network to which the Wi-Fi interface is interfaced. Furthermore, the configuration of this system also ensures that the client computing device 2218 is isolated from the Wi-Fi network to which the Wi-Fi network is interface 2216 is interfaced. Details of the operation of this system are provided subsequently.

Figure 23A:
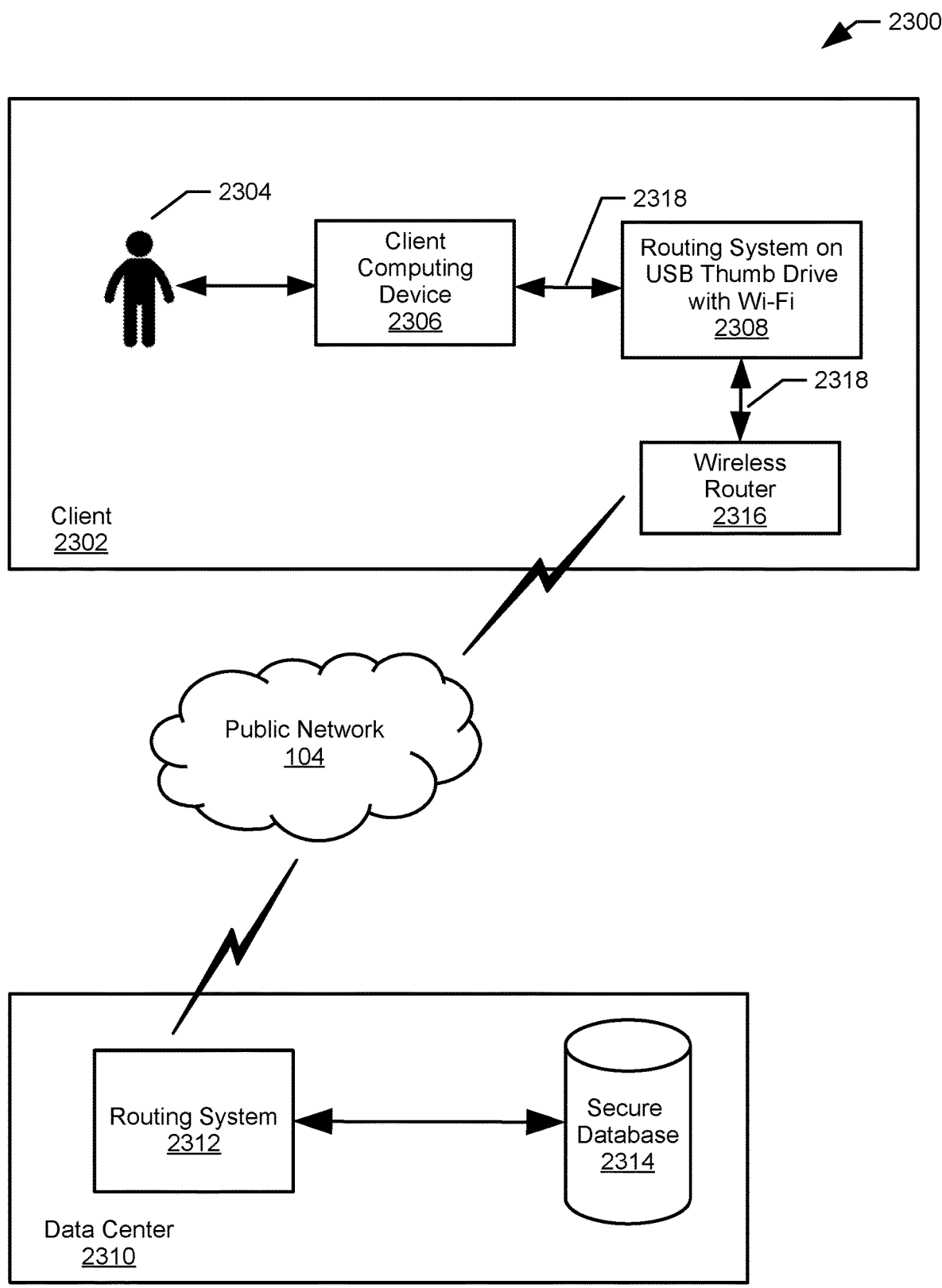
FIG. 23a is a block diagram that depicts an embodiment of the routing system embodied on a USB device and configured to wirelessly connect to a network using a standard wireless protocol such Wi-Fi.

FIG. 23*a* is a block diagram that depicts an embodiment 2300 of the routing system embodied on a USB device and is configured to wirelessly connect to a network using a standard wireless protocol such Wi-Fi. In one embodiment, client 2302 communicates with secure database 2314 in data center 2310 via public network 104. Client 2302 comprises human user 2304, client computing device 2306, which is interfaced with routing system on USB thumb drive with Wi-Fi 2308, as discussed earlier. In some embodiments, client computing device 2306 is a desktop computer, a laptop computer, or any other computing device with a USB interface. Client 2302 also comprises wireless router 2316, which interfaces with the routing system via wireless Wi-Fi connection 2318. Data center 2310 includes routing system 2312.

In one embodiment, the routing system on USB thumb drive with Wi-Fi 2308 connects to the client computing device 2306, via a USB connection 2318; now, all communication between the client computing device 2306 and the public network 104 passes through the routing system on USB thumb drive with Wi-Fi 2308. Furthermore, the secure user data is stored on the routing system on USB thumb drive with Wi-Fi 2308 in an encrypted format. When the routing system on USB thumb drive with Wi-Fi 2308 is plugged into the client computing device 2306, it first authenticates the human user 2304 before allowing any connection between the secure database on the routing system on USB thumb drive with Wi-Fi 2308 and the client computing device 2306. In some embodiments, when the routing system on USB thumb drive with Wi-Fi 2308 is powered, up, the routing system on USB thumb drive with Wi-Fi 2308 "trains" itself to recognize the human user 2304 through a series of questions and tests. The data associated with the questions and tests is stored on secure database 2210 and is used to authenticate the human user 2304 before allowing any connections to protected data. Once a secure connection between the routing system on USB thumb drive with Wi-Fi 2308 and the client computing device is established 2306, the routing system on USB thumb drive with Wi-Fi 2308 can then initialize a secure symbolic https connection with the routing system 2312 interfaced with the secure database 2314 in the data center 2310 in order to carry out the user's desired transaction, wherein the symbolic https connection is implemented over the public network 104 in a manner discussed previously. Here, the routing system on USB thumb drive with Wi-Fi 2308 acts both as an authentication manager (for the local client access) as well as the encryption manager. In order to further enhance security, the routing system on USB thumb drive with Wi-Fi 2308 can optionally be made to be a one-time use routing system, wherein the routing system itself self-destructs after each operation. By doing so, the routing system on USB thumb drive with Wi-Fi 2308 purges all memory contents, eliminating any data that can be extracted in case the routing system on USB thumb drive with Wi-Fi 2308 device is stolen. Also, the routing system on USB thumb drive with Wi-Fi 2308 can be made to have a certain lifespan, self-destructing if disconnected, or if not used (or re-used) within a certain amount of time. All the features of the routing system described earlier, including the severing of direct connections with the standardized software stacks, along with the symbolic router-to-router communication language, are incorporated in the routing system on USB thumb drive with Wi-Fi 2308. In this case, routing system on USB thumb drive with Wi-Fi 2308 is disconnected from both the USB software stack and the network software stack. This is important in order to minimize the probability of attack via either or both of these two standardized communication channels.

Figure 23B:
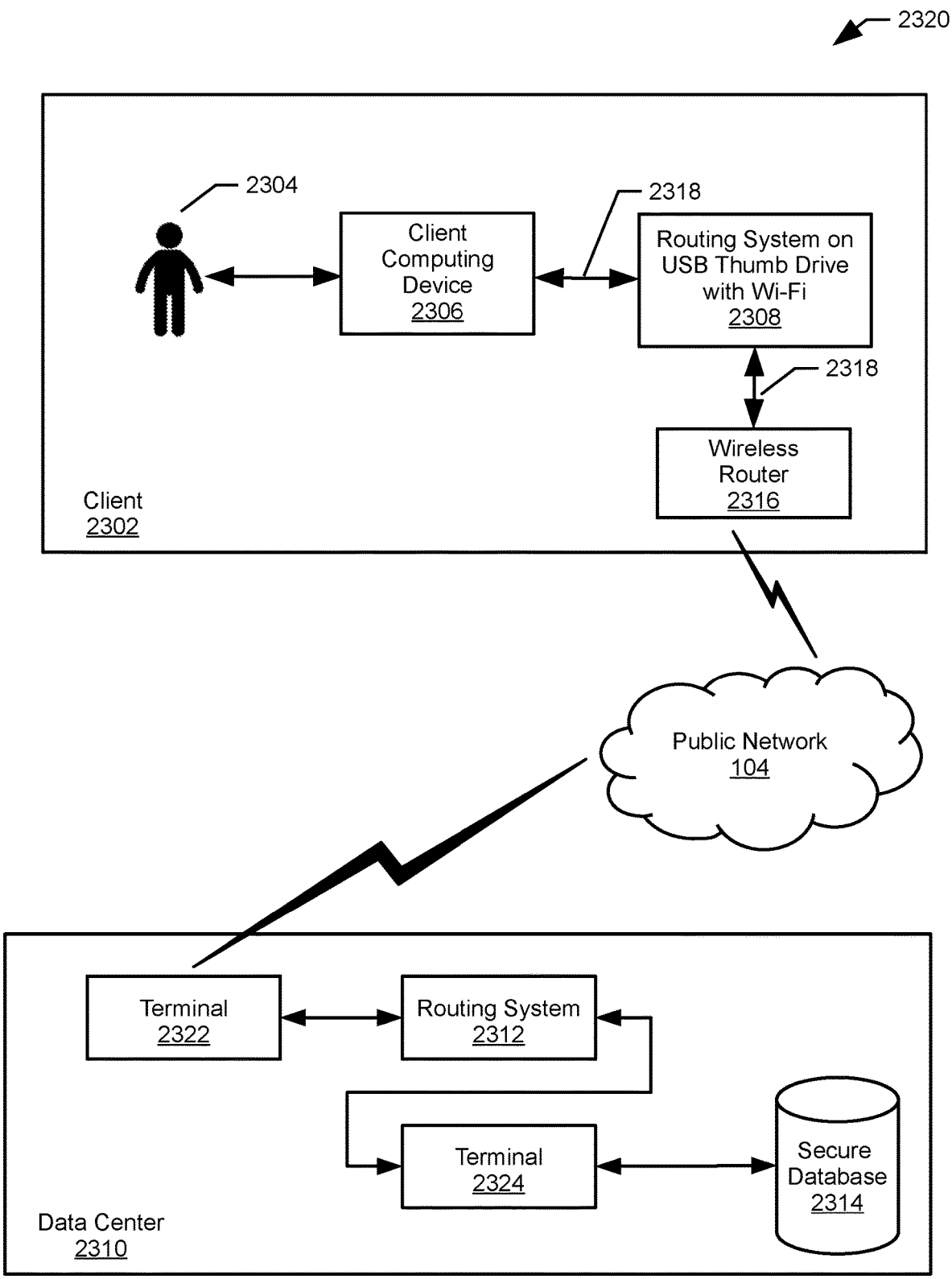
FIG. 23b is a block diagram that depicts another embodiment of the routing system embodied on a USB device and configured to wirelessly connect to a network using a standard wireless protocol such Wi-Fi.

FIG. 23*b* is a block diagram that depicts another embodiment 2320 of the routing system embodied on a USB device and configured to wirelessly connect to a network using a standard wireless protocol such Wi-Fi. In one embodiment, client 2302 communicates with secure database 2314 in data center 2310 via public network 104. Client 2302 comprises human user 2304, client computing device 2306, which is interfaced with routing system on USB thumb drive with Wi-Fi 2308, as discussed earlier. In some embodiments, client computing device 2306 is a desktop computer, a laptop computer, or any other computing device with a USB interface. Client 2302 also comprises wireless router 2316, which interfaces with the routing system via wireless Wi-Fi connection 2318. Data center 2310 includes routing system 2312, which is interfaced with public network 104 via terminal 2322, and to the secure database 2314 via terminal 2324 respectively, wherein terminals 2322 and 2324 have the standard functionality of the terminals described earlier.

In one embodiment, the routing system on USB thumb drive with Wi-Fi 2308 connects to the client computing device 2306, via a USB connection 2318; now, all communication between the client computing device 2306 and the public network 104 passes through the routing system on USB thumb drive with Wi-Fi 2308. Furthermore, the secure user data is stored on the routing system on USB thumb drive with Wi-Fi 2308 in an encrypted format. When the routing system on USB thumb drive with Wi-Fi 2308 is plugged into the client computing device 2306, it first authenticates the human user 2304 before allowing any connection between the secure database on the routing system on USB thumb drive with Wi-Fi 2308 and the client computing device 2306. Once a secure connection between the routing system on USB thumb drive with Wi-Fi 2308 and the client computing device is established 2306, the routing system on USB thumb drive with Wi-Fi 2308 can then initialize a secure symbolic https connection with the routing system 2312 interfaced with the secure database 2314 in the data center 2310 in order to carry out the user's desired transaction, wherein the symbolic https connection is implemented over the public network 104 in a manner discussed previously. Here, the routing system on USB thumb drive with Wi-Fi 2308 acts both as an authentication manager (for the local client access) as well as the encryption manager. In order to further enhance security, the routing system on USB thumb drive with Wi-Fi 2308 can optionally be made to be a one-time use routing system, wherein the routing system itself self-destructs after each operation. By doing so, the routing system on USB thumb drive with Wi-Fi 2308 purges all memory contents, eliminating any data that can be extracted in case the routing system on USB thumb drive with Wi-Fi 2308 device is stolen. Also, the routing system on USB thumb drive with Wi-Fi 2308 can be made to have a certain lifespan, self-destructing if not used (or re-used) within a certain amount of time. All the features of the routing system described earlier, including the severing of direct connections with the standardized software stacks, along with the symbolic router-to-router communication language, are incorporated in the routing system on USB thumb drive with Wi-Fi 2308. In this case, routing system on USB thumb drive with Wi-Fi 2308 is disconnected from both the USB software stack and the network software stack.

This is important in order to minimize the probability of attack via either or both of these two standardized communication channels.

Figure 24:
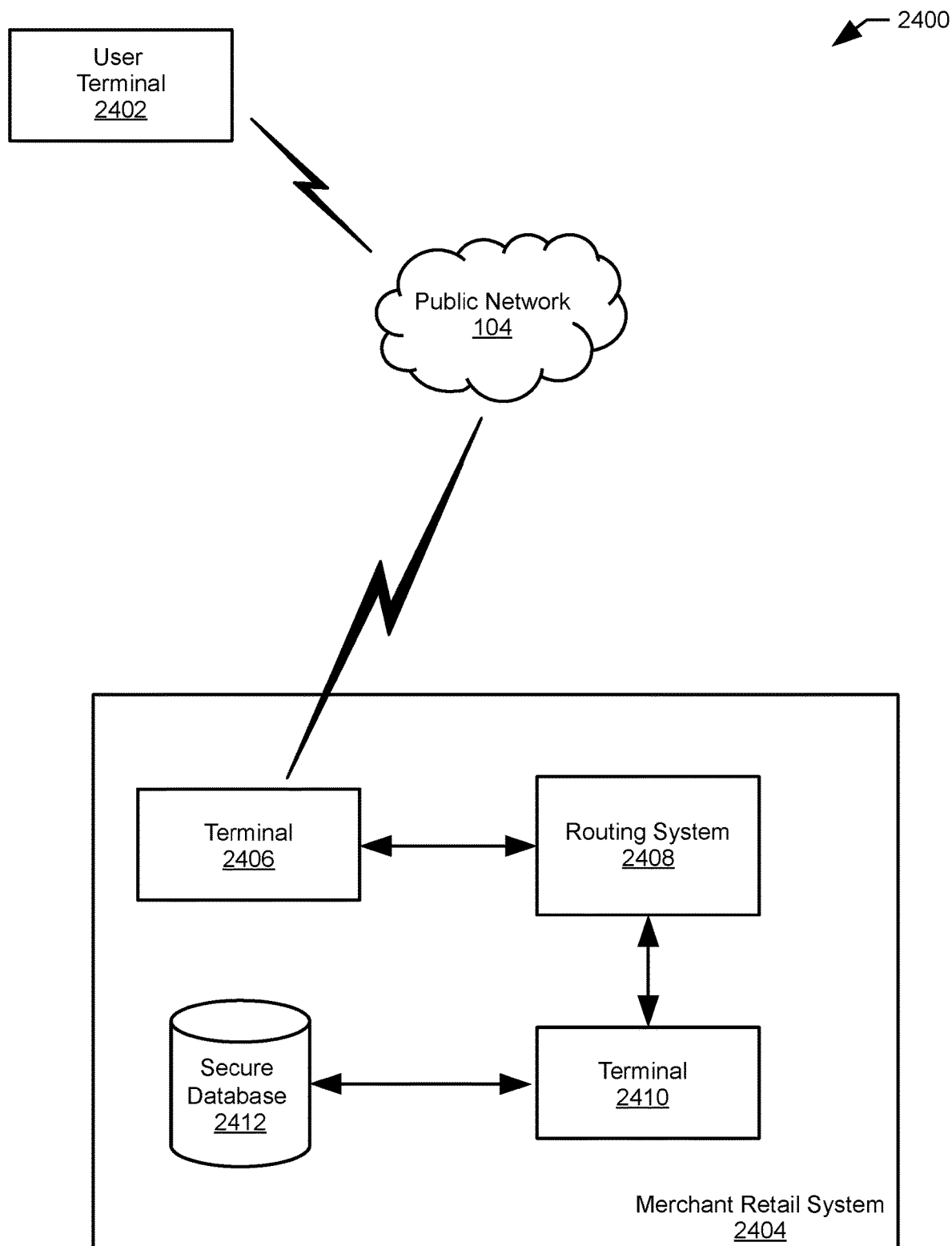
FIG. 24 is a block diagram that depicts an embodiment of the routing system used in a merchant retail system to protect the secure database associated with the merchant retail system.

FIG. 24 is a block diagram that depicts an embodiment 2400 of the routing system used in a merchant retail system to protect the secure database associated with the merchant retail system. In one embodiment, user terminal 2402 wishes to carry out a secure transaction with secure database 2412 that is a part of merchant retail system 2404, via public network 104. In some embodiments, the secure transaction between user terminal 2402 and secure database 2412 is a transaction to purchase merchandise online, or an online shopping transaction. Secure database 2412 is protected by routing system 2408, wherein routing system 2408 is interfaced with secured database 2412 via terminal 2410, and wherein routing system 2408 is interfaced with public network 104 via terminal 2406. In this embodiment, terminal 2406 and terminal 2410 perform the same functions as the terminal interface described previously. Furthermore, routing system 2408 has all or some of the security features of the routing system described previously. Methods such as symbolic https as discussed earlier can be used as the communication protocol between user terminal 2402 and secure database 2412 via routing system 2408. Independent user authentication (not shown in this figure) can also be included in order to improve the security of the system.

In one embodiment, user terminal 2402 corresponding to a customer is connected to terminal 2406 of the merchant retail system 2404 via the public network 104. The customer at user terminal 2402 wishes to purchase an item off the website of the retail merchant system 2404. In order to do this, the customer at user terminal 2402 is first logged in and appropriately authenticated by routing system 2508 using the methods described earlier. The customer at user terminal 2402 enters his or her information, including name, shipping address and payment information. This information is encrypted using the symbolic https protocol described earlier, as well as standard encryption techniques such as AES, and transmitted over the public network 104, where it is received at terminal 2406 of the merchant retail system 2404, and presented to routing system 2408. In one embodiment, instead of communicating the information received by terminal 2406 via standard wired or wireless communication methods, routing system 2408 reads the information displayed on terminal 2406 using machine vision. The routing system 2408 interacts with terminal 2406 using a virtual keyboard and virtual mouse. Note that the routing system 2408 is programmed only to respond to very specific commands, and is designed to ignore any requests other than what it is programmed to do. This aspect is very important from a security perspective, as presented earlier. The routing system 2408 authenticates the user information, and if all authorization checks are passed, then the routing system 20408 authorizes the purchases from the secure database 2412 of the merchant retail system 2404, thereby fulfilling the user purchase request. This process is accomplished by the routing system 2408 by a machine vision interface with terminal 2410, with the routing system 2408 entering information via a virtual keyboard and mouse combination. In the event that the user information is stored on the secure database 2412, the routing system 2408 can perform the authentication process (user login, for example) via the machine vision and virtual keyboard/mouse interface described above.

Figure 25:
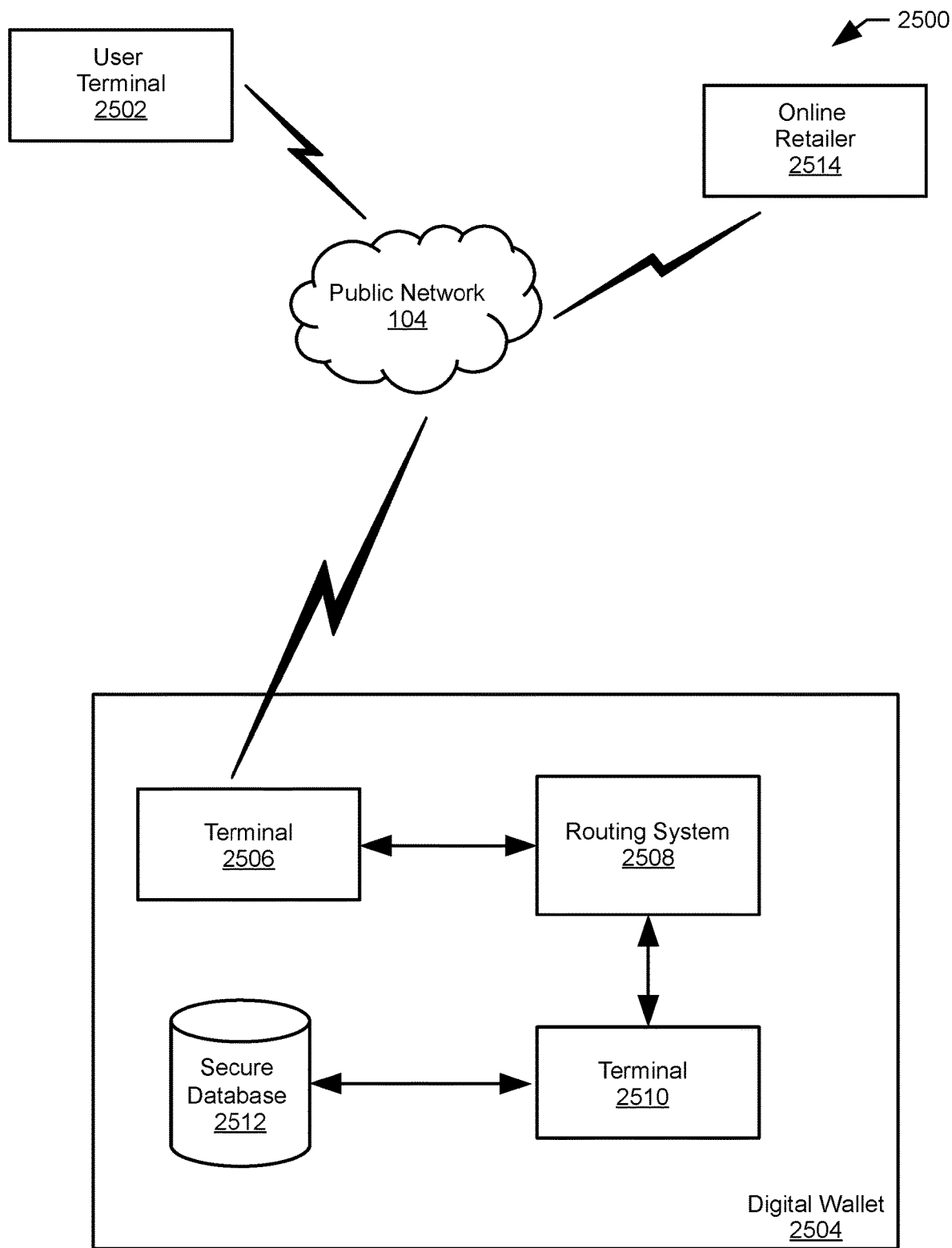
FIG. 25 is a block diagram that depicts an embodiment of the routing system used in a digital wallet system to protect the secure database associated with the digital wallet system.

FIG. 25 is a block diagram that depicts an embodiment 2500 of the routing system used in a digital wallet system to protect the secure database associated with the digital wallet system. In one embodiment, a customer at user terminal 2502 wishes to make an online purchase from the website of online retailer 2514, via the public network 104. In this embodiment, the customer information is securely stored on the customer's digital wallet 2504, which comprises terminal 2506 that is interfaced with the public network 104, routing system 2508 that is interfaced with terminal 2506 and with terminal 2510, and secure database 2512 which is interfaced with terminal 2510. Terminal 2506 and terminal 2510 have standard terminal functionalities as discussed previously. Routing system 2508 has one or more of the routing system security features discussed earlier.

In one embodiment, the routing system 2508 can make the purchase on the online system for the customer at user terminal 2502 with the customer's credit card information and other secure customer information stored in secure database 2512 in a highly secure manner. Again in this case the secured data is stored in secure database 2512 protected by a routing system 2508. In this embodiment, routing system 2508 is also responsible for making online purchases on behalf of the customer at user terminal 2502 based on authorized user requests, subject to successful authentication procedures described earlier. In other embodiments, another routing system (not shown) can be included in order to complete the purchase request of the customer at user terminal 2502, in a manner similar to the aliasing embodiment discussed earlier. Since the routing system 2508 can verify the domain name system (DNS) of the online retailer 2514 and only allow execution of purchase workflow on specific webpages, the routing system 2508 can very securely make purchases on behalf of the user at customer terminal 2502. Also since the routing system 2508 can be created at that moment with a clean installation and possibly destroyed after the transaction is completed there is no possibility of malware in the routing system 2508 and web interaction with the website of the online retailer 2514, and no possibility of phishing sites fooling the routing system 2508. This approach has the advantage that the user at customer terminal 2502 has a single online digital wallet 2504 that is used for all online purchases.

Of course the routing system 2508 can protect the secure database 2512 and make the purchase is a highly secure manner but cannot prevent the online retailer 2514 where the online purchase is being made from having security problems in their backend. Thus the best case here is that the customer at user terminal 2502 does not maintain an account with any online retailer such as online retailer 2514 to hold secure data but rather uses the digital wallet 2504 each time the customer at user terminal 2502 wishes to make a transaction. Of course if the online retailer 2514 used a routing system approach to secure customers' credit cards and PII (personal identifiable information) as presented previously, then the online retailers such as online retailer 2514 themselves would be much less of a security risk than they are today.

Figure 26:
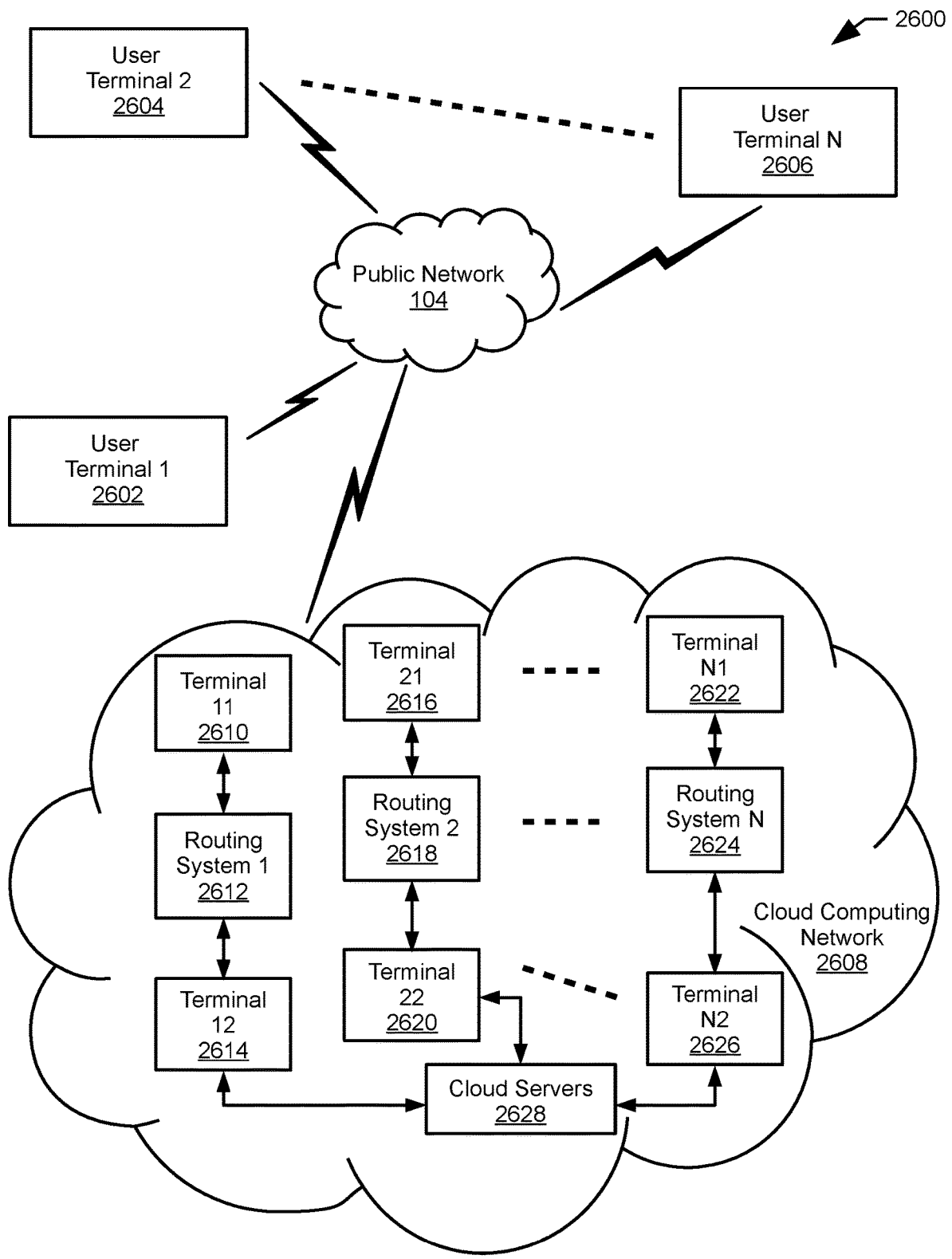
FIG. 26 is a block diagram that depicts an embodiment of the routing system used in a cloud computing environment.

FIG. 26 is a block diagram that depicts an embodiment 2600 of the routing system used in a cloud computing environment. In one embodiment, user terminal 1 2602, user terminal 2 2604, through user terminal N 2606 independently wish to communicate with cloud computing network 2608 via public network 104, wherein cloud computing network 2608 includes cloud servers 2628. Each user terminal is assigned its own independent set of terminals and routing system. User terminal 1 2602 is connected, via public network 104, to terminal 11 2610 in cloud computing network 2608. Terminal 11 2610 is interfaced with routing system 1 2612 in cloud computing network 2608. Routing system 1 2612 is interfaced with cloud servers 2628 via terminal 12 2614 in cloud computing network 2608. User terminal 2 2604 is connected, via public network 104, to terminal 21 2616 in cloud computing network 2608. Terminal 21 2616 is interfaced with routing system 2 2618 in cloud computing network 2608. Routing system 2 2618 is interfaced with cloud servers 2628 via terminal 22 2620 in cloud computing network 2608, and so on to include user terminal N 2606 connected, via public network 104, to terminal N1 2622 in cloud computing network 2608. Terminal N1 2622 is interfaced with routing system N 2624 in cloud computing network 2608. Routing system N 2624 is interfaced with cloud servers 2628 via terminal N2 2626 in cloud computing network 2608.

In one embodiment, the data paths of each user are independent and agnostic of the data paths of the other users. Thus it is very difficult, if not impossible, for an attacker to launch an attack that traverses over multiple user data paths. Network isolation of the cloud servers and a robust degree of security are provided by the security measures of routing system 1 2612, routing system 2 2618, through routing system N 2624, as discussed earlier. Each user thus is associated with a unique routing system that manages the database and computing resources for that user.

Figure 27A:
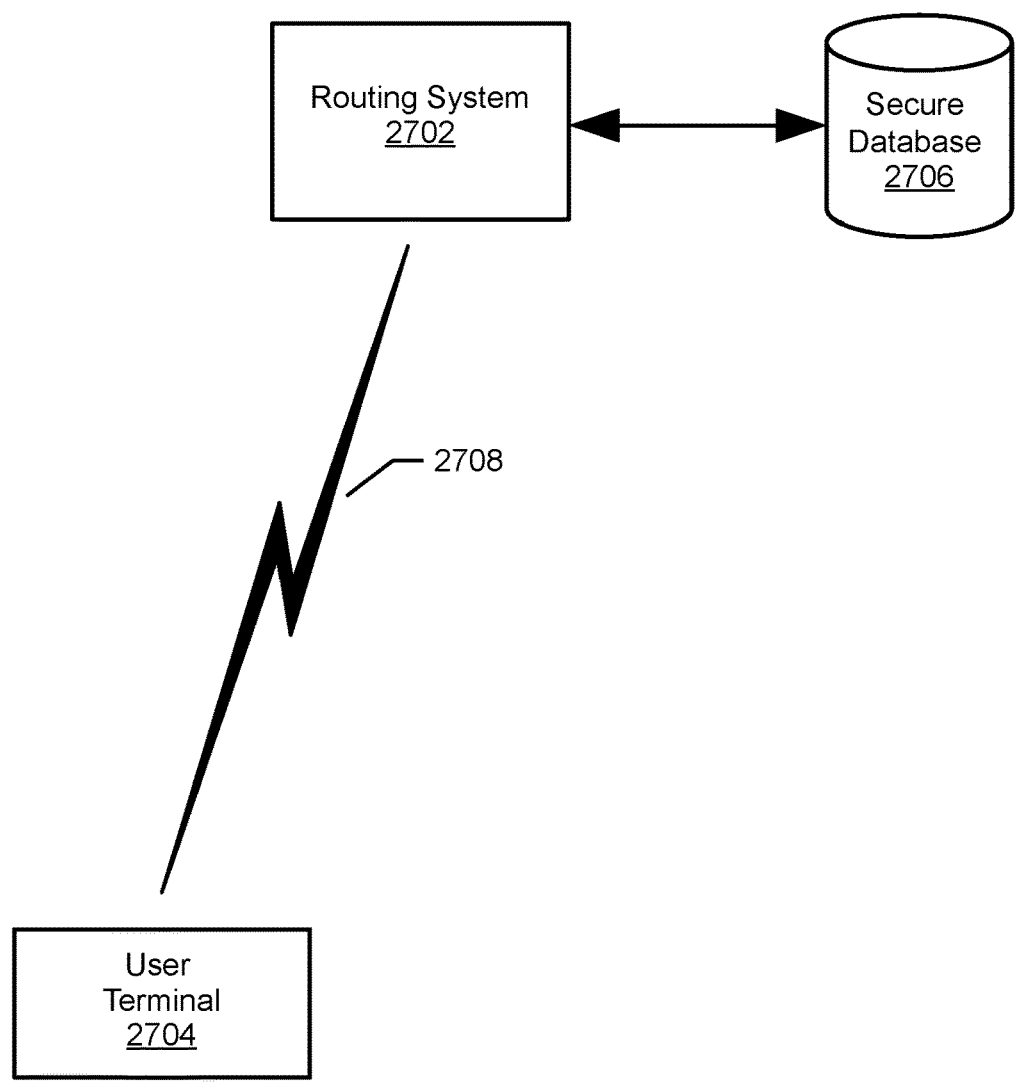
FIG. 27a is a block diagram that depicts an embodiment of a routing system used in a remote desktop connectivity environment.

FIG. 27a is a block diagram that depicts an embodiment of a routing system used in a remote desktop connectivity environment 2700. In one embodiment, a routing system 2702 can provide a remote desktop connection between user terminal 2704 and secure database 2706, via point-to-point encrypted connection link 2708. In some embodiments, routing system 2702 protects secure database 2706, while implementing point-to-point encrypted connection link 2708 by using a secure protocol such as the remote desktop protocol (RDP).

Figure 27B:
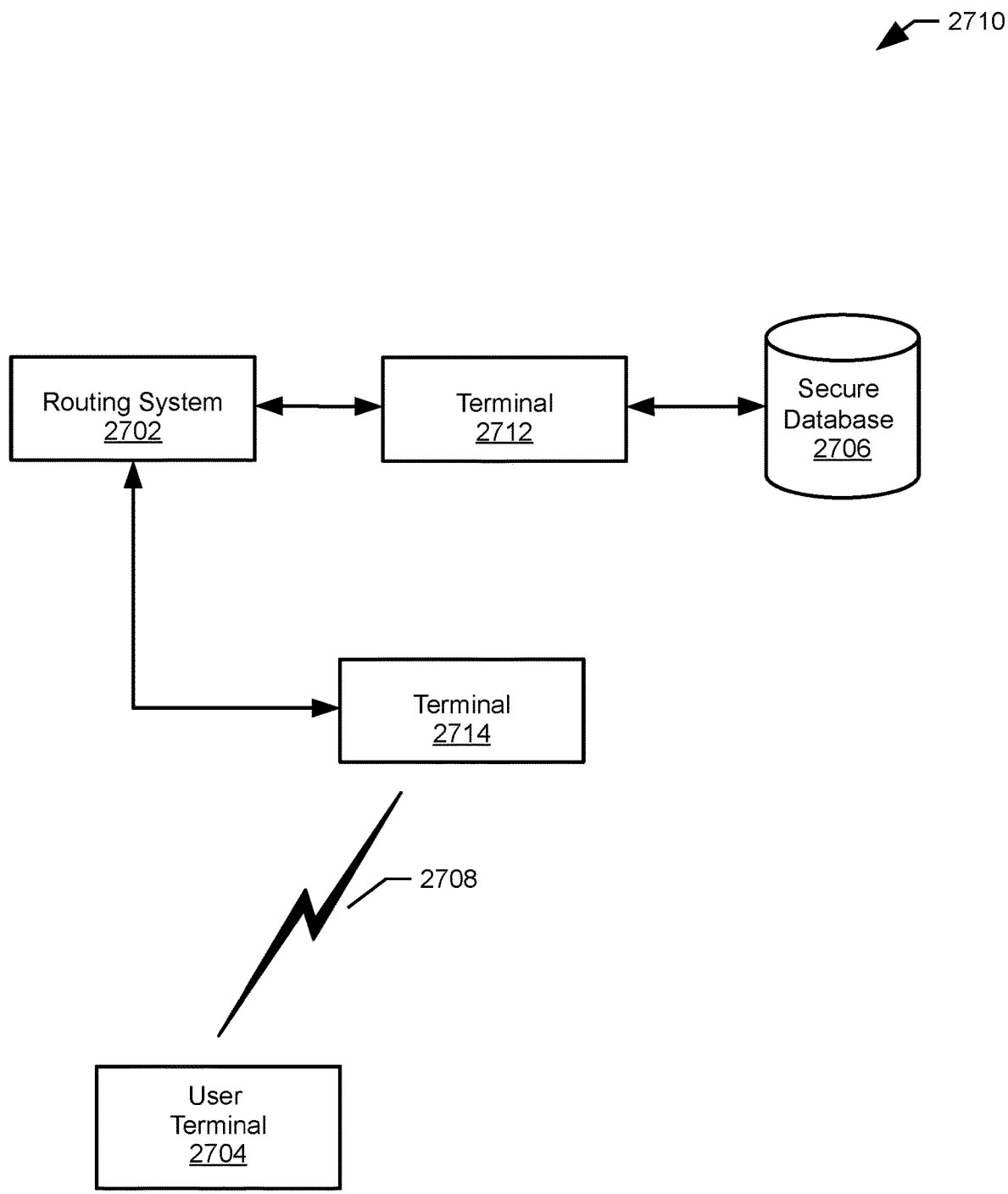
FIG. 27b is a block diagram that depicts another embodiment of the routing system-based remote desktop connectivity environment.

FIG. 27b is a block diagram that depicts another embodiment of the routing system-based remote desktop connectivity environment 2710. In one embodiment, a routing system 2702 can provide a remote desktop connection between user terminal 2704 and secure database 2706, via point-to-point encrypted connection link 2708, wherein routing system 2702 is interfaced with secure database 2706 via terminal 2712, and wherein routing system 2702 is interfaced with terminal 2714. Terminal 2714 interfaces with the point-to-point encrypted connection link 2708 to the user terminal 2704. In some embodiments, routing system 2702 protects secure database 2706, while implementing point-to-point encrypted connection link 2708 by using a secure protocol such as the remote desktop protocol (RDP).

Figure 28A:
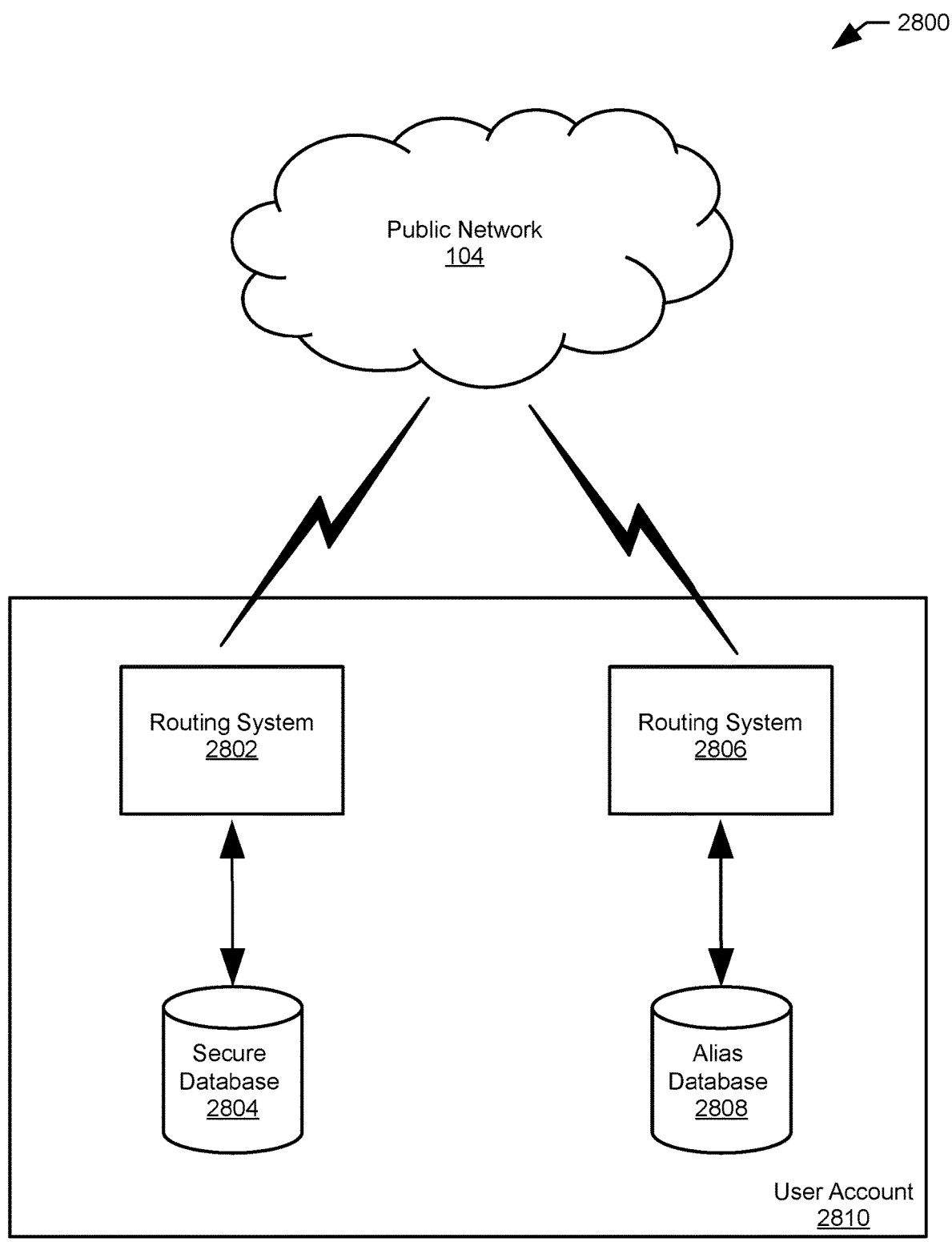
FIG. 28a is a block diagram that depicts an embodiment of the routing system used to implement an aliasing scheme which protects a user's sensitive data.

FIG. 28a is a block diagram that depicts an embodiment 2800 of the routing system used to implement an aliasing scheme which protects a user's sensitive data. In one embodiment, user account 2810 comprises routing system 2802 and routing system 2806, respectively interfaced with secure database 2804 and alias database 2808. Routing system 2802 and routing system 2806 are independently interfaced with public network 104.

In some embodiments, routing system 2802 guards a secure database 2804 of an individual's private information. In addition, routing system 2806 maintains multiple personalities, or aliases, for a single user in alias database 2808. In some embodiments, these aliases can have substitute information including, but not limited to, changes in IP addresses, browser type, user personal information, age, addresses, and so on in order to confuse tracking databases attempting to gather information about the user. In some sense, the routing system 2806 acts as a personal assistant to user data that includes a user's profile, with each user having a unique routing system 2806 associated with his or her data. The routing system 2806 can help remember a user's passwords, change passwords, hold data and perform other such operations for the user.

Figure 28B:
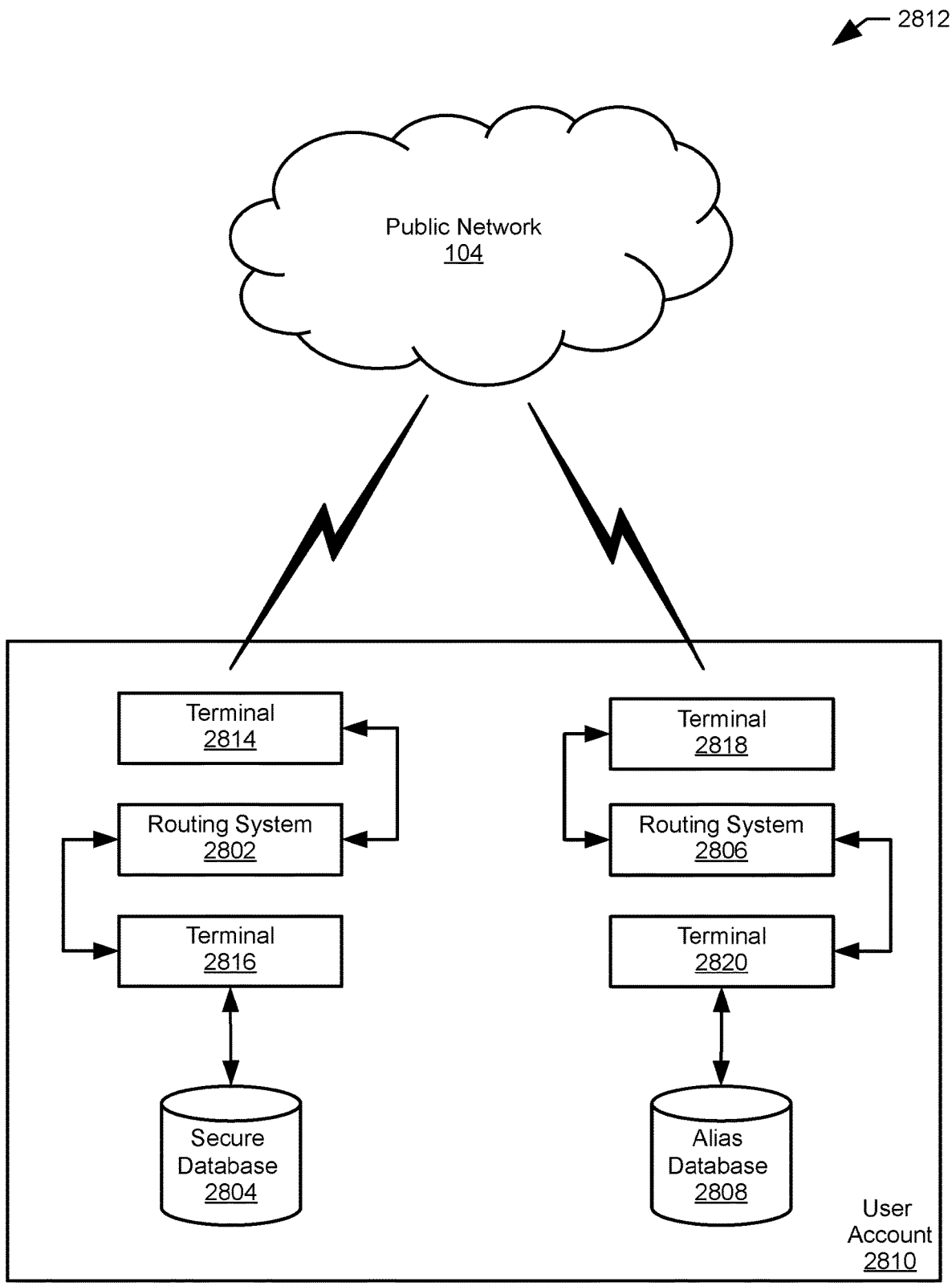
FIG. 28b is a block diagram that depicts another embodiment of the routing system implementing an aliasing scheme.

FIG. 28b is a block diagram that depicts another embodiment of the routing system implementing an aliasing scheme 2812. In one embodiment, user account 2810 comprises routing system 2802 and routing system 2806, respectively interfaced with secure database 2804 and alias database 2808 via terminal 2816 and terminal 2820 respectively. Routing system 2802 and routing system 2806 are independently interfaced with public network 104 via terminal 2814 and terminal 2818 respectively. Terminal 2814, terminal 2816, terminal 2818 and terminal 2820 have similar functionalities to the terminal described previously.

In some embodiments, routing system 2802 guards a secure database 2804 of an individual's private information. In addition, routing system 2806 maintains multiple personalities, or aliases, for a single user in alias database 2808. In some sense, the routing system 2806 acts as a personal assistant to user data that includes a user's profile, with each user having a unique routing system 2806 associated with his or her data. The routing system 2806 can help remember a user's passwords, change passwords, hold data and perform other such operations for the user.

Figure 29:
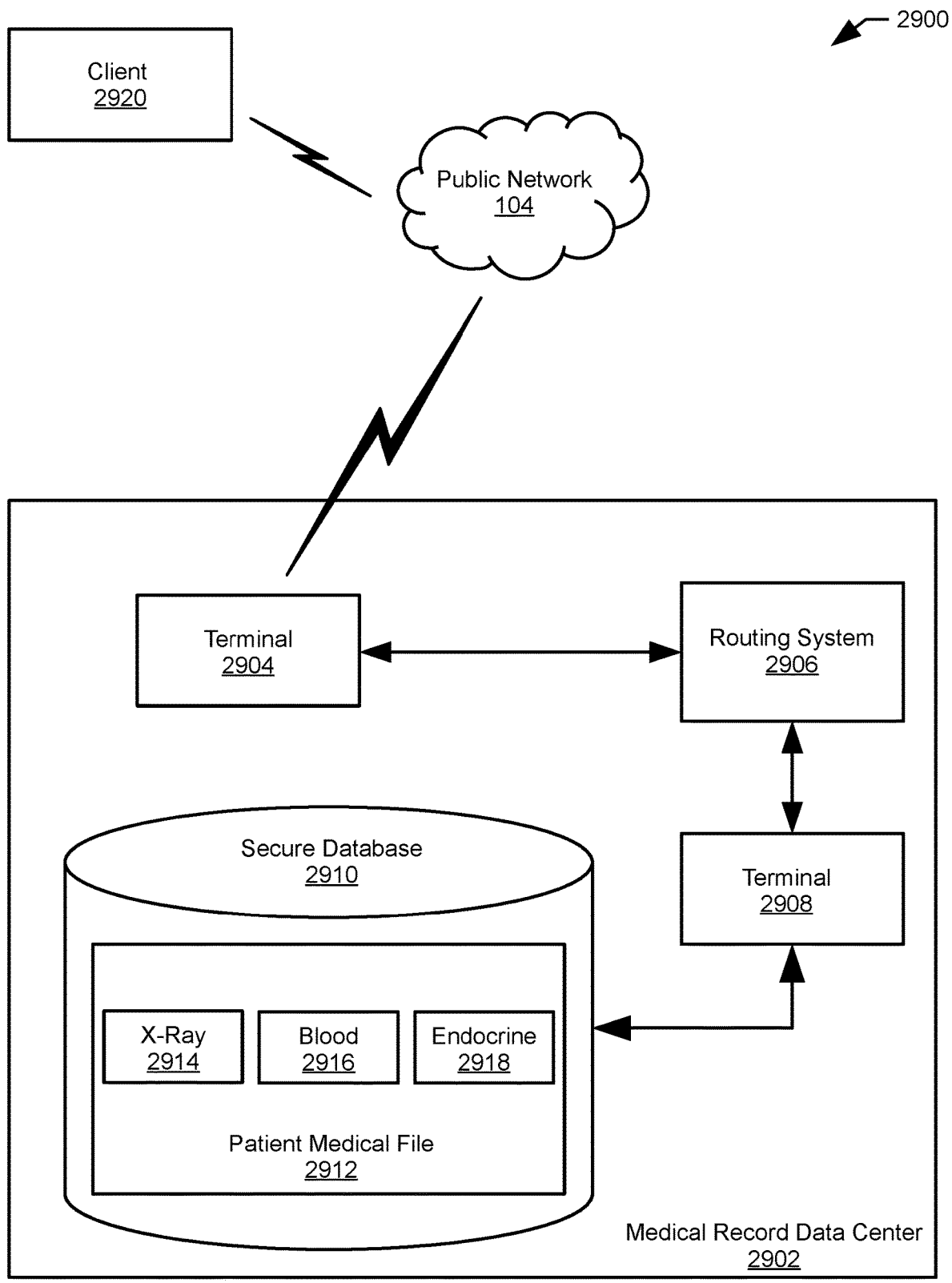
FIG. 29 is a block diagram that depicts an embodiment of the routing system used to secure patient medical records in a patient medical records system.

FIG. 29 is a block diagram that depicts an embodiment 2900 of the routing system used to secure patient medical records in a patient medical records system. In one embodiment, medical record data center 2902 contains secure database 2910 which contains a patient medical file 2912. The patient medical file 2912, in turn, contains patient medical records that include but are not limited to x-ray 2914, blood 2916 and endocrine 2918, wherein the term "patient medical records" includes but is not limited to medical reports, medical images, medical prescriptions, and so on. The secure database 2910 and its contents are protected by routing system 2906 that is interfaced with secure database 2910 via terminal 2908, wherein the routing system incorporates some or all of the security features of the routing system as described earlier. Routing system 2906 is also interfaced with public network 104 via terminal 2904. Client 2920, an authorized user of the system, can access the patient medical records stored in secure database 2910 via the public network 104, using any, some or all of the secure authentication and security protocols (such as symbolic https and independent channel user authentication) as discussed earlier. In some embodiments, independent fraud detection methods (not shown) can be included via the inclusion of independent fraud detection processes running, for example, on one or more virtual machines.

Figure 30:
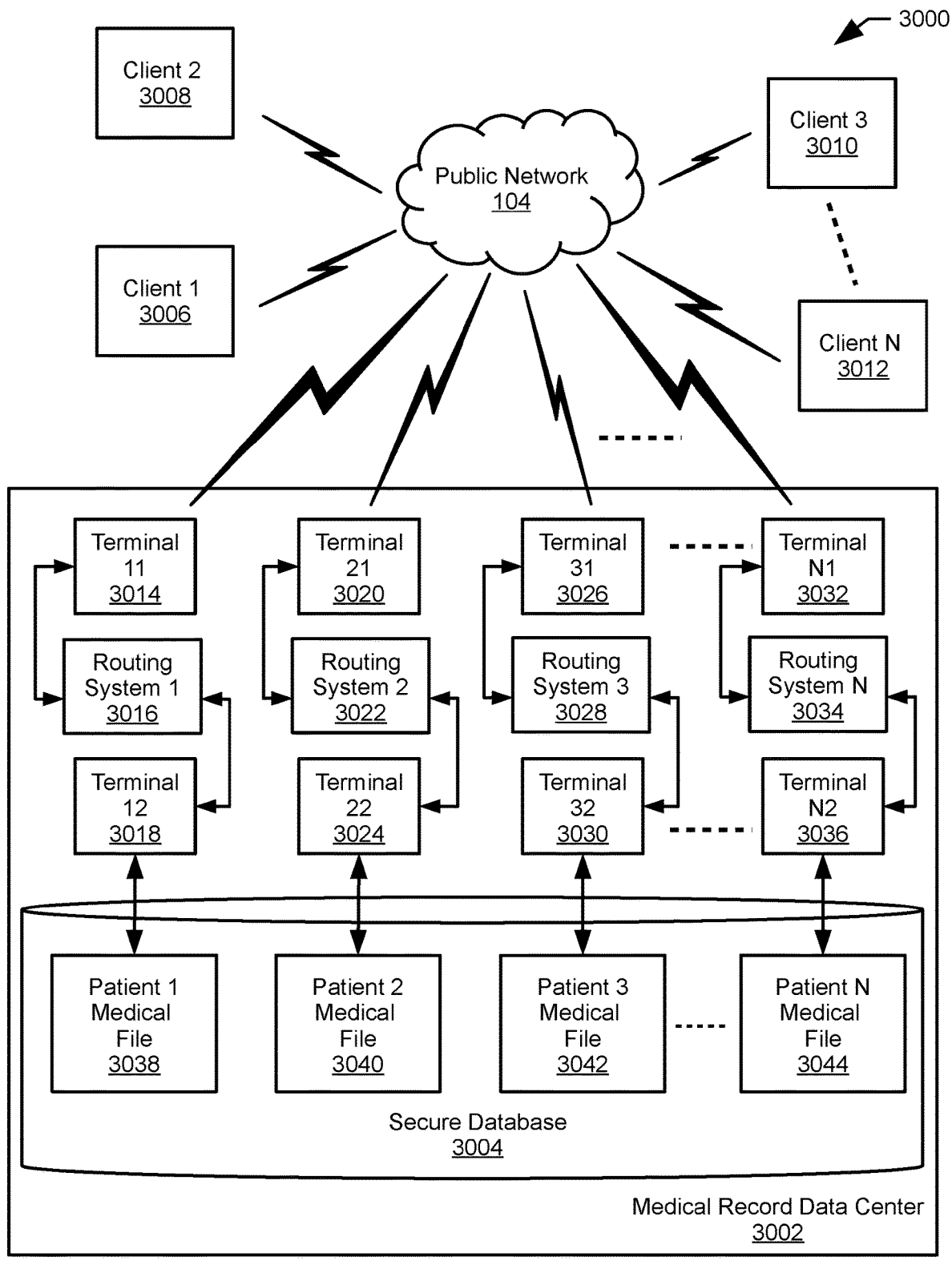
FIG. 30 is a block diagram that depicts an embodiment of a generalized patient medical records system that uses multiple routing systems to protect the sensitive patient medical records.

FIG. 30 is a block diagram that depicts an embodiment 3000 of a generalized patient medical records system that uses multiple routing systems to protect the sensitive patient medical records. In one embodiment, medical record data center 3002 includes secure database 3004 which contains a plurality of patient medical files; patient 1 medical file 3038, patient 2 medical file 3040, patient 3 medical file 3042, through patient N medical file 3044. In one embodiment, client 1 3006, client 2 3008, client 3 3010 through client N 3012, respectively associated with patient 1 medical file 3038, patient 2 medical file 3040, patient 3 medical file 3042, through patient N medical file 3044, can independently access their respective medical files via public network 104. Patient 1 medical file 3038, patient 2 medical file 3040, patient 3 medical file 3042, through patient N medical file 3044 are respectively protected by independent routing system 1 3016, routing system 2 3022, routing system 3

3028, through routing system N 3034, wherein routing system 1 3016, routing system 2 3022, routing system 3 3028, through routing system N 3034 independently incorporate one, some or all of the security features described previously. Routing system 1 3016, routing system 2 3022, routing system 3 3028, through routing system N 3034 are respectively interfaced with patient 1 medical file 3038, patient 2 medical file 3040, patient 3 medical file 3042, through patient N medical file 3044 via terminal 12 3018, terminal 22 3024, terminal 32 3030, through terminal N2 3036. Routing system 1 3016, routing system 2 3022, routing system 3 3028, through routing system N 3034 are respectively interfaced with public network 104 via terminal 11 3014, terminal 21 3020, terminal 31 3026, through terminal N1 3032. As discussed previously, the N data flow paths associated with independent patient access are independent of each other, and since each data flow path is independent of the other data flow paths, there is no possibility of any data leakage between paths. Security features such as symbolic https and independent channel user authentication as discussed previously can be independently applied to each of the N clients and the associated data flow paths. By using this system, a client can access, modify (if necessary), and write back his or her patient medical file from or to the secure database 3304, while availing of the security features offered by the routing system that protects that particular patient medical file.

Figure 31:
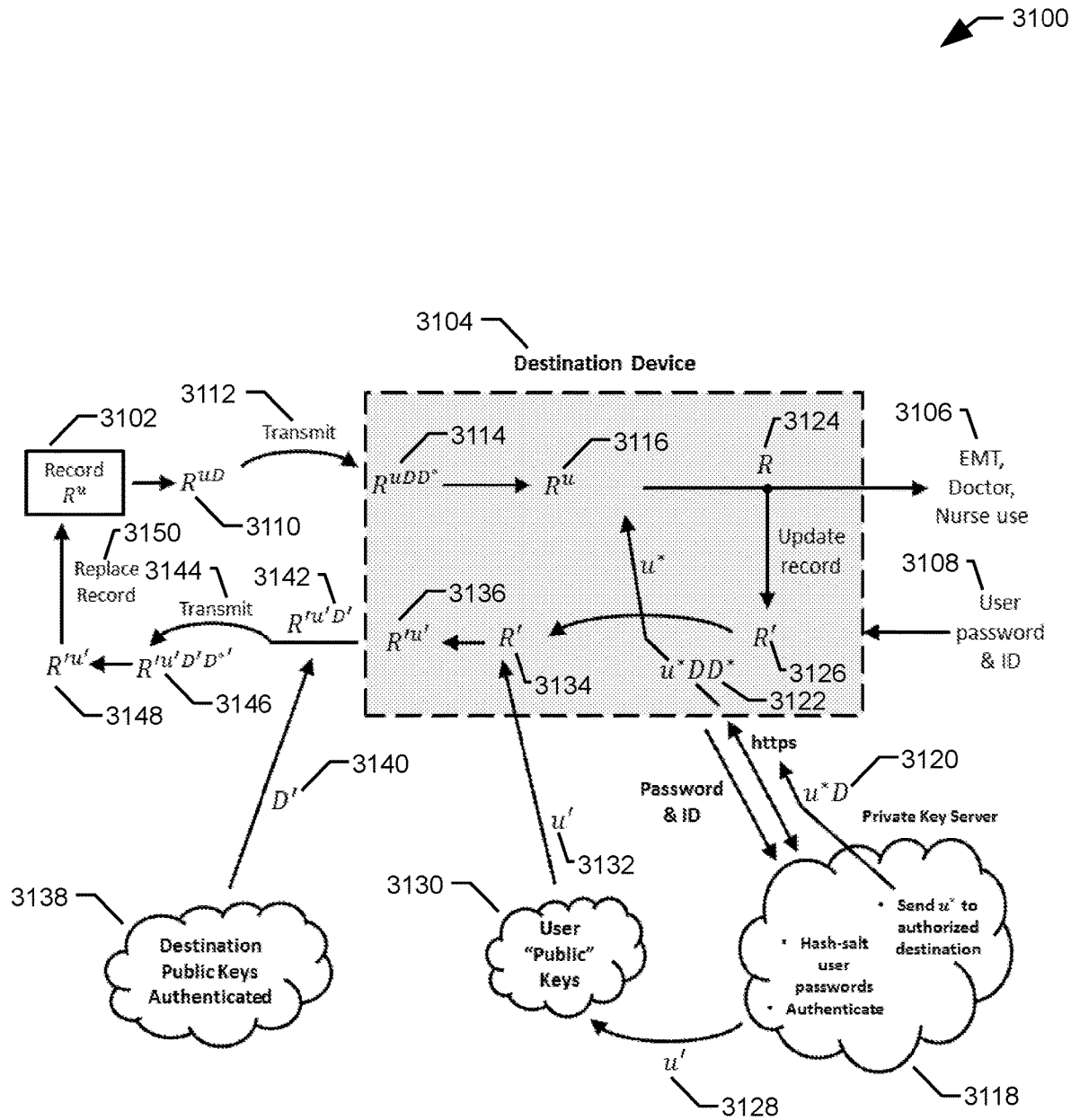
FIG. 31 is a flow diagram depicting an embodiment of a method associated with accessing, reading, modifying and sending a patient medical record associated with the generalized patient medical records system.

FIG. 31 is a flow diagram 3100 depicting an embodiment of a method for accessing, reading, modifying and sending back a patient medical record associated with the generalized patient medical records system. In one embodiment, an authorized user 3106 wishes to access a patient record 3102 that is stored on a secure database (not shown) encrypted with a user public encryption key, as $R^u$, wherein R is the record and the superscript u is used to denote encryption with user public encryption key. In some embodiments, authorized user 3106 could include an emergency medical technician (EMT), a doctor, or a nurse. The authorized user 3106, also referred to as a requestor, uses destination device 3104 to request the patient record 3102. In order to request the record, authorized user 3106 first has to perform a login into the system using a user name and password ID at 3108. A routing system (not shown) can use the previously described authentication and encrypted access methods in order to implement a secure transaction. At 3110, patient record 3102 is encrypted with destination public encryption key, D, and transmitted as $R^{uD}$ at 3112. Note that both user and destination public encryption keys are stored in their respective repositories; however it must be noted that these "public" keys are not released in a public repository, but are only made available to authorized destinations where encryption of data is needed. At 3114, the destination device 3104 receives the patient record 3102 encrypted with destination public encryption key, as $R^{uD}$, and decrypts the record using destination private encryption key, D*, to get $R^{uDD*}$, which further gives the record encrypted with the user public encryption key, as $R^u$ at 3116. In order to further decrypt the received record, the authorized user 3106 requests the user private encryption key u*, stored on private key server 3118, by a suitable remote login operation with an authorized user ID and password. Further, a new key pair is generated on the private key server 3118 and the corresponding public encryption key is posted on the user public key server 3130, while the private encryption key is stored on the private key server 3118. The user public key server 3130 can be owned by a trusted third party, which only distributes the public encryption keys to authorized users of the system. User passwords are hashed with salt and saved on the private key server 3118, along with the private encryption keys. The user private encryption key is encrypted with destination public encryption key D, and transmitted at 3120 to the authorized user destination device 3104, as u*D, using a secure transmission protocol such as https. In some embodiments, a routing system can use symbolic https in order to provide further security to this encrypted transfer. At the same time, user the user public encryption key u is updated to user public encryption key u', and transmitted to the user public key server 3130, where all system user public encryption keys are stored. At the destination device 3104, the received encrypted user private encryption key is decrypted with the destination private encryption key as u*DD*, at 3122, to retrieve the user private encryption key u*, which, in turn, is used to decrypt the encrypted record as $R^{uu*}$, to get the original record R at 3124. The retrieved record R is now processed by the authorized user 3106, and updated if necessary, to get updated record R' at 3126. Record R' has to be sent back to the original repository, or secure database, for storage. In order to do this, the destination device 3104 requests updated user public encryption key u' at 3132, from the user public key server 3130. The updated user public encryption key, u' is used to encrypt updated record R', as $R^{u'}$, at 3136. The destination device 3104 then requests a destination public encryption key, D' at 3140, from destination public key server, 3138. The encrypted updated record $R^{u'}$ is then further encrypted with destination public encryption key, D', at 3142, to get $R^{u'D'}$ at 3142. This encrypted record $R^{u'D'}$ is then transmitted, at 3144, to the secure database, where this encrypted record $R^{u'D'}$ is received and decrypted with destination private encryption key D*' at 3146 to get $R^{u'D'D*'}$ at 3146, to give the updated record encrypted with new user public encryption key, $R^{u'}$ at 3148, which is then used to update and replace (overwrite) the original record at 3150. Note that in all the discussions, the terms "public encryption key" and "public key" are used synonymously. Also, the terms "private encryption key" and "private key" are used synonymously.

In some embodiments, the entire sequence of operations described above is securely carried out by one or more routing systems. A specific embodiment of how routing systems can be used in order to implement such file access will be discussed subsequently.

Figure 32:
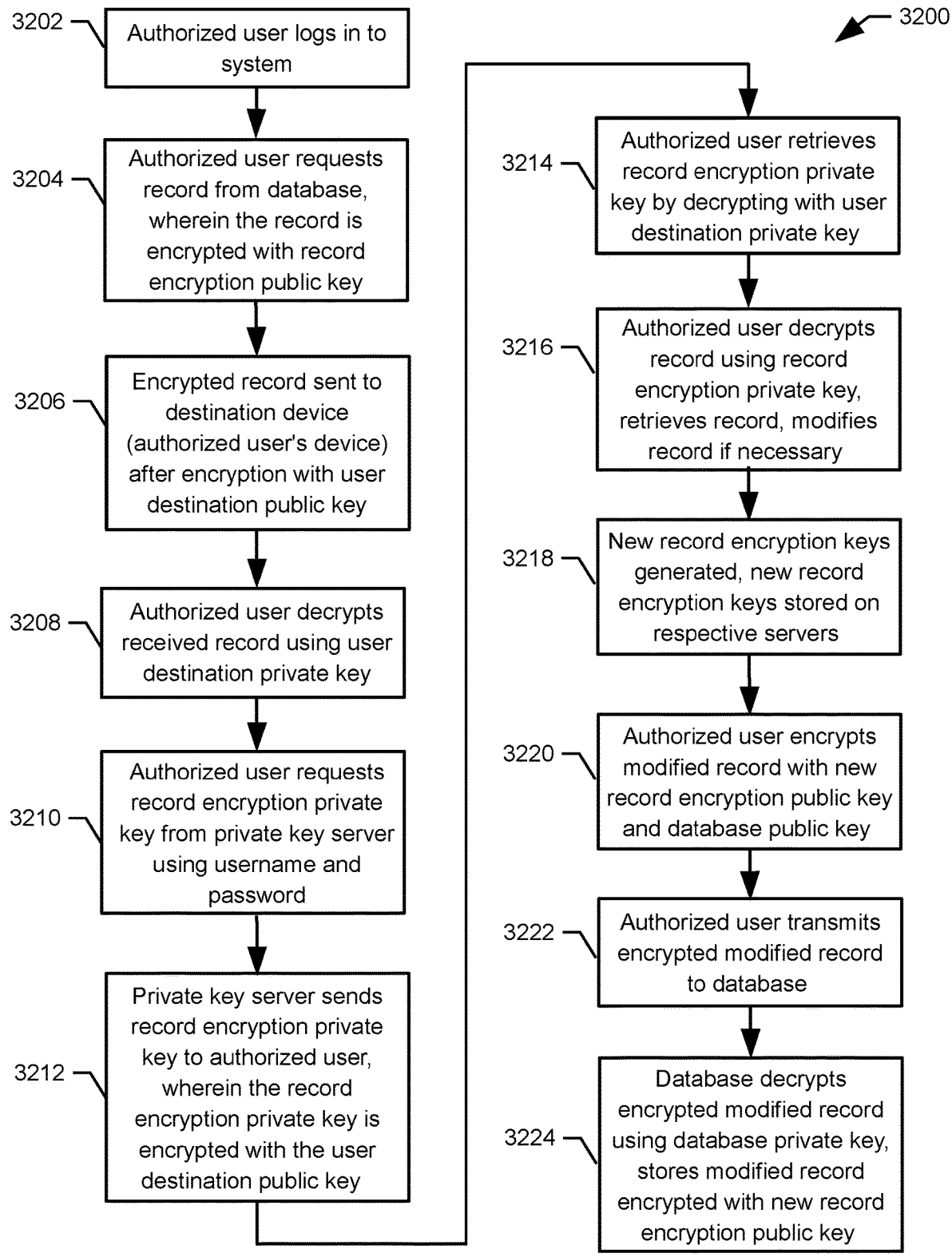
FIG. 32 is a flow diagram depicting another embodiment of a method associated with accessing, reading, modifying and sending back a patient medical record associated with the generalized patient medical records system.

FIG. 32 is a flow diagram 3200 that depicting another embodiment of a method associated with accessing, reading, modifying and sending back a patient medical record associated with the generalized patient medical records system. At 3202, an authorized user logs into the system. At 3204, the authorized user requests a record from the database, wherein the record is encrypted with a record encryption public key. Next, at 3206, the encrypted record is sent to the destination device, which is the authorized user device, after encryption with user destination public key. At 3208, the user decrypts the received record using the corresponding user destination private key. In order to further decrypt the record, the authorized user requests, at 3210, the record encryption private key from the private key server using an authorized username and password to login to the system. At 3212, the private key server sends the record encryption private key to the authorized user, wherein the record encryption private key is encrypted with the user destination public key. At 3214, the authorized user retrieves the record encryption private key by decrypting the received record encryption private key, encrypted with the user destination public key, with the user destination private key. At 3216, the authorized user decrypts the record using the record encryption private key. The user retrieves the record and modifies the record if necessary. At 3218, a new set of record encryption keys are generated (public and private encryption keys), and these keys are stored on their respective servers. At 3220, the authorized user encrypts the modified record with the new record encryption public key and database public key. Next, at 3222, the authorized user transmits the encrypted modified record back to the database. Finally, at 3224, the database decrypts the encrypted modified record using the database private key, and stores the modified record encrypted with the new record encryption public key.

Figure 33:
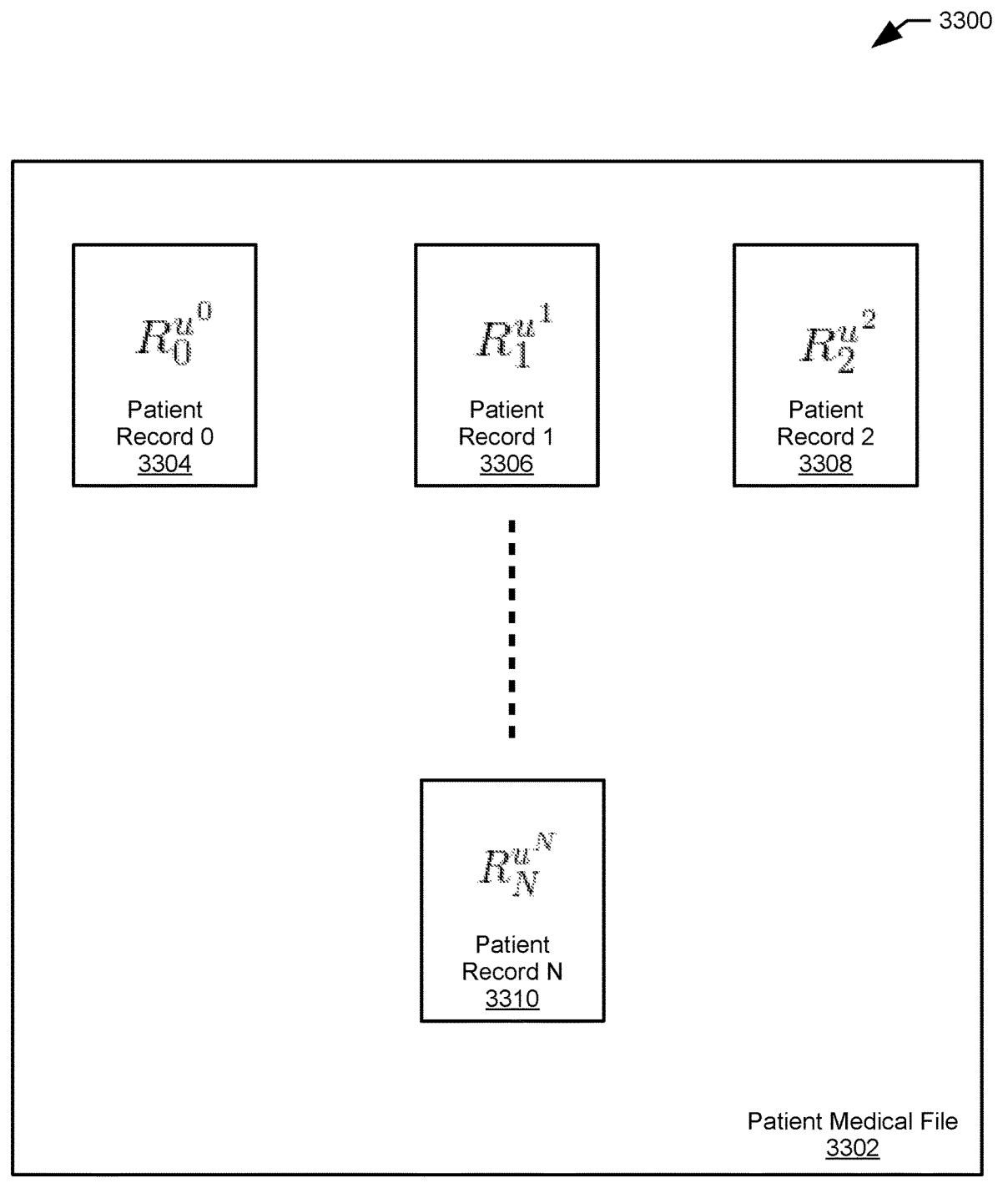

FIG. 33 is a block diagram that depicts the structure 3300 of a patient medical file in the patient medical records system, wherein the patient medical file is comprised of multiple patient records for each patient. In some embodiments, patient medical file 3302 comprises a plurality of patient records, including patient record 0 3304, patient record 1 3306, patient record 2 3308, through patient record N 3310. These N patient records are individually encrypted by user public keys. Patient record 0 3306 is encrypted as $R_0^{u0}$, wherein $u^0$ is the user public key corresponding to user u0. Similarly, patient record 1 3308 is encrypted as $R_1^{u1}$, wherein $u^1$ is the user public key corresponding to user u1, Patient record 2 3310 is encrypted as $R_2^{u2}$, wherein $u^2$ is the user public key corresponding to user u2 and so on through patient record N 3312, which is encrypted as $R_N^{uN}$, wherein $u^N$ is the user public key corresponding to user uN.

Of particular importance is the fact that each patient's medical file contains the set of N patient records, patient record 0 3304, patient record 1 3306, patient record 2 3308, through patient record N 3310, respectively encrypted by user public keys $u^0$, $u^1$, $u^2$, through $u^N$, wherein the N records patient record 0 3304, patient record 1 3306, patient record 2 3308, through patient record N 3310 are treated as independent entities. In other words, each patient record has its own unique encryption key, and is processed independently of other patient records, being treated as a separate patient record in its own right. In this sense, the entire set of patient records follows the superposition principle, wherein each patient record in patient medical file 3302 can exist independently of others, with the entire patient medical file 3302 being composed of these independently updateable patient records. Thus, when a patient record is updated, only the public and private keys corresponding to that patient record are replaced; the keys corresponding to other patient records are left unchanged.

Figure 34:
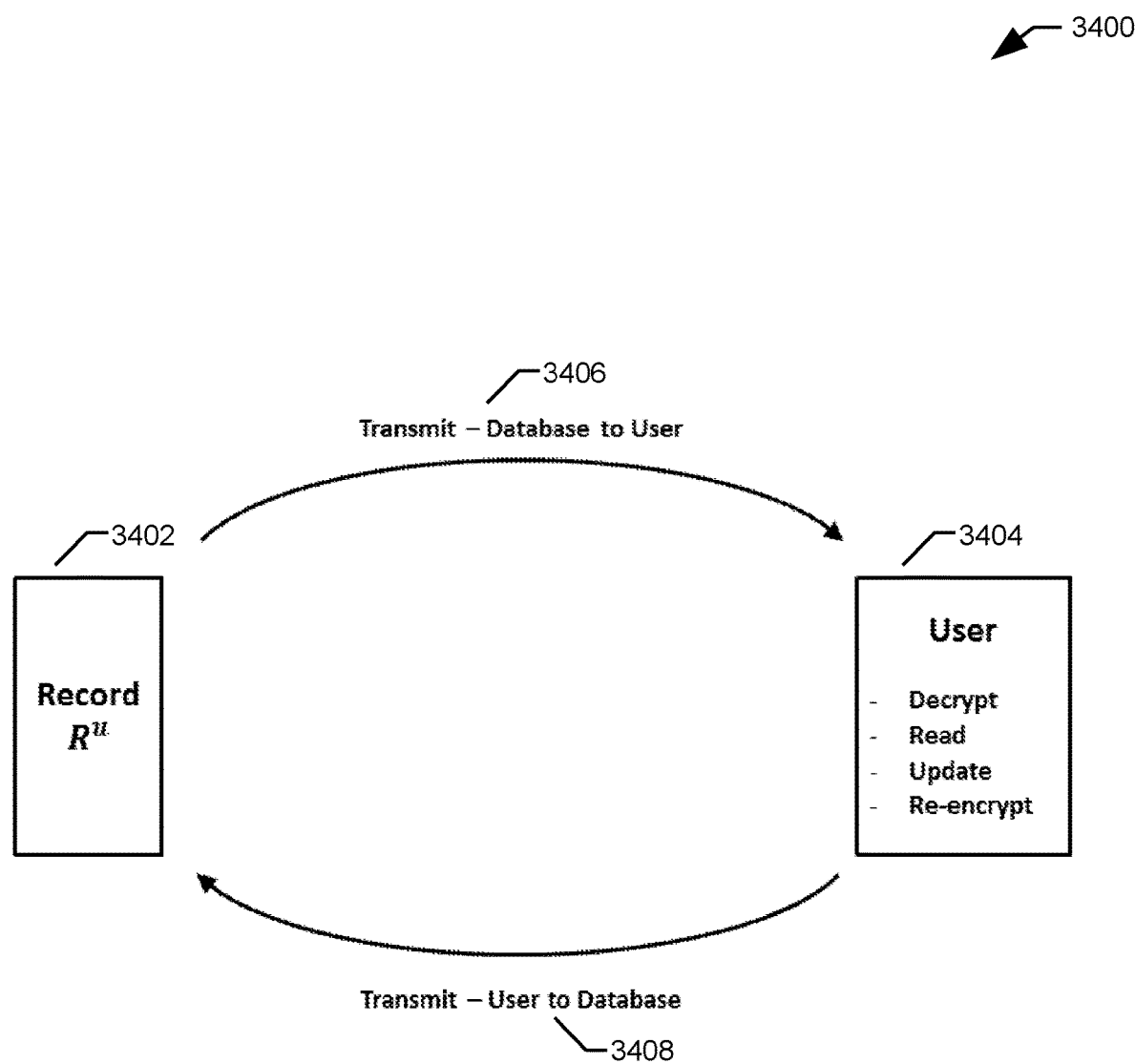
FIG. 34 depicts a closed feedback loop associated with a user access to a patient medical record associated with the patient medical records system.

FIG. 34 depicts a closed feedback loop 3400 associated with a user access to a patient medical record associated with the patient medical records system. As discussed earlier, patient medical records exist as independent entities in the patient medical file; each document has its own unique encryption key and is processed independently of other records, being treated as a separate record in its own right. In this sense, the entire set of records follows the superposition principle, wherein each record can exist independently of others, with the entire patient medical file being composed of these independently updateable records. Thus, when a record is updated, only the public and private keys corresponding to that record are replaced; the keys corresponding to other records are left unchanged. In one embodiment, record R encrypted with user public key u as $R^u$ 3402 is transmitted at 3406 from the secure database (not shown) to authorized user 3404. Authorized user 3404 decrypts the record as discussed previously, reads the record, updates the record if necessary, and finally re-encrypts the record for transmission back to the secure database, wherein the record is transmitted back to the secure database at 3408. The feedback loop structure associated with the record is evident in this figure, and forms the basis for multi-user access to the encrypted patient medical record set as discussed subsequently.

Figure 35:
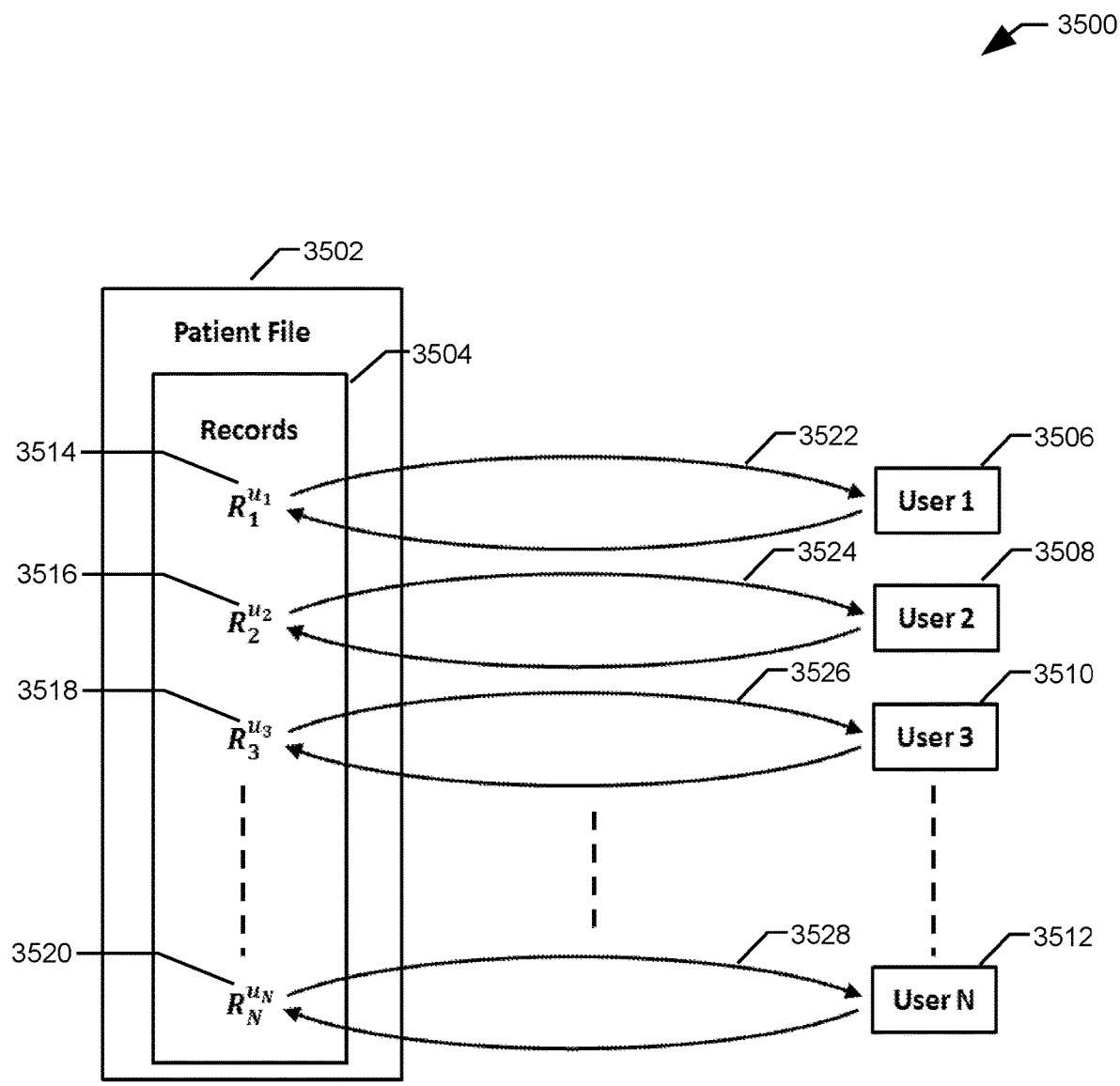
FIG. 35 is a block diagram that depicts how multiple users can individually access separate, unique patient medical records that are a part of a patient medical file associated with the patient medical records system, with each user access being associated with a unique closed feedback loop.

FIG. 35 is a block diagram 3500 that depicts how multiple users can individually access separate, unique patient medical records that are a part of a patient medical file associated with the patient medical records system, with each user access being associated with a unique closed feedback loop. This figure extends the feedback loop concept by illustrating the superposition principle associated with patient medical record access by multiple users, wherein the term "superposition" is used to denote independent access by multiple users. In one embodiment, patient file 3502 comprises a set of patient medical records 3504, wherein the set of patient medical records 3504 comprises individual patient medical records $R_1^{u1}$ 3514, $R_2^{u2}$ 3516, $R_3^{u3}$ 3518, through $R_N^{uN}$ 3520. User 1 3506 accesses patient medical record $R_1^{u1}$ 3514 via feedback loop 3522, user 2 3508 accesses patient medical record $R_2^{u2}$ 3516 via feedback loop 3524, User 3 3510 accesses patient medical record $R_3^{u3}$ 3518 via feedback loop 3526, and so on through user N 3512, who accesses patient medical record $R_N^{uN}$ 3520 via feedback loop 3528. Note that each user accesses the associated patient medical record independently of other users.

In FIG. 35, we see that each record in the patient file is being accessed by an independent user. Each user access involves a feedback loop; each feedback loop involves the detailed flow shown in FIG. 31. Returning to FIG. 35, we see that each feedback loop is independent of the other feedback loops, and the entire patient file access is composed of these N independent record accesses. In other words, the principle of superposition applies here. Each record undergoes an independent encryption/decryption process with an independent set of encryption keys that is unique for each user. A set of independent routing systems can be instantiated for each user, wherein the routing system architecture provides the security features discussed previously.

In one embodiment, the patient medical records system is intended to be accessed by multiple users, wherein different users have different security levels. Each user has his or her own record version for a particular patient, wherein a user's version consists of a single, common medical record that is uniquely encrypted by that user's public key. This leads to the question of how records are updated or synchronized across the entire user spectrum when one user updates the record associated with him or her. For example, consider three possible users of a medical record R: the patient, the hospital and an EMT worker. Suppose three versions of the record are stored in the database, encrypted as $R^u$, $R^H$ and $R^E$, corresponding to the user, hospital and EMT worker public keys respectively. Suppose the EMT worker reads in the EMT record $R^E$, updates the record to R', and then stores the record back to the database encrypted with the new public key, as $R'^{E'}$. Now, we are faced with the problem of refreshing the records corresponding to the user and hospital with the new data contained in R'. In order to achieve this, two different approaches are suggested.

In the first approach, the entity that updates the record takes this updated record R' and renders different versions of this updated record, with each version being encrypted with the public key of a different authorized user of this document. All these different versions are parked in a secure database, and a flag is set for each user, telling the user that the record has been updated. When a user has to access the updated record, the user is alerted to the presence of an updated record, and then accesses the corresponding record from the secure database, decrypts the record using the corresponding private key, and accesses the updated record. In the example discussed above, the EMT worker's system would create two additional copies of the updated record, $R'^u$ and $R'^H$, both of which are stored in a queue on a secure database. The EMT worker's system would also set flags for each of these two users, alerting them to the updated record. If, at some time in the future, either of the two users wishes to access this record, then the user simply retrieves the updated record updated with their public key from the queue, decrypts this record with the corresponding private key, accesses the record, and then updates and stores the record as described earlier. This approach to refreshing records by storing all updated records in a queue provides a solution; however it also results in a lot of data being generated, with a correspondingly large amount of data I/O. The second approach discussed below helps work around this issue.

The second approach to record synchronization uses a tiered user structure. Here, for a specific set of patient records, each user has access to all the keys of the users in the in the tiers below them; users in the lowest tier have access to all keys of all users in that tier. Then, each user, after refreshing the respective record, encrypts this record with the key of each of the users in the lowermost tier that is allowed to access this record, making one copy of the record for each distinct encryption key. Then, each user wishing to update their record can access the updated record and decrypt it with the shared lower-tier private key, and re-encrypt the record using their own public key. Alternatively, the each tier can be assigned a unique, common public/private key pair that is shared between all users in that tier and all tiers above that tier. This public/private key pair can now be used for all authorized users to refresh their individual copies of the updated record with the new information. In this way, the problem of large data management created by the previous approach is now no longer a file management problem; the problem is reduced to a key management problem. Key management has far less computational requirements as compared to data file management, resulting in a more computationally efficient realization.

Figure 36:
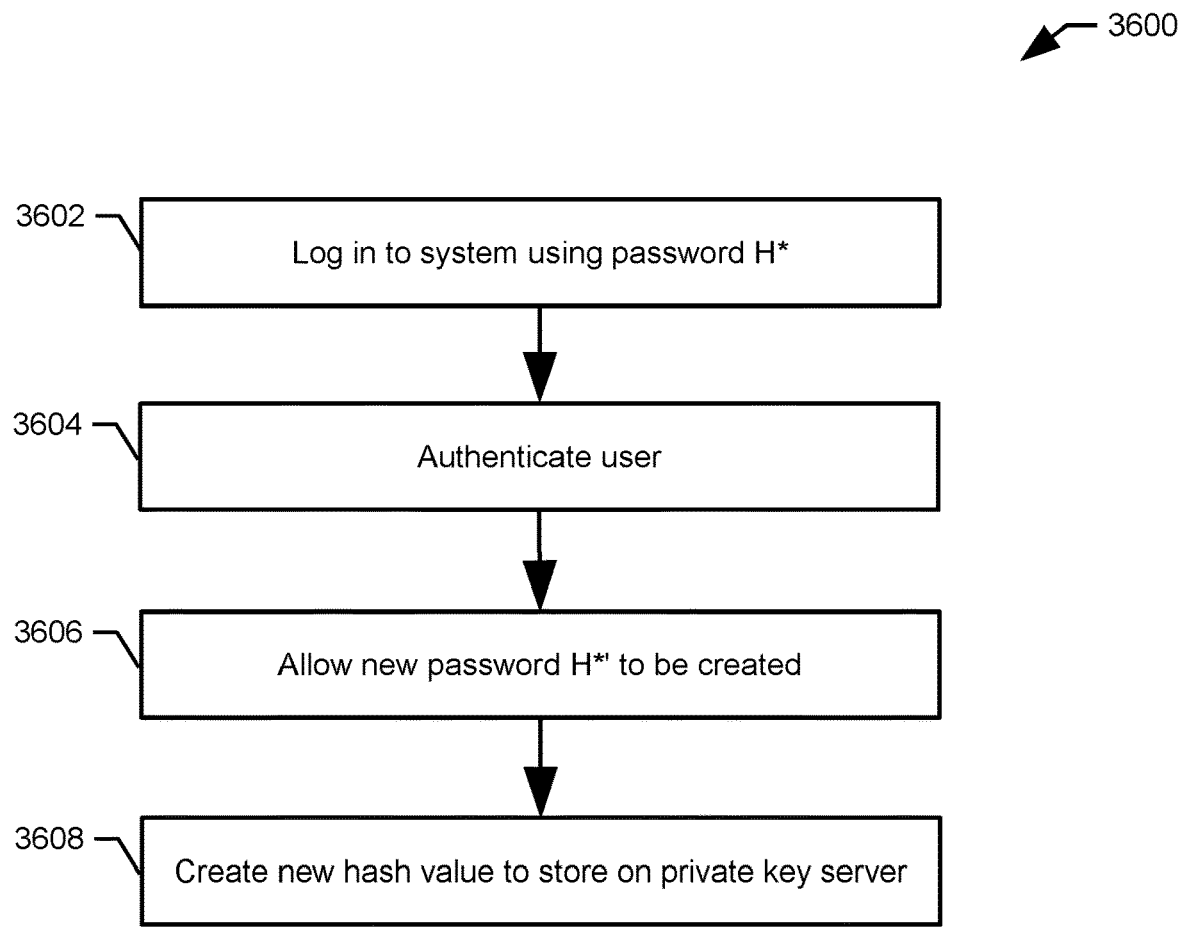
FIG. 36 is a flow diagram depicting an embodiment of a method used to change a user password associated with the patient medical records system.

FIG. 36 is a flow diagram 3600 depicting an embodiment of a method used to change a user password associated with the patient medical records system. At 3602, a user logs into the system using password H*. At 3604, the system authenticates the user. Next, at 3606, the system allows a new user password, H*', to be created. Finally, at 3608, a new hash value is created to be stored on the private key server.

Figure 37:
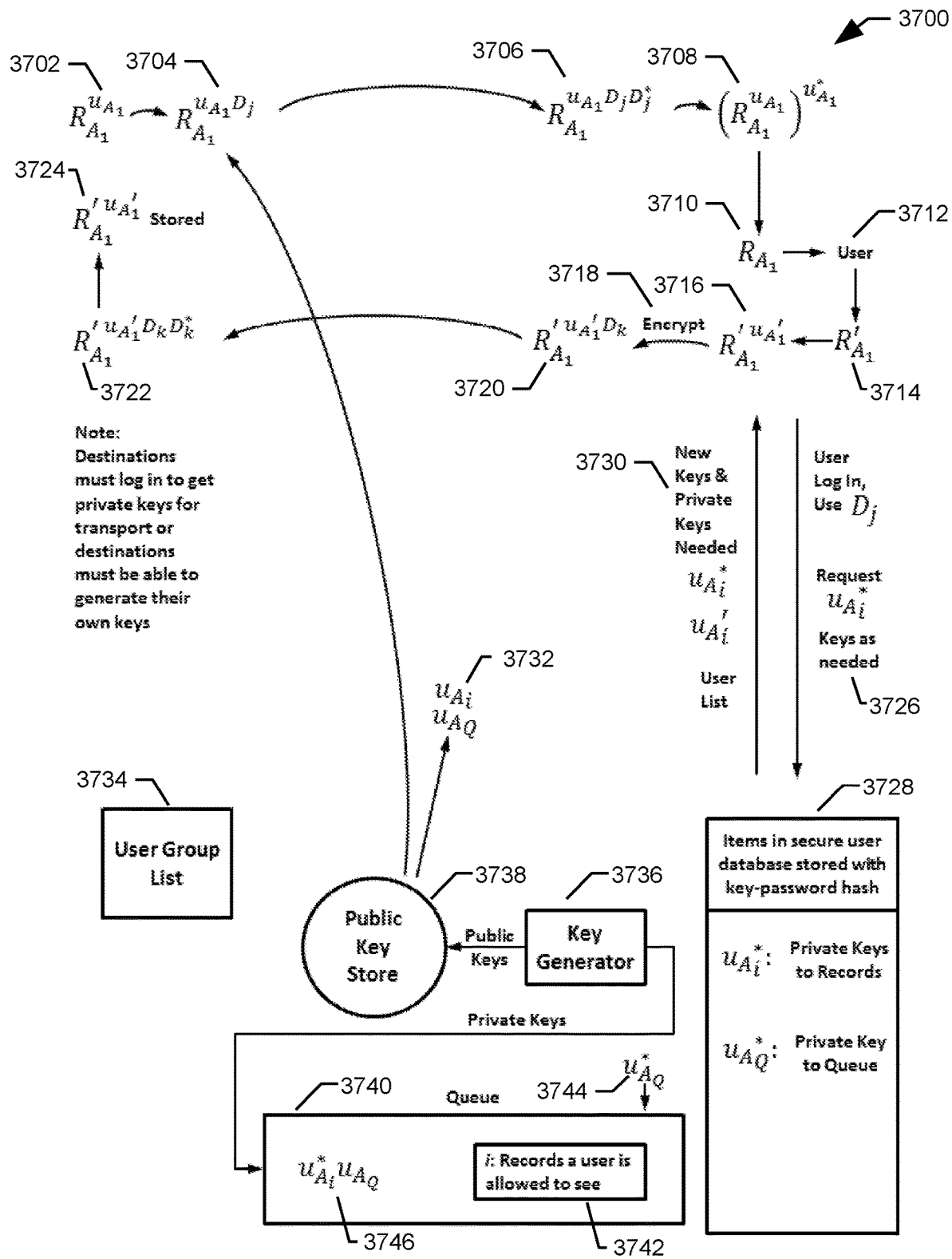
FIG. 37 is a block diagram that depicts a queueing system that is used to allow multiple users to access different versions of a patient medical record associated with the patient medical records system.

FIG. 37 is a block diagram that depicts a queueing system 3700 that is used to allow multiple users to access different versions of a patient medical record associated with the patient medical records system. In one embodiment, a user wishes to access a specific record. This record, $R_{A1}^{uA1}$, stored encrypted with the user public key at 3702, is further encrypted with the destination public key, $D_j$ at 3704, and sent to the requestor as $R_A^{uA1Dj}$. The user (requestor) decrypts this record at 3706 with the user private key $D_j^*$ to get $R_{A1}^{uA1}$, the record encrypted with the user public key. In order to further decrypt this record, the user logs in to the user secure database at 3726 using the destination public key, $D_j$ and the required password, and requests the user private key $u_{Ai}^*$ in order to decrypt the document. (In this example, i=1.) All keys are stored in the secure database 3728 encrypted with a key-password hash, wherein the password is unique for each user. The user reads in not only the user private key $u_{Ai}^*$, but also the updated user public key, $u_{Ai}'$ as well at 3730; in this case, i=1. At the same time, the secure database 3728 also pushes the pushes the queue private key associated with this record, $u_{AQ}^*$ 3744, to the key queue.

The user decrypts the record at 3708 using $u_{Ai}^*$ to get the original record, $R_{A1}$ at 3710, processes the record at 3712 and updates the record if necessary, to $R_{A1}'$ at 3714. The user then transmits the record back after first encrypting the record with the new user public key at 3716, to get $R_{A1}'^{uA1'}$, as well as the destination public key $D_k$ at 3718, to get $R_{A1}'^{uA1'Dk}$ at 3720. The destination receives this encrypted file and decrypts it at 3722 using the destination private key, $D_k^*$, to get the revised encrypted record, $R_{A1}'^{uA1'}$ at 3724, where it is stored.

The queue 3740 is a secure database that stores the user private keys that are further encrypted with the queue key—$u_{Ai}^*u_{AQ}$ 3746, where the index i is used to denote the list of records that a user is allowed to see 3742. The queue 3740 is important to allow this key processing approach to work properly. Each time a record is viewed by an authorized user, the encryption key to that record is changed (U'A1 for example), which means that all of the other authorized users can no longer access the new version of the record $R'_{A1}{}^{u'A1}$. This means that the secure database of keys is now out of date and must be updated. However this can only be done when the user logs into their secure database. Thus, the queue holds these updated keys (encrypted by the public queue key associated with each authorized user) until the other authorized users each log into their respective databases. When that login event occurs, the queue is read into the database, with each encrypted private key being unencrypted by the Private Key to Queue, thus updating all of the keys that have changed and immediately updating the full database of the user. After this process occurs, there needs to be a new Private Key to Queue generated by the key generator. The new private key is then stored into the user database and the queue is clean. If the user needs to have access to a record that has changed since they last logged in, the new key has been placed in the database when the queue is read into the database. The result of this process is that no key is used more than one time, there is only one copy of the medical record in each case, and multiple authorized users can have access and modification rights with minimal data transmitted and maximum security. Associated with the queue is a key generator generates both user public and private keys. Each time a new set of keys is generated the key generator 3736 transmits the appropriate public keys to the public key store 3738, where they are made available to the corresponding user, wherein the public keys are the user public key, $u_{Ai}$ and the queue key $u_{AQ}$, at 3732. A user group list 3734 maintained by an administrator maintains a list of active users and also allows the addition or deletion of users.

Figure 38:
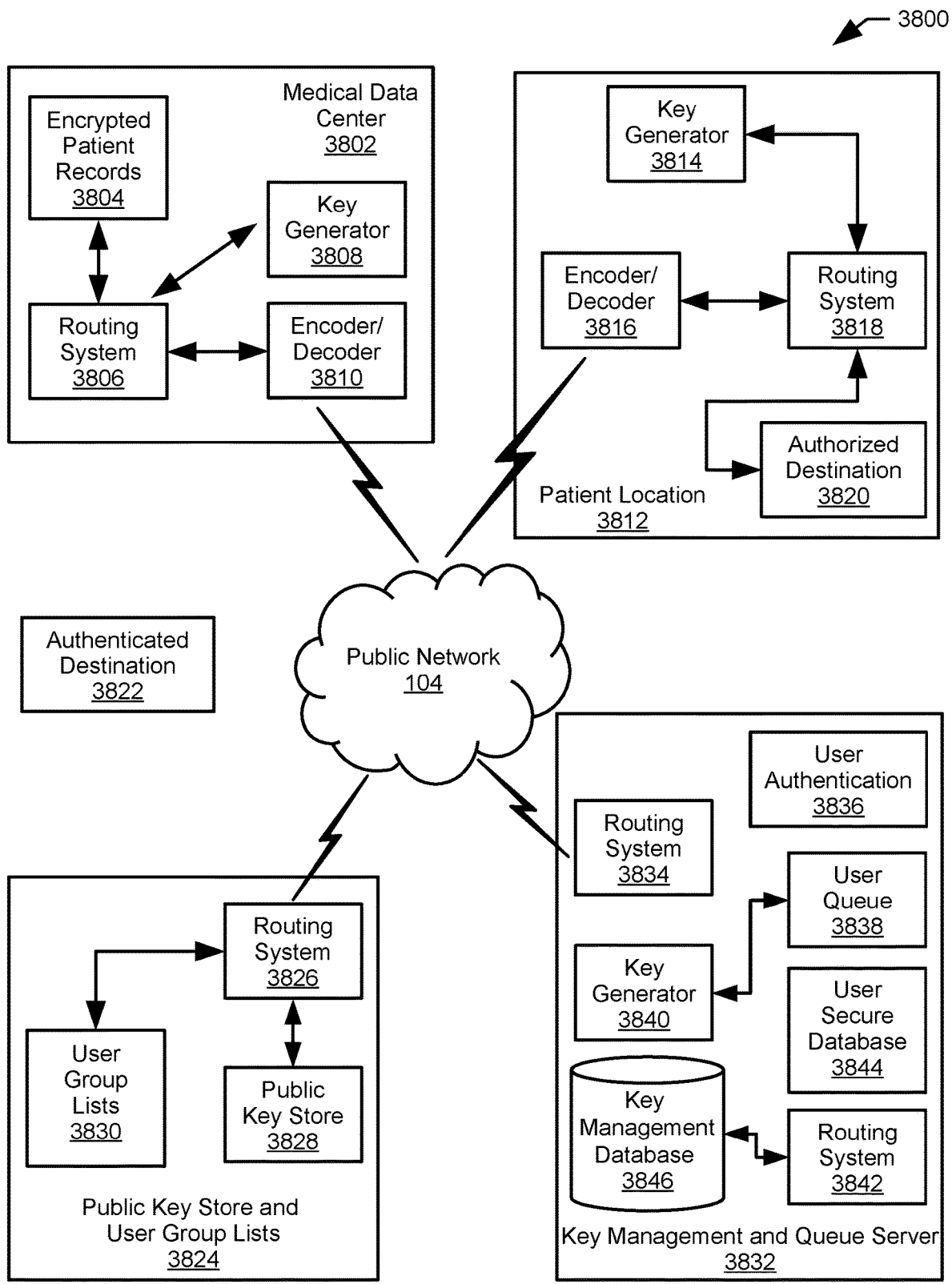
FIG. 38 is a block diagram that depicts the architecture associated with the queuing system that is used to allow multiple users to access different versions of a patient medical record associated with the patient medical records system.

FIG. 38 is a block diagram that depicts an architecture 3800 associated with the queuing system that is used to allow multiple users to access different versions of a patient medical record associated with the patient medical records system. In one embodiment, medical data center 3802 includes encrypted patient records 3804, routing system 3806 interfaced to public network 104 via encoder/decoder 3810, and key generator 3808 that generates the necessary keys. Patient location 3812 includes key generator 3814 that generates the necessary keys, routing system 3818 interfaced with public network 104 via encoder/decoder 3816, and authorized destination 3820. Public key store and user group lists 3824 includes routing system 3826 interfaced with public network 104, public key store 3828, and user group lists 3830. Key management and queue server 3832 includes routing system 3834 interfaced with public network 104, user authentication block 3836, user queue 3838, key generator 3840, key management database 3846, and routing system 3842.

At the patient location 3812, a requestor (e.g. hospital, EMT, doctor, etc.) at a specific location (e.g. hospital, home, roadside, etc.) requests a specific record for reference. The document is forwarded to the requestor based on the flow discussed above in FIG. 37. The key management database 3846 is a secure database that contains all the user keys and record queue keys, and is protected by routing system 3842. User authentication block 3836 (which can also be monitored by a routing system) provides the necessary authentication functions. Finally, we have the user group lists 3830 in the public key store and user group lists block 3824 that are monitored by a network administrator. The network administrator has the ability to add or delete users from a group, as well as the ability to manage privileges. Routing system 3826 protects the user group lists. A key generator 3840 generates the necessary keys.

Since the user group lists 3830 are monitored by an administrator, the integrity of the administrator becomes a crucial aspect to maintaining the integrity of the system security. To avoid a single person being in charge of this task, multiple administrators can be assigned, with simultaneous authorization from all administrators being required before any operation is carried out. In this way the risk of espionage, for example, is minimized. Keeping records and keys at separate locations and having a separate administrator for each function is another way of minimizing security risks.

From an operational perspective, each user has a special key for managing their queue, and in each of their queues are all of the keys that were generated for records they should have access to while they were not logged in. Whenever a user logs into their account all of the keys in the queue are unencrypted by the private Q key held by the user's secure database and put into their secure database. When the queue is empty a new Q key is generated. The private Q key is stored in a secure database by the password hash encryption method, and the public Q key is open to other users such as EMT personnel who would change records and need to put the new record key in the users queue. Then, the user can read out whatever keys they need in order to unlock the records that they need to have access to.

For every given record there is a group of people who are allowed access to it. That group is maintained by a trusted administrator and given access to the appropriate keys. Obviously this administrator needs to be honest and carefully managed. In this way the groups that are allowed access to a given record segment can be expanded as needed. Also, users can be deleted by the administrator if necessary. Thus, every record segment has a loop that allows that record to be read, updated and then encrypted as described previously. This loop is accessible by any of the users named in the specific group for that record segment, based on the idea that medical records files are built up from record segments. Each record segment has a set of allowed users. Each of the allowed users must be registered as a patient or a specific authorized user. These specific authorized users are EMT, hospitals, nurses etc. In the system we can give required people access to required portions of the patient's medical record. Every key is changed after one use. A routing system sits between the secure database and processing system, and the rest of the network. This routing system would allow all of this encryption to be at the highest level and us much safer from attack. The biggest weakness in the system, as discussed above, is the administrator who allows users to access specific record segments. However this is normal in any system and this can be mitigated by having only special allowed destinations to be included in a group along with only one patient.

User group management is another area that needs to be discussed. There are two methods that can be used to achieve this. The first method is for patients and owners of the records. Here, the patient logs into the authority and creates a password, after which the user is given an account with a secure database. The user then has to have two things happen. First, a set of records needs to be created for that user. Second, a group capable of accessing those records needs to be created. At this point, the administrative authority designates the appropriate groups such as hospitals and EMTs in the area. As far as records are concerned, a virtual set of records is created for the user with an initial set of keys. There are in fact no records initially; only a location (an empty placeholder) exists at this time. These placeholders are filled with the appropriate modified records as and when they are created. In other words, when each of these records is accessed for the first time by either the user, or more likely one of the authorized destinations such as a hospital that accesses the record, the user has initial no information to read from the file, and populates it with information from existing paper records or from a different system. The record is re-encrypted with a new key supplied by the key system. In this way, records are loaded for the new user. Once the user is assigned to the appropriate groups, each member in that group is given updated keys for all the records placed into their queue as a part of the normal key distribution procedure. The second method for user group management is for a new hospital that joins the group, or a new EMT authorized destination. In this case these entities are assigned to a specific group such as a group that includes other hospitals, where they will share the keying infrastructure with those other entities. These authorized destinations can effectively share a single large secure data base with all the security properties described in this document. Thus, additional security steps are not required. In this case only an authorization and authentication needs to occur, followed by the creation of the password for the new user. Once the new user has a password, that user can login and start directed modification processes just like any other user.

Figure 39:
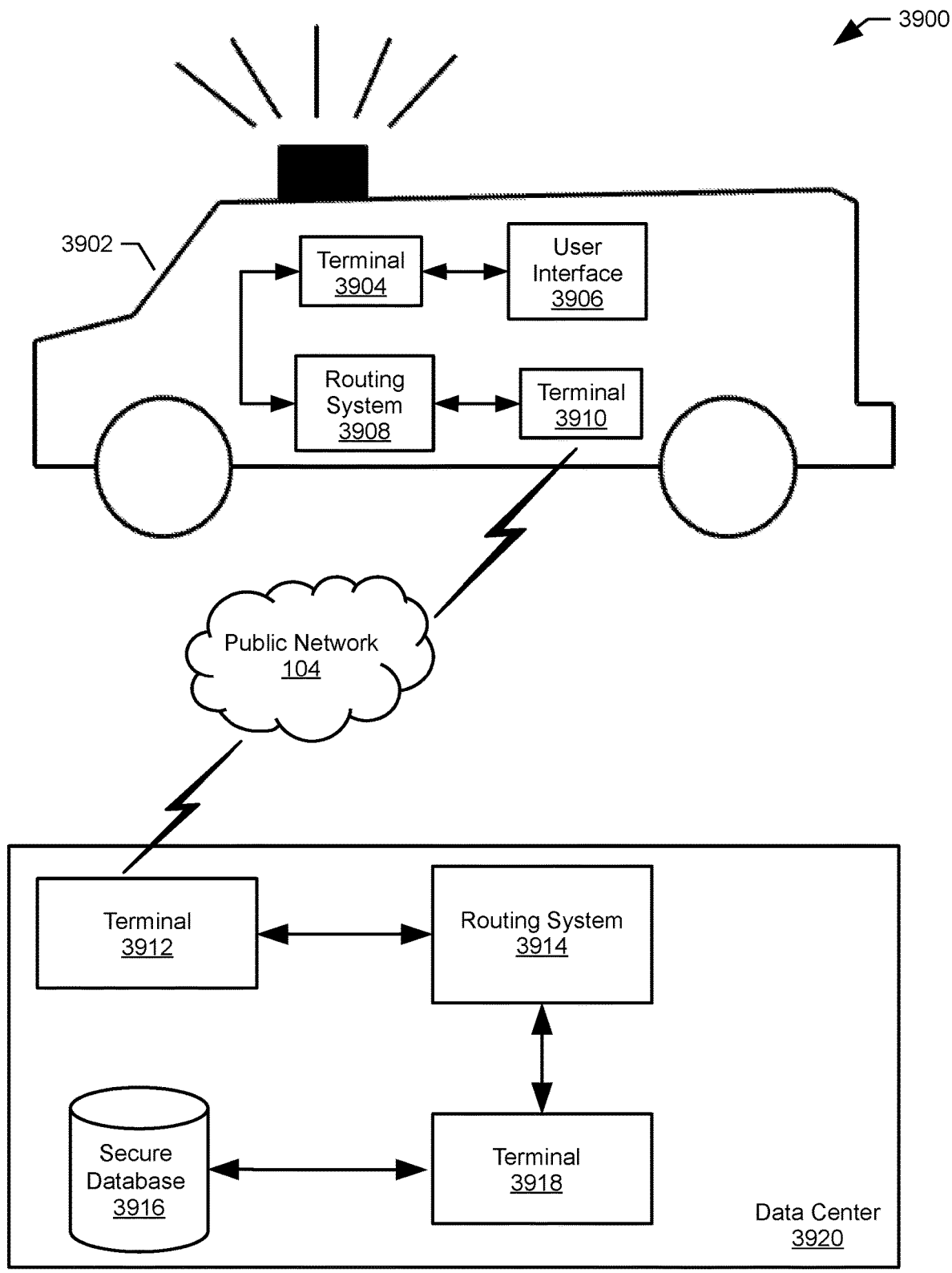
FIG. 39 is a block diagram that depicts a mobile data center that includes a routing system, wherein the mobile data center is associated with the patient medical records system.

FIG. 39 is a block diagram that depicts a mobile data center 3900 that includes a routing system, wherein the mobile data center is associated with the patient medical records system. In some embodiments, routing system 3908 is implemented in a mobile location such as an ambulance 3902. Routing system 3908 is interfaced with public network 104 via terminal 3910, and with user interface 3906 within the ambulance 3902 via terminal 3904. Routing system is now able to securely access secure database 3916 located within data center 3920, wherein secure database 3916 is protected by routing system 3914, and wherein routing system 3914 is interfaced with public network 104 via terminal 3912, and routing system 3914 is interfaced with secure database 3916 via terminal 3918. In some embodiments, secure access methods including symbolic https allow the requestor in ambulance 3902 to securely request, process and write back patient medical data to and from secure database 3916.

Figure 40:
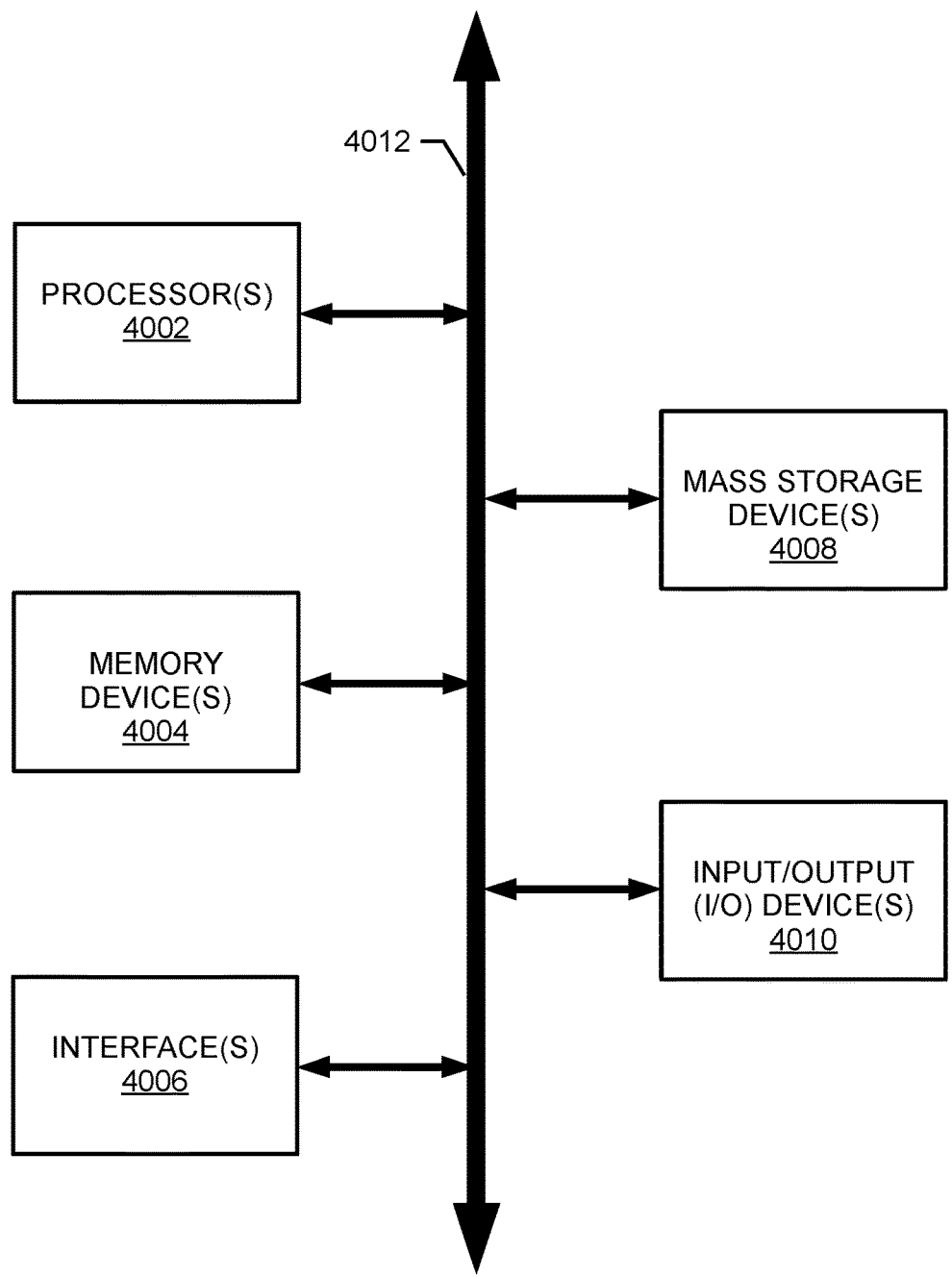
FIG. 40 is a block diagram that depicts a generalized processing architecture that can be used to implement the routing system and other systems and components discussed herein.

FIG. 40 is a block diagram that depicts a generalized processing architecture 4000 that can be used to implement the routing system and other systems and components discussed herein. Embodiments of the present invention can be implemented using a generalized processing architecture that includes one or more processors 4002, one or more memory devices 4004, one or more interfaces 4006, one or more mass storage devices 4008, and one or more input/output devices 4010, wherein all the different components that comprise the system are interfaced via a centralized bus 4012.

Figure 41:
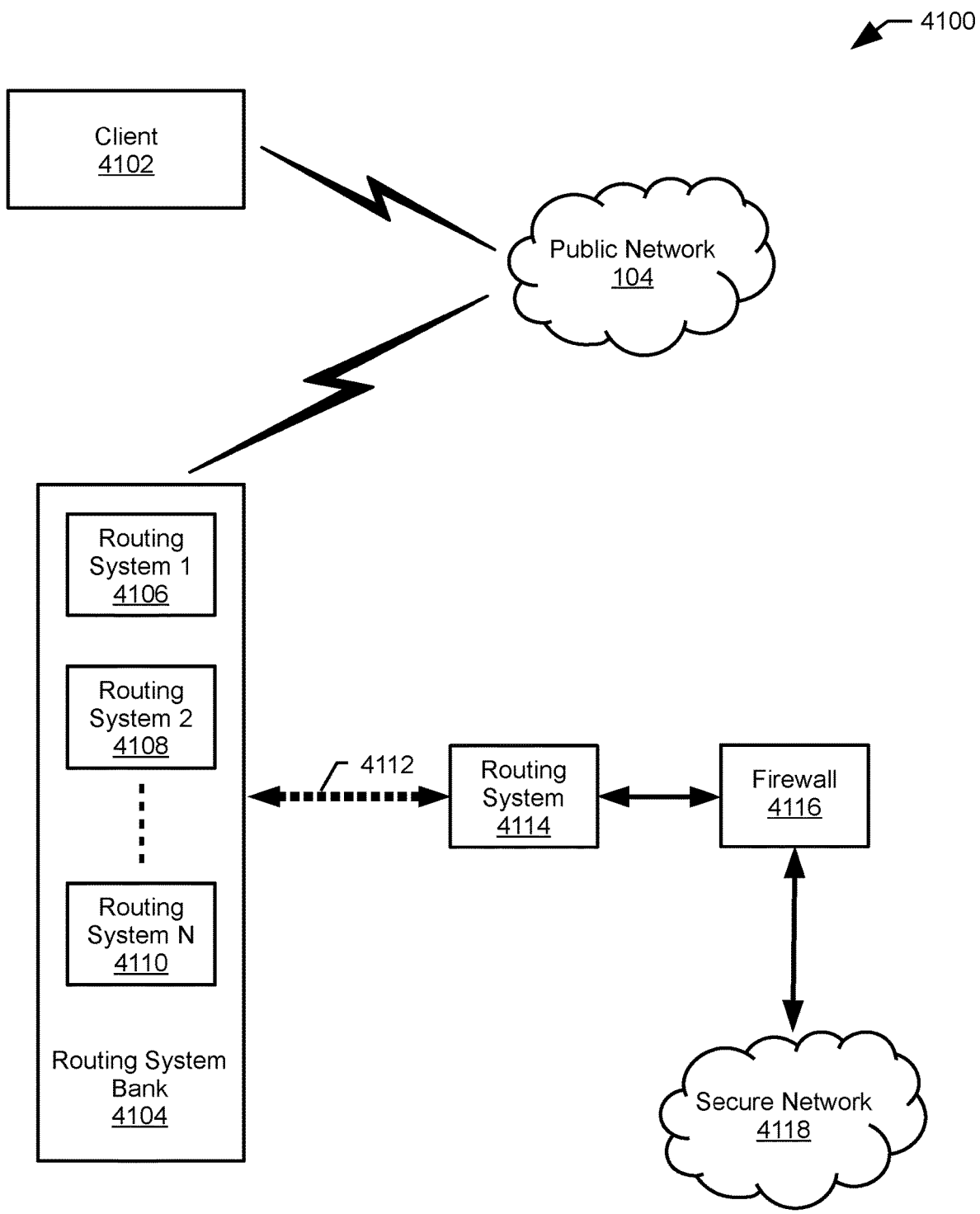
FIG. 41 is a block diagram depicting an embodiment of a system that allows remote client access to an intranet.

FIG. 41 is a block diagram depicting an embodiment of a system 4100 that allows remote client access to an intranet. In some embodiments, a client 4102 (or a client device) may request access to a secure network 4118, via public network 104. Client 4102 may be a laptop computer, a desktop computer, a mobile device such as a tablet or a mobile phone, or any other computing device or combination of similar computing devices. Client 4102 may, for example, request a file from secure network 4118. The request from client 4102 is routed via public network 104 and is received by a routing system bank 4104, where routing system bank 4104 comprises a plurality of routing systems—routing system 1 4106, routing system 2, 4108 through routing system N 4110. Routing system 1 4106 through routing system N 4110 interface with public network 104, and may perform functions such as user authentication associated with client device 4102, along with initial encryption key exchange functions. Routing system bank 4104 (i.e. routing system 1 4106 through routing system N 4110) is interfaced with a routing system 4114 via an interface referred to as a firebreak 4112. A firebreak such as firebreak 4112, associated with the routing systems described here, is the counterpart of a firewall in contemporary networked systems. Firebreak 4112 prevents any direct network traffic from passing through it, allowing only the symbolic https protocol associated with the routing system (as described earlier) to pass through. (A conventional firewall allows filtered Internet packets to pass through it whereas a firebreak does not.) Firebreak 4112 associated with a routing system allows only the syntax associated with the routing system to pass through it, thus simulating the virtual air gap structure defined above. Routing system 4114 is interfaced with secure network 4118 via a firewall 4116. The request from client 4102 is routed via public network 104, through routing system bank 4104, through firebreak 4112, to routing system 4114. Routing system 4114 processes the request from client 4102, and fulfills the request if the request has passed the necessary validation and security checks (described subsequently). Firewall 4116 provides a network interface between routing system 4114 and secure network 4118, while also providing an additional layer of security to secure network 4118 by filtering undesired traffic from entering secure network 4118. Additional details about the general functionality of a firewall such as firewall 4116 are provided below.

Existing secure network access schemes use a firewall structure in place of the firebreak described above. A network firewall provides a packet filtering function that prevents unauthorized communications from moving across the firewall between the network on one side of the firewall and the network on the other side. Firewalls can filter packets based on network information (such as source and destination routes) all the way up to application information such as file types or application types. A firewall is also typically included between any web server and any associated secure network for additional security. In other contemporary systems, a virtual private network (VPN) server may be included, where the VPN server allows the client to remotely access the secure network. The use of a VPN structure has several vulnerabilities. First, it is understood amongst those skilled in the art of security that VPN has numerous exploits that allow a man-in-the-middle attack to take control of the VPN server. Once an attacker has done this they are able to view the data after decryption within the VPN server itself. Also, there are network exploits that allow sophisticated attackers to then use the VPN server as a platform to attack the firewall, which also has known exploits that can be used to get access the secure server itself. Furthermore, because of the use of standard network protocols between VPN server and firewall, attackers can try various attack methods, and use returning protocol information to determine progress of attack vectors. The following points summarize ways in which the security of networking systems can be improved (as implemented in the routing systems described presently):

Using encryption at the application level.

Using end-to-end encryption so VPN server takeover is not as critical.

Using an un-routable protocol with no information returned across an I/O link to aid an attack.

Creating complete network isolation between authentication, encryption and access operations and the outside world.

Not using any chipsets for I/O across a firebreak (an improvement over the standard firewall structure as discussed above and described subsequently) that can be reprogrammed by an attacker.

Limiting the number of possible commands into secure data in order to limit exposure of critical data.

As a mostly software-defined drop-in block, the routing system architecture described herein provides additional security to existing systems. An important aspect of the security provided by the routing system is that it is impossible for a man-in-the-middle attack to breach the routing system. Other than obtaining a user's password and credentials and entering the system that way, there is no way that an attacker can compromise a system protected by one or more routing systems, and thus it is significantly more difficult to breach than any equivalent connections, including VPN. It is important to note that in the case of VPN an attacker can take control of the VPN server and breach the VPN security. In the case of the routing system, the routing system is designed such that it is inaccessible remotely by an attacker. Also, if an attacker gains access to in-transit data associated with the routing system, the encryption schemes used by the routing system ensure that the attacker will not be able to decrypt and use the data, rendering this information useless to the attacker. In an extreme case, even if the attacker has physical access to the server connected to the public network and gains root access they are still unable to see the data or access the routing system due to features such as the use of look-up tables and the pseudo (virtual) air gap, as well as the robust encryption schemes employed by the routing system. This is a fundamental difference between the routing system described herein and conventional network security systems, providing a significant improvement in security.

Traditional approaches to accessing Enterprise data from outside of an Intranet such as secure network 4118 rely on Firewalls and VPNs. There are known and developing attacks against both of these devices. Once an attacker controls the device they can leisurely attack other devices on the network which are normally not protected from special attacks since they are in the "safe zone" of the Intranet. In this regard, the routing system utilizes a firebreak to control the first point of entry into the Intranet. That is, the routing system resides inside the Intranet so that it may access Enterprise services, but it does not rely on controlling or limiting access of incoming network traffic. The routing system, when communicating to the outside world, utilizes a non-routable message construct and transport thereby prohibiting an attacker from gaining access. Even if routing system bank 4104 is compromised, the agent device (routing system 4114) knows nothing about the messages being routed from the client machines, nor can it generate any valid request. Routing system 4114 thus ignores any invalid requests and only performs the user-defined list of requests. It is not possible to instruct the routing system to do anything other than that for which it was programmed, and this is the core security functionality of the robot router.

Figure 42:
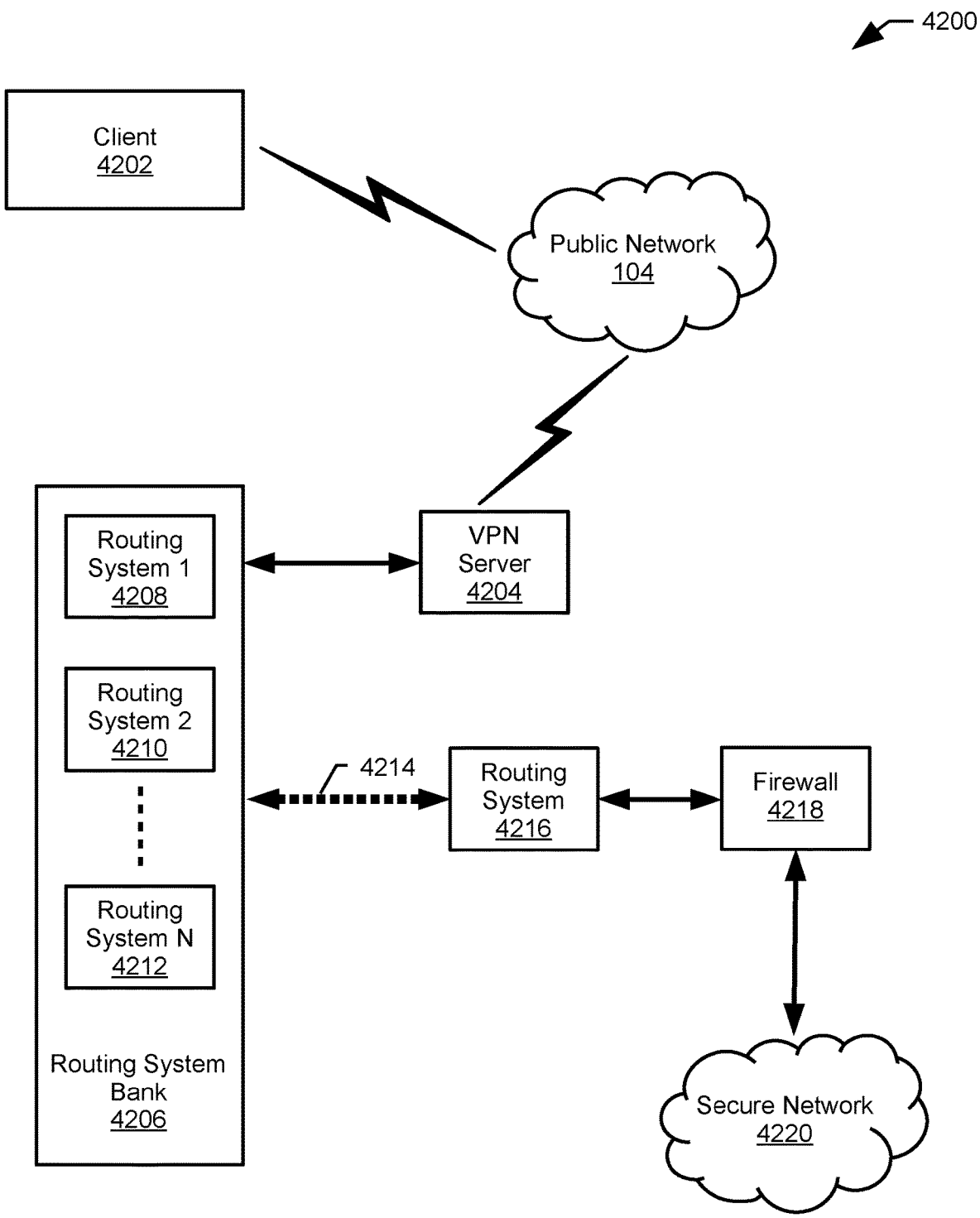
FIG. 42 is a block diagram depicting an embodiment of a system that allows remote client access to an intranet via a Virtual Private Network (VPN) server.

FIG. 42 is a block diagram depicting an embodiment of a system 4200 that allows remote client access to an intranet via a Virtual Private Network (VPN) server. In some embodiments, a client 4202 (or a client device) may request access to a secure network 4220, via public network 104. Client 4202 may be a laptop computer, a desktop computer, a mobile device such as a tablet or a mobile phone, or any other computing device or combination of similar computing devices. Client 4202 may, for example, request a file from secure network 4220. The request from client 4202 is routed via public network 104 and is received by a VPN server 4204. VPN server 4204 allows client device 4202 to remotely access secure network 4220. VPN server 4204 routes the client request to a routing system bank 4206, where routing system bank 4206 comprises a plurality of routing systems—routing system 1 4208, routing system 2, 4210 through routing system N 4212. Routing system 1 4208 through routing system N 4212 interface with VPN server 4204, and may perform functions such as user authentication associated with client device 4202, along with initial encryption key exchange functions. Routing system bank 4206 (i.e. routing system 1 4208 through routing system N 4212) is interfaced with a routing system 4216 via a firebreak 4214. Routing system 4216 is interfaced with secure network 4220 via a firewall 4218. The request from client 4202 is routed via public network 104, through routing system bank 4206, through firebreak 4214, to routing system 4216. Routing system 4216 processes the request from client 4202, and fulfills the request if the request has passed the necessary validation and security checks (described subsequently). Firewall 4218 provides a network interface between routing system 4216 and secure network 4220, while also providing an additional layer of security to secure network 4220 by filtering undesired traffic from entering secure network 4220.

Figure 43:
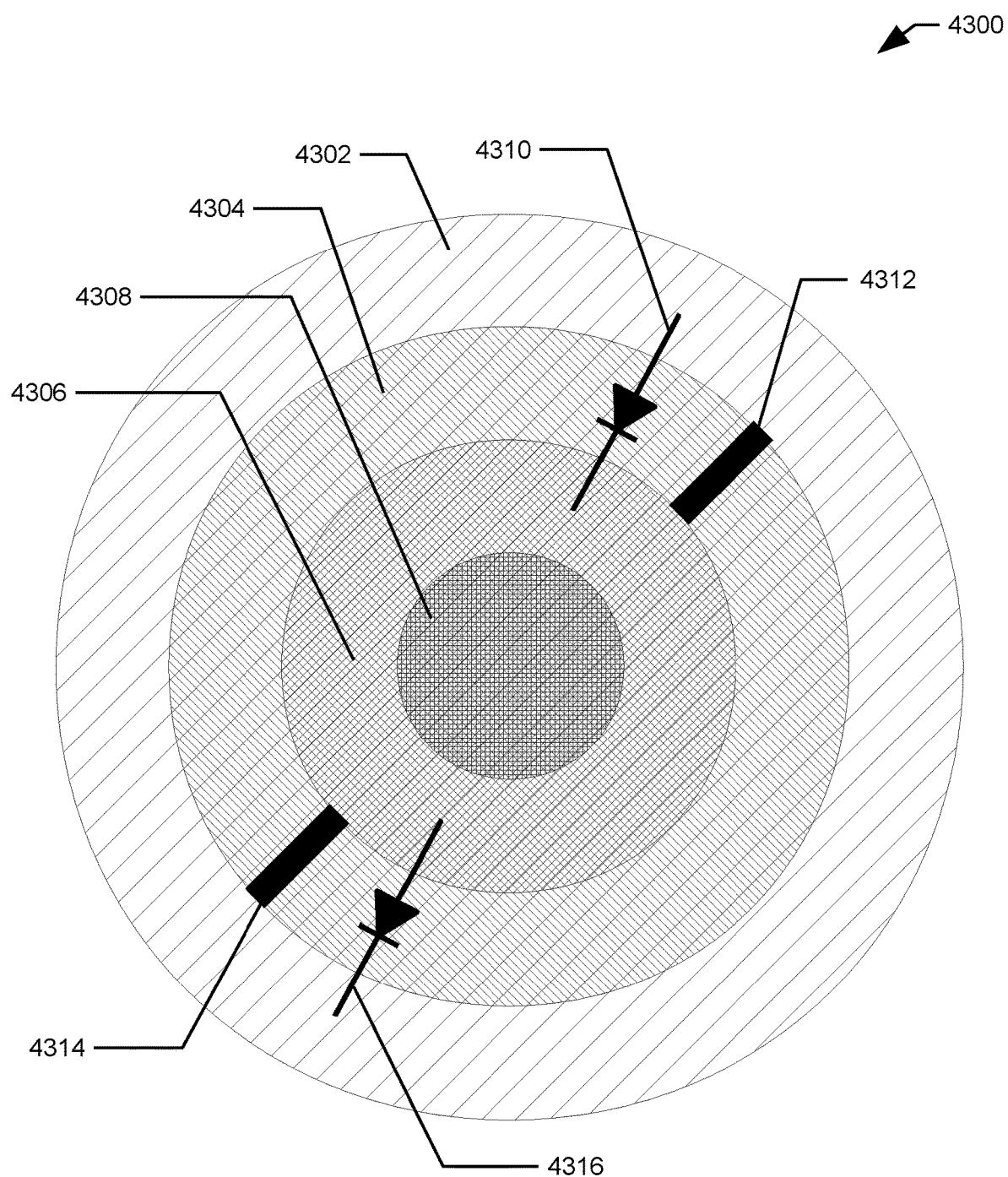
FIG. 43 is a schematic depicting a structural representation of data flow in network systems using an embodiment of the routing system.

FIG. 43 is a schematic depicting a structural representation 4300 of data flow in network systems using an embodiment of the routing system. As seen in the figure, structural representation 4300 depicts a multi-layered structure. A first layer 4302 represents the front ends associated with a routing system implementation, where a front end may include routing system bank 4104, or a combination of VPN server 4204 and routing system bank 4206. A second layer 4304 represents a firebreak such as firebreak 4112 or firebreak 4214. A routing system such as routing system 4114 or routing system 4216 is represented by a third layer 4306. A secure network or database such as secure network 4118 or secure network 4220 is represented by a kernel 4308. The combination of first layer 4302, second layer 4304 and third layer 4306 serve to secure and protect kernel 4308. Also shown in FIG. 43 are a data diode 4310 and a data diode 4316. Data diode 4310 and data diode 4316 each comprises a unidirectional data channel, which allows data to flow only in one direction—data flow in the opposite direction is not allowed (i.e. blocked). Thus, data diode 4310 allows data flow only from first layer 4302 to third layer 4306 via second layer 4304, and data diode 4316 allows data flow only from third layer 4306 to first layer 4302 via second layer 4304. A barrier 4312 and a barrier 4314 included in the firebreak structure as implemented in second layer 4304 further serve to prevent any reverse data flow. In this sense, the two unidirectional data channels are uncoupled.

Conceptually, a data diode essentially allows data to pass through only in one direction, with data flow in the opposite direction being blocked. Hence, we have an exclusive input channel and an exclusive output channel, with no backflow of data possible due to the robust security rules enforced by the routing system. The firebreak also does not use conventional networking protocols, and this further increases the security of the system. Furthermore, isolating (decoupling) the input and output channels from each other greatly reduces the risk of an attacker using reverse data flow techniques in an attempt to compromise the system. Even if an attacker gains access to the data being transmitted to or from the client, the robust encryption used by the routing system will render this data useless to the attacker since the attacker will not be able to decrypt this data. The combination of the data diode and firebreak contrast with existing networking protocols, where the latter implement a system with bidirectional flow of data between the front ends and the database via any existing firewall. Note that the since the communication channel is bidirectional in contemporary systems, with data flow being allowed either way through the same channel, these systems have an inherent vulnerability to attack.

Figure 44:
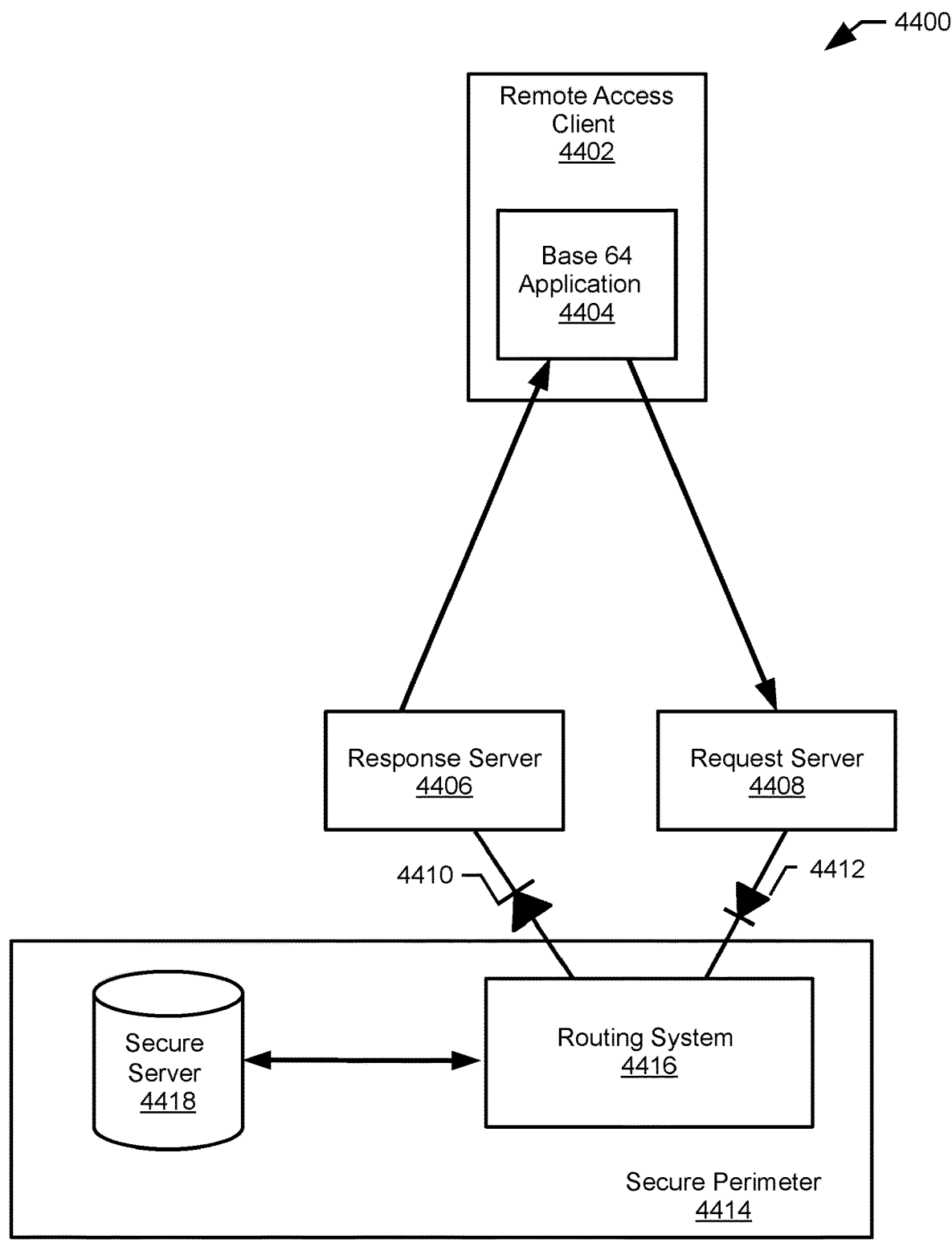
FIG. 44 is a block diagram depicting an embodiment of a secure remote database access system implemented using the routing system.

FIG. 44 is a block diagram depicting an embodiment of a secure remote database access system 4400 implemented using the routing system. In some embodiments, a remote access client 4402 may request access to a secure server 4418. Remote access client 4402 may be a laptop computer, a desktop computer, a mobile computing device such as a tablet or a mobile phone, or any other computing device or some combination thereof. In some embodiments, remote access client 4402 runs application software such as a Base 64 application 4404, where Base 64 application is designed to communicate using a Base 64 encryption protocol that is consistent with the routing system protocol. Remote access client 4402 generates a request to access secure server 4418. This request is routed to a request server 4408, which then communicates with a routing system 4416 via a firebreak 4412. Request server 4408 accepts an encrypted file from remote access client 4402 that includes all of the request and authentication information for routing system 4416. Request server 4408 does not decrypt or process this file; instead request server 4408 simply sends the encrypted file through firebreak 4412 (which may be implemented using, for example, a parallel port) to routing system 4416, where routing system 4416 is an unknown and unseen destination for request server 4408. Request server 4408 has no way to know anything about the encrypted information and thus cannot compromise the data in the case that the request server is compromised.

The communication link (i.e. firebreak 4412) between request server 4408 and routing system 4416 is a one-way (unidirectional) communication channel where data can flow only from request server 4408 to routing system 4416, and is equivalent to a data diode as shown in the figure. Routing system 4416 also performs the function of an authentication server, authenticating any user credentials during a transaction. Together routing system 4416 and secure server 4418 are included in a secure perimeter 4414, where secure perimeter is isolated and protected from external attack. It is important to note that in order to improve security, there are no sessions generated by the system; rather a key rotation mechanism is used at every transaction, which will be discussed subsequently. Routing system 4416 is interfaced with secure server 4418, and performs data access (read/write) according to the client request. Routing system 4416 communicates data back to remote access client 4402 via a response server 4406 to fulfill the request of remote access client 4402. Again, the data channel between routing system 4416 and response server 4406 is a one-way data channel implemented using a firebreak 4410, supporting data communication only from routing system 4416 to response server 4406 in the manner of a data diode as represented symbolically in FIG. 44. Response server 4406 is the recipient of an encrypted file from routing system 4416, where the encrypted file is to be returned to remote access client 4402. The encrypted file is the response to the request generated by remote access client 4402. Response server 4406 has no knowledge what is in the encrypted file, and does not have any way of decrypting the encrypted file. The file is encrypted by the routing system 4416 and passed through firebreak 4410. Response server 4406 gets the data coming through the firebreak 4410 and knows that the name of the file is the first part of the file. Response server 4406 then creates a file on disk that includes the name of the file along with the encrypted data. Again, response server 4406 has no way of decrypting the data file. When remote access client 4402 requests the named file (where the file name was sent as part of the request process, generated by remote access client 4402, within the encrypted data) from response server 4406, the file is sent to remote access client 4402 where it is appropriately decrypted.

In some embodiments, a firebreak such as firebreak 4410 or firebreak 4412 is each implemented using a parallel port. This architecture allows customized communication protocols to be implemented, while eliminating the possibility of the system being hacked. The parallel port is implemented using a Peripheral Component Interconnect (PCI) interface, where the parallel data words are serialized/deserialized using a PCI card. The advantage of using a PCI interface as opposed to other communication protocols such as the Small Computer System Interface (SCSI) is that the latter is based around reprogrammable computer chips, and this increases the vulnerability of the system to attacks—an attacker may be able to compromise the system by gaining access to the reprogrammable core of the communication protocol and then reprogramming the chip.

An alternative to using the PCI interface to realize a data diode is to use a Wi-Fi connection, where the "anode" or "source node" of the data diode uses a Wi-Fi node configured to only transmit data, and the "cathode" or "sink node" of the data diode is a Wi-Fi node configured to receive data only. (This mode of operation is referred to as "promiscuous mode.") This structure effectively functions as a data diode, with only one-way information flow being possible. Even though the link between the transmitter and receiver is an RF link, it is important to note that the routing system will be isolated in a remote location, and an attacker will have to be in the vicinity of the system in order to tap the RF link. Enclosing the Wi-Fi transmitter and Wi-Fi receiver in RF shielding material such as a Faraday cage can also be used to further secure the RF link associated with the data diode.

Figure 45:
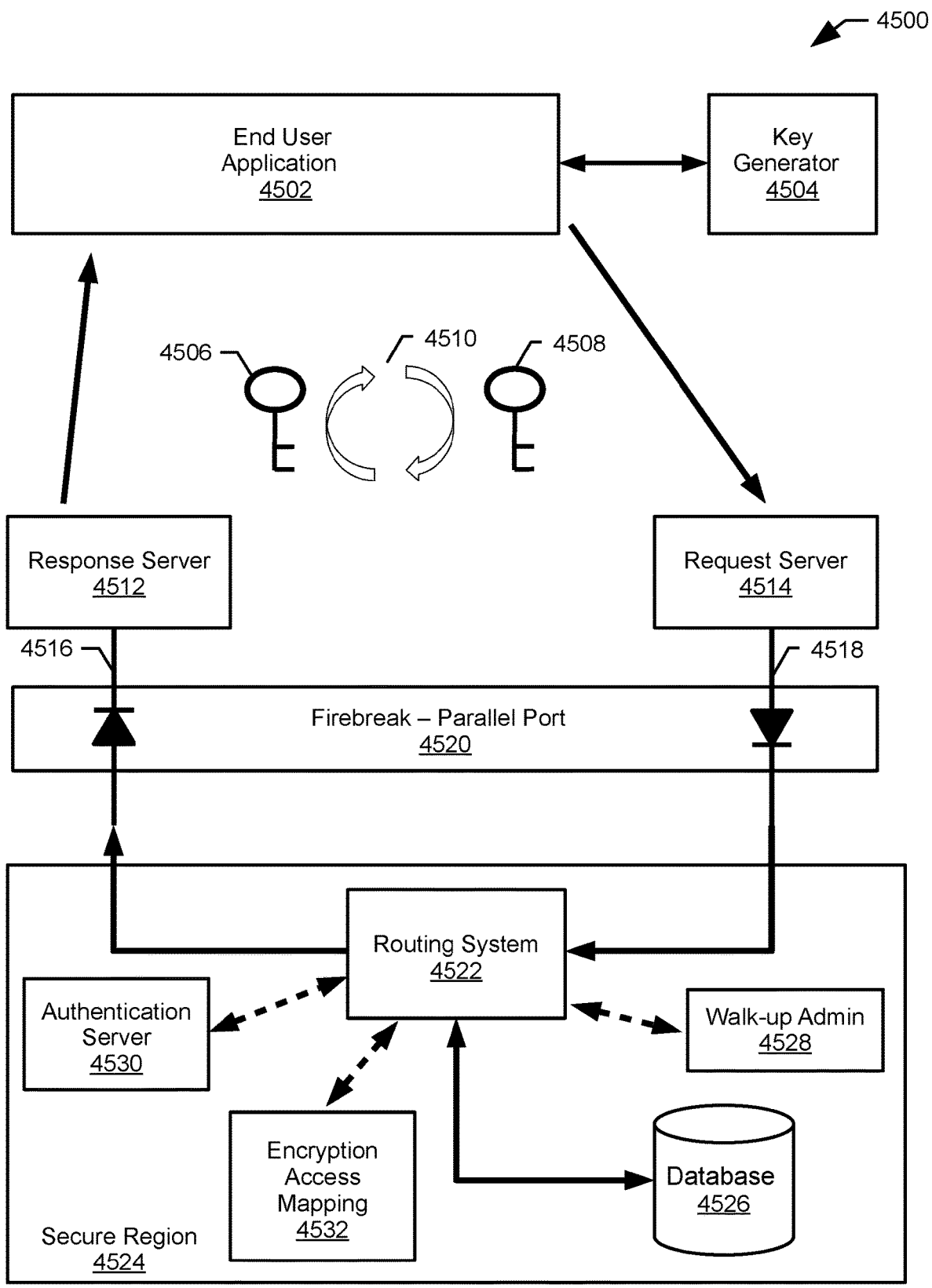
FIG. 45 is a block diagram depicting an embodiment of the operational details of a remote data access system implemented using the routing system.

FIG. 45 is a block diagram depicting an embodiment of the operational details of a remote data access system 4500 implemented using the routing system. In some embodiments, an end user application 4502 (an application software) running on a computing device such as remote access client 4402 is interfaced with a key generator 4504. End user application 4502 generates a request to access a database 4526 located in a secure region 4524. In some embodiments, end user application 4502 generates, using key generator 4504, a request encryption key 4508, referred to as encryption key A. In other embodiments, request encryption key 4508 may be handed over to a human user associated with the computing device running end user application 4502, via a phone call or by other methods such as an SMS text, by a trusted party that generates or holds all encryption keys (public and private) associated with the operation of remote data access system 4500. A public/private key system may be used to generate the encryption key A for the purpose of key exchange. A routing system 4522, interfaced with database 4526, is configured to decrypt any data encrypted with encryption keys from end user application 4502, where routing system 4522 is configured to securely access data from database 4526. The same trusted party ensures that routing system 4522 is provided with the necessary information to decrypt data encrypted with encryption key A.

End user application 4502 initializes communication with routing system 4522 by encrypting the initial data packet (including client credentials and account and login information along with the request to access database 4526) with encryption key A (request encryption key 4508). Encryption methods such as secure sockets layer (SSL) may be used in conjunction with the Base 64 encryption protocol used by the routing system (as discussed earlier). It is important to note that for increased security, there are no sessions generated or used by either the client or the server. This prevents any session data from being recorded and used later by an attacker (in the form of replay attacks for example). The encrypted initial data packet is transmitted to a request server 4514, which then transmits this initial data packet via a firebreak 4518 (depicted as a data diode in FIG. 45) to routing system 4522. Routing system 4522 receives the initial data packet, and decrypts the data packet using decryption keys corresponding to encryption key A (request encryption key 4508). Authentication data (user credentials) from the decrypted data packet is read by routing system 4522, and authenticated by an authentication server 4530. Upon successful authentication, routing system 4522 retrieves the data corresponding to the request generated by remote access client 4502, along with a new encryption key, encryption key B, referred to as a response encryption key 4506, back to end user application 4502 via a response server 4512. In some embodiments, the data corresponding to the request generated by remote access client 4502 may include an html directory. Data from routing system 4522 is transmitted to response server 4512 via a firebreak 4516 (depicted as a data diode in FIG. 45). End user application 4502 receives the data, retrieves encryption key B, and uses encryption key B as the request encryption key 4508 in the next communication cycle (transaction) with routing system 4522. During this communication cycle, routing system 4522 generates a new encryption key, encryption key C, and sends it back to end user application 4502 as response encryption key 4506. In this way, encryption keys are refreshed (rotated) at every transaction as depicted by a symbol 4510, with a new set of keys being generated for each new transaction.

As depicted in FIG. 45, the combination of firebreak 4516 and firebreak 4518 may be implemented using a parallel port, as shown by a firebreak—parallel port block 4520. The functionality of firebreak—parallel port block 4520 is similar to the description of the parallel port implementation of the firebreak as discussed in the description of FIG. 44.

Remote data access system 4500 also has built-in compensation for data corruption. If, for whatever reason, end user application 4502 does not receive encryption key B and the associated return data packet, it can retry its request with encryption key A. Routing system 4522, unable to decrypt the data with encryption key B, can then revert to encryption key A to see if data corruption prevented end user application 4502 from successfully receiving encryption key B. If this decryption is successful, then routing system 4522 assumes that end user application 4502 did not receive encryption key B, and resumes the transaction from there. On the other hand, if routing system 4522 repeatedly receives encryption key A over a certain repetition threshold, a warning flag may be raised with regards to the possibility of a replay attack being attempted. Routing system 4522 may then terminate all connections with the requestor and log the incident in the appropriate files. If the requestor is in fact a genuine user of the system, then the key re-initialization and resynchronization processes may be repeated (via SMS-based methods, for example, as discussed above) to continue any associated transaction requests. The communication cycle associated with remote data access system 4500 can be summarized as:

End user application 4502→Request Server 4514→Firebreak 4518→Routing system 4522→Firebreak 4516→Response Server 4512→End user application 4502

It is important to note that due to the private nature of the routing system protocol, even if an attacker gains access to data packets via eavesdropping, s/he will not be able to use the data since data decryption will be impossible. The routing system thus provides secure data access to the records in the secure database after appropriately authenticating a client (requestor) via authentication server 4530. Routing system 4522 may be managed by a walk-up administrator, via walk-up admin block 4528. In other words, any upgrades or maintenance to routing system 4522 are performed by an administrator who has physical access to the system. Maintaining routing system 4522 using physical access is much safer security-wise as compared to methods such as over-the-air software updates, since any data transmitted over the public network as done by the latter method increases the risk of interception and sensitive data falling into the wrong hands. Physical access, on the other hand, allows routing system 4522 to be disconnected from the public network before any maintenance is performed, thereby greatly increasing system security.

Routing system 4522, database 4526, walk-up admin block 4528, and authentication server 4530 are all included in secure region 4524. Secure region 4524 also includes an encryption access mapping block 4532. Encryption access mapping block 4532 is configured to keep track of encryption keys; specifically, encryption access mapping block 4532 can be configured to be synchronized with the encryption key set that is refreshed at every transaction. Encryption access mapping block 4532 may also be associated with user access control definitions, where different users may be granted different access privileges to database 4526 based on user account settings, for example.

Figure 46:
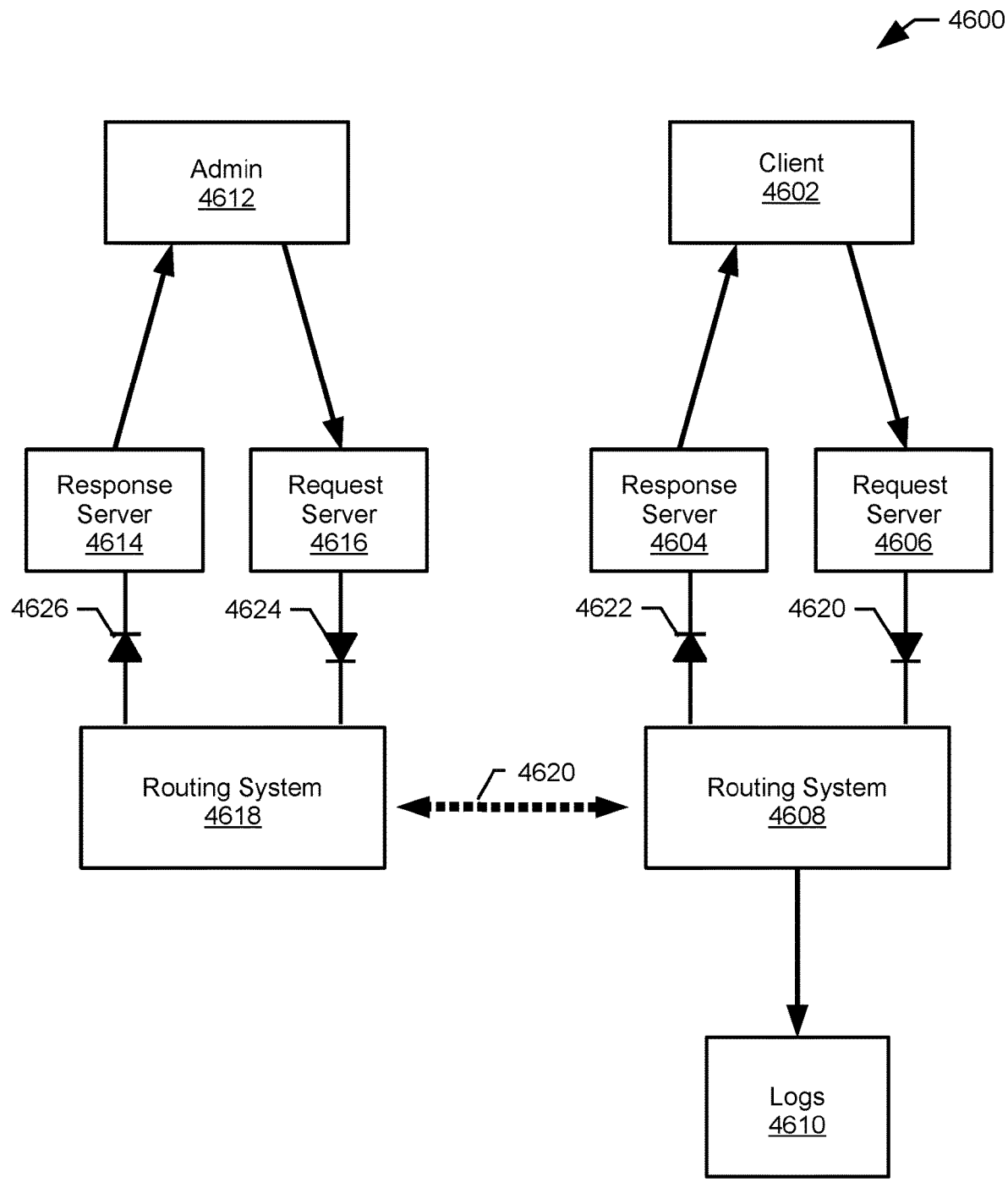
FIG. 46 is a block diagram depicting an embodiment of the architectural representation of a scheme that allows management of the routing system.

FIG. 46 is a block diagram depicting an embodiment of the architectural representation of a scheme 4600 that allows management of the routing system. In some embodiments, a routing system 4608 is associated with processing and fulfilling valid database access requests from a client 4602 (also referred to as an end user). Requests from client 4602 are routed to a request server 4606, and then transmitted to routing system 4608 via a firebreak 4620. Routing system 4608 communicates back to client 4602 by sending responses to a response server 4604 via a firebreak 4622. The operation of this system is similar to that of the systems described above.

Also shown in FIG. 46 is a routing system 4618. Routing system 4618 is configured to receive commands or instructions (rather than requests) from an administrator, represented by an admin block 4612. Commands or instructions are sent from admin block 4612 to a request server 4616, and then to routing system 4618 via a firebreak 4624. Routing system 4618 communicates back to a response server 4614 via a firebreak 4626, and response server 4614 relays information from routing system 4618 to admin block 4612. Routing system 4618 and routing system 4608 communicate via a bidirectional communications channel 4620. Bidirectional communications channel 4620 may be implemented, for example, using a parallel port connection or a Wi-Fi link so long as that connection is confined to the secure area and does not allow a route out to the public network (which would compromise the security of the system).

Routing system 4618 is managed by an authorized administrator via admin block 4612, and contains commands from authorized personnel. Using routing system 4618, an administrator can change the lookup tables associated with routing system 4608. Thus, routing system 4608 can be updated with new lookup tables and rules, enhanced security features, and so on. Depending on security requirements, routing system 4608 can be updated periodically or when the need arises. Furthermore, routing system 4608 is configured to create, maintain and update log files, as indicated by a logs block 4610. These log files include not only routine transactional information and the operational status history of routing system 4608, but may also include machine learning algorithms to detect and identify any unauthorized hacking events or attack attempts. These log files are accessible to the administrator via routing system 4618, and can be analyzed to update the security rules enforced by routing system 4608, for example. The log files thus generated by routing system 4608 are important sources of information for the administrator to update the lookup tables and security rules associated with routing system 4608 to keep ahead of and to deter any nefarious activity.

Figure 47:
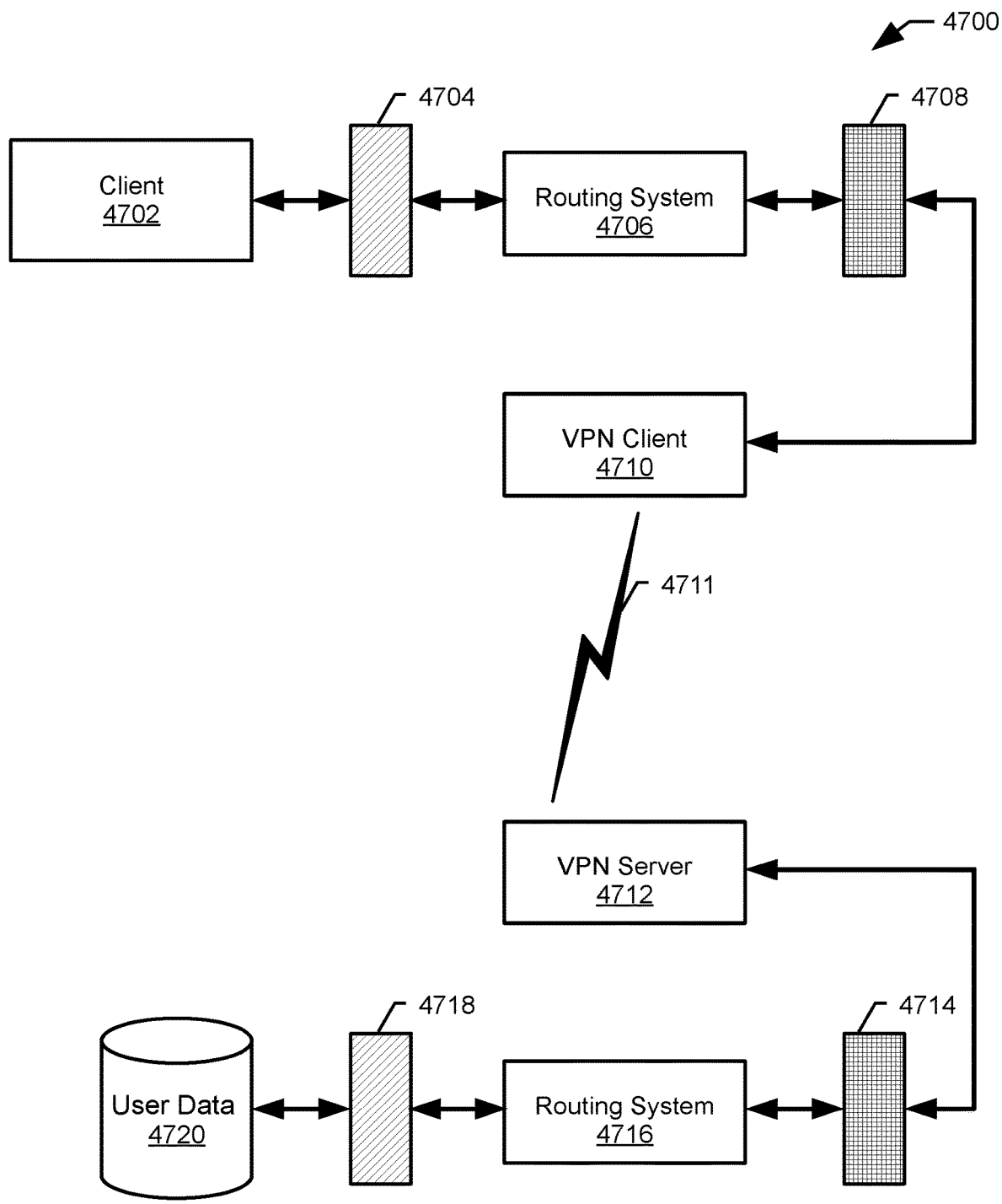
FIG. 47 is a block diagram depicting a first embodiment of a VPN-based client-server system implemented using the routing system.

FIG. 47 is a block diagram depicting a first embodiment of a VPN-based client-server system 4700 implemented using the routing system. In some embodiments, a routing system 4716 is interfaced with a user data database 4720 via a firewall 4718. Routing system 4716 is also interfaced with a VPN server 4712 via a firebreak 4714 (in this embodiment, firebreak 4714 comprises two isolated (uncoupled) unidirectional data channels carrying data in opposite directions). On the client side, a client 4702 is interfaced with a routing system 4706 via a firewall 4704, while routing system 4706 is interfaced with a VPN client 4710 via a firebreak 4708, where the structure of firebreak 4708 is similar to the structure of firebreak 4714.

In some embodiments, client 4702 generates a request to access data from user data database 4720. Routing system 4706 receives this request via firewall 4704 and forwards this request to VPN client 4710 via firebreak 4708. The message structure constructed by the client side is such that the Base 64 protocol associated with the routing system is encapsulated within the VPN protocol. VPN client 4710 transmits this composite message via a VPN link 4711 to VPN server 4712. VPN server 4712 receives this composite message, strips off the VPN data, and forwards the Base 64 message to routing system 4716 via firebreak 4714. Routing system 4716 decodes the Base 64 message, performs the necessary authentication, and accesses the requested data from user data database 4720 via firewall 4718. Routing system 4716 encodes the requested data in Base 64 format and sends the encoded message to VPN server 4712 via firebreak 4714. VPN server 4712 adds an additional VPN layer to the message and transmits this message via VPN link 4711 to VPN client 4710. VPN client 4710 strips off the VPN data and forwards the Base 64 message to routing system 4706 via firebreak 4708. Routing system 4706 decodes the Base 64 message, extracts the requested user data, and transmits this data to client 4702 via firewall 4704.

Figure 48:
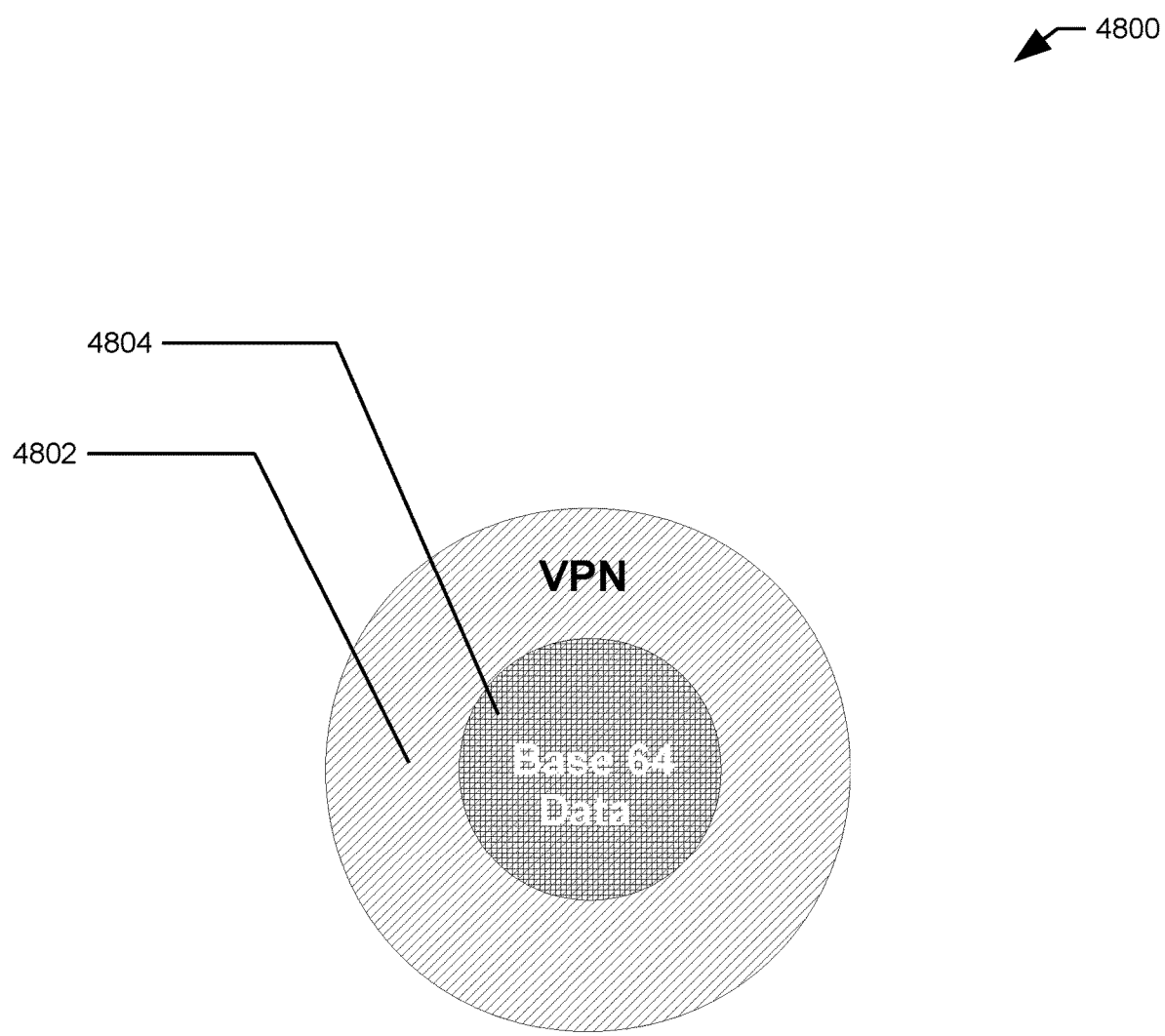
FIG. 48 is a schematic depicting a data structure showing an embodiment of a Base 64 protocol as implemented on the routing system encapsulated within a VPN protocol.

FIG. 48 is a schematic depicting a data structure 4800 showing an embodiment of a Base 64 protocol as implemented on the routing system encapsulated within a VPN protocol. As discussed in the description of FIG. 47, data structure 4800 is a composite structure, where the Base 64 data associated with the routing system is a kernel 4804 of the data structure 4800, with the kernel 4804 being encapsulated within a VPN data layer 4802.

Figure 49:
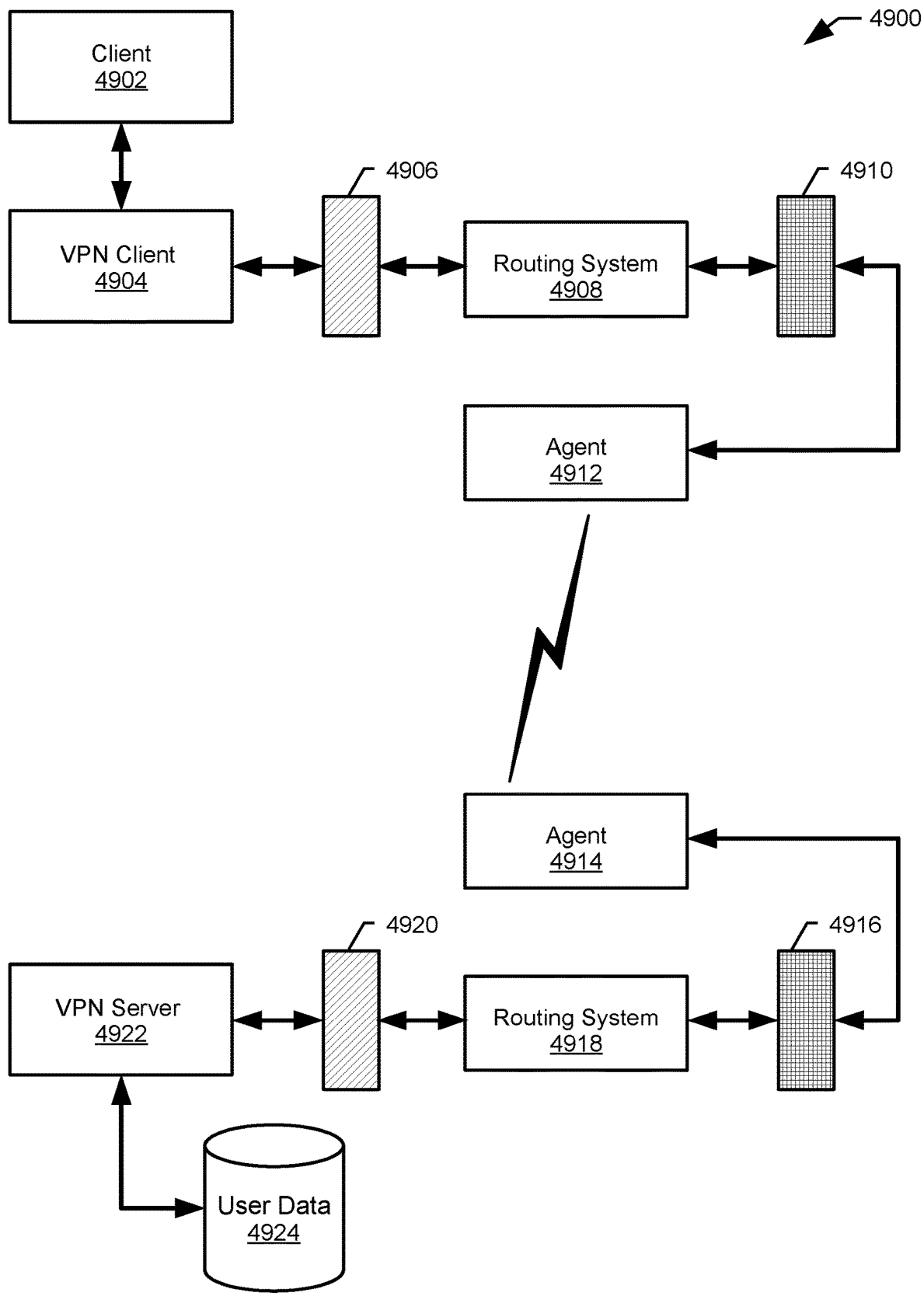
FIG. 49 is a block diagram depicting a second embodiment of a VPN-based client-server system implemented using the routing system.

FIG. 49 is a block diagram depicting a second embodiment of a VPN-based client-server system 4900 implemented using the routing system. In some embodiments, a VPN server 4922 is interfaced with a user data database 4924. VPN server 4922 is also interfaced with a routing system 4918 via a firewall 4920. Routing system 4918 is also interfaced with an agent block 4914 via a firebreak 4916 (in this embodiment, firebreak 4916 comprises two isolated unidirectional data channels carrying data in opposite directions). In some embodiments, agent block 4914 is similar to routing system bank 4104. On the client side, a client 4902 is interfaced with a VPN client 4904. VPN client 4904 is interfaced with a routing system 4908 via a firewall 4906. Routing system 4908 is also interfaced with an agent block 4912 via a firebreak 4910 (in this embodiment, firebreak 4910 comprises two isolated unidirectional channels carrying data in opposite directions). In some embodiments, agent block 4912 is similar to routing system bank 4104.

In some embodiments, client 4902 requests access to user data database 4924. Client 4902 generates a request which is converted into VPN format by VPN client 4904. VPN client 4904 transmits the request in VPN format to routing system 4908 via firewall 4906. Routing system 4908 encapsulates the request in VPN format within a Base 64 protocol layer and sends this encapsulated request to agent 4912 via firebreak 4910. Agent 4912 transmits this encapsulated request to agent 4914. Agent 4914 receives the encapsulated request and transmits this request to routing system 4918 via firebreak 4916. Routing system 4918 strips off the Base 64 data and performs any necessary authentication to retrieve the encapsulated data in VPN format. The retrieved data in VPN format is transmitted to VPN server 4922 via firewall 4920. VPN server decodes the data and performs the actions associated with the request generated by client 4902, by accessing user data database 4924 (for example, fulfilling a data file request). The data retrieved from user data database 4924 is encoded in VPN format by VPN server 4922, and is then transmitted by VPN server 4922 to routing system 4918 via firewall 4920. Routing system 4918 encapsulates the data in VPN format within a Base 64 protocol layer and transmits this encapsulated data packet to agent 4914 via firebreak 4916. Agent 4914 transmits the encapsulated data packet to agent 4912, where agent 4912 transmits this encapsulated data packet to routing system 4908 via firebreak 4910. Routing system 4908 strips off the Base 64 layer, and transmits the enclosed VPN data to VPN client 4904 via firewall 4906. VPN client 4904 decodes the VPN data to get the requested data packet, which is then forwarded to client 4902.

The system architectures described above in FIGS. 47 and 49 are examples that can be used for the implementation of a secure remote database access system for medical records. For example, the requestor (client) may be a healthcare provider in the field with access to a mobile device. Point-of-care medical service may require the records for a particular patient to be remotely, yet securely, accessed in real-time. The routing system-based architectures described above are ideal for such applications. The point-of-care medical service provider can remotely retrieve patient records for reference in a highly secure manner. The records can be updated if necessary and then saved back to the secure database. Such timely access to patient medical records can be critical to the delivery healthcare services, and the routing system allows such architectures to be realized while providing extremely robust security.

Figure 50:
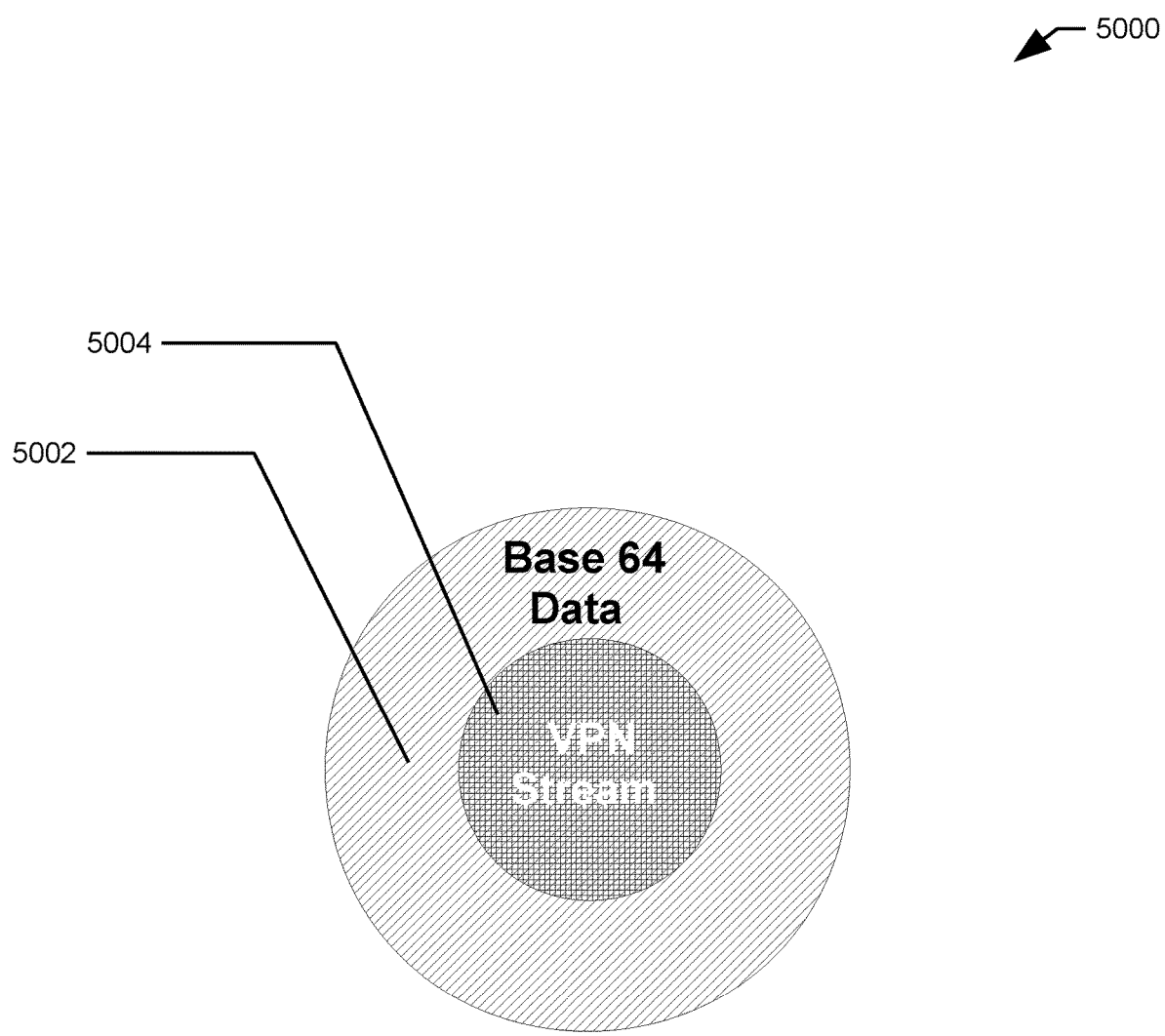
FIG. 50 is a schematic depicting a data structure showing an embodiment of a VPN protocol encapsulated within a Base 64 protocol as implemented on the routing system.

FIG. 50 is a schematic depicting a data structure 5000 showing an embodiment of a VPN protocol encapsulated within a Base 64 protocol as implemented on the routing system. As discussed in the description of FIG. 48, data structure 5000 is a composite structure, where the VPN data associated with the routing system is a kernel 5004 of the data structure 5000, with the kernel 5004 being encapsulated within a Base 64 protocol layer 5002.

Figure 51:
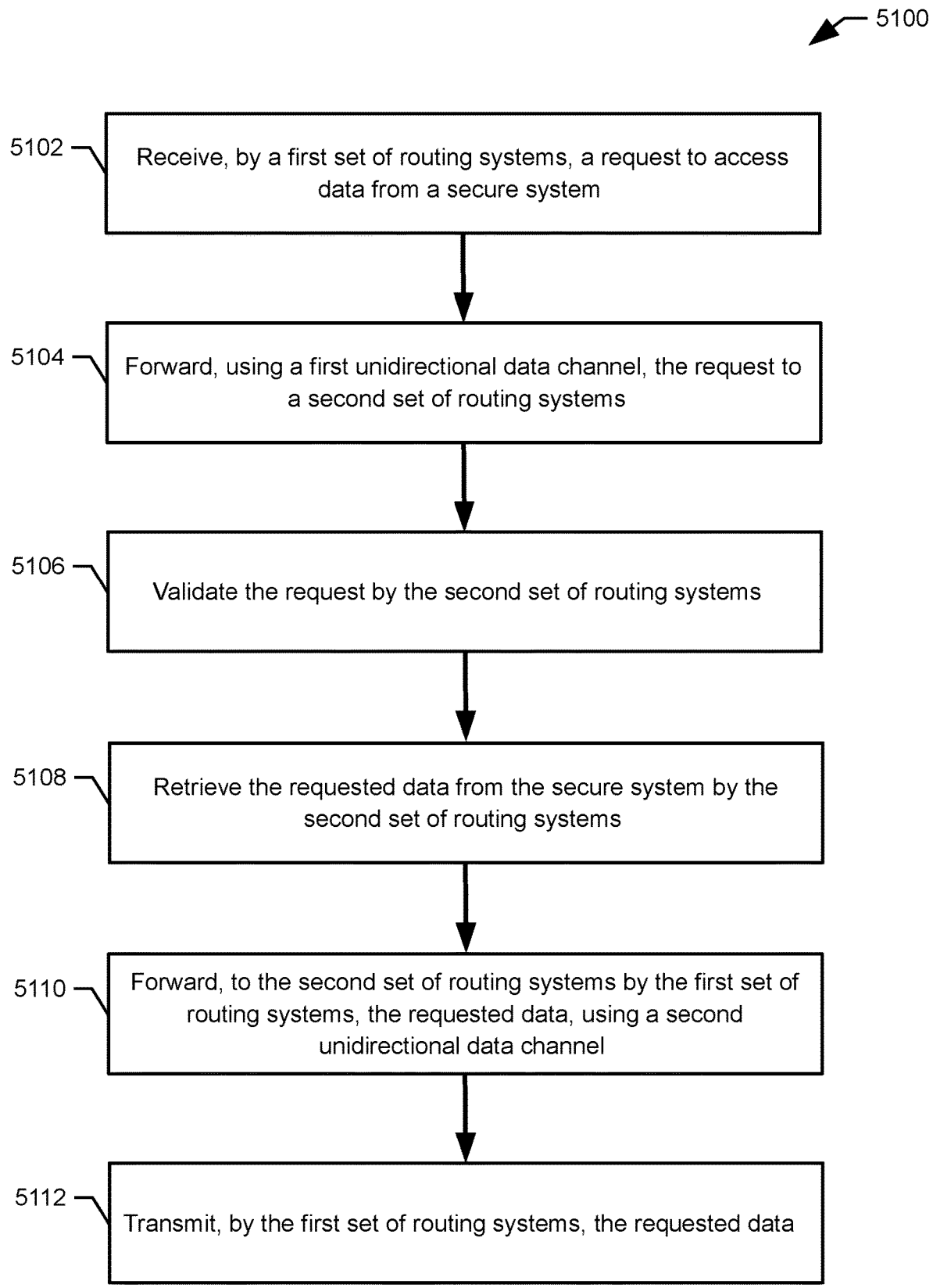
FIG. 51 is a flow diagram depicting an embodiment of a method associated with fulfilling, by a set of routing systems, a request to access data from a secure system.

FIG. 51 is a flow diagram depicting an embodiment of a method 5100 associated with fulfilling, by a set of routing systems, a request to access data from a secure system. At 5102, a first set of routing systems receives a request to access data from a secure system. In some embodiments, the request may be generated by a client such as client 4102, while the first set of routing systems may be similar to routing system bank 4104. The secure system may be similar to secure network 4118. Next, at 5104, the first set of routing systems forwards the request to a second set of routing systems using a first unidirectional data channel. In some embodiments, the second set of routing systems may be realized by a routing system such as routing system 4114. In other embodiments, the second set of routing systems may be realized using multiple routing systems. The first unidirectional data channel corresponds to a firebreak such as firebreak 4412; the associated data diode analogy applies to the first unidirectional data channel as well.

At 5106, the second set of routing systems validates the request by performing, for example, authentication functions. The request may be encoded in a Base 64 format as discussed earlier, and the second set of routing systems may have a corresponding Base 64 decoding table that it can use to decode the request. Assuming that the request is a valid request and that the request has passed all security checks (conditions for handling invalid requests are discussed subsequently), the second set of routing systems, at 5108, retrieves the requested data from the secure system. Next, at 5110, the second set of routing systems forwards the requested data to the first set of routing systems using a second unidirectional data channel. In some embodiments, the second set of routing systems may encode the data using, for example, a Base 64 format as described earlier, before forwarding the requested data to the first set of routing systems. In other embodiments, the second unidirectional data channel corresponds to a firebreak such as firebreak 4410; the associated data diode analogy applies to the second unidirectional data channel as well. At 5112, the first set of routing systems transmits the requested data to the requestor, for example client 4102.

Figure 52:
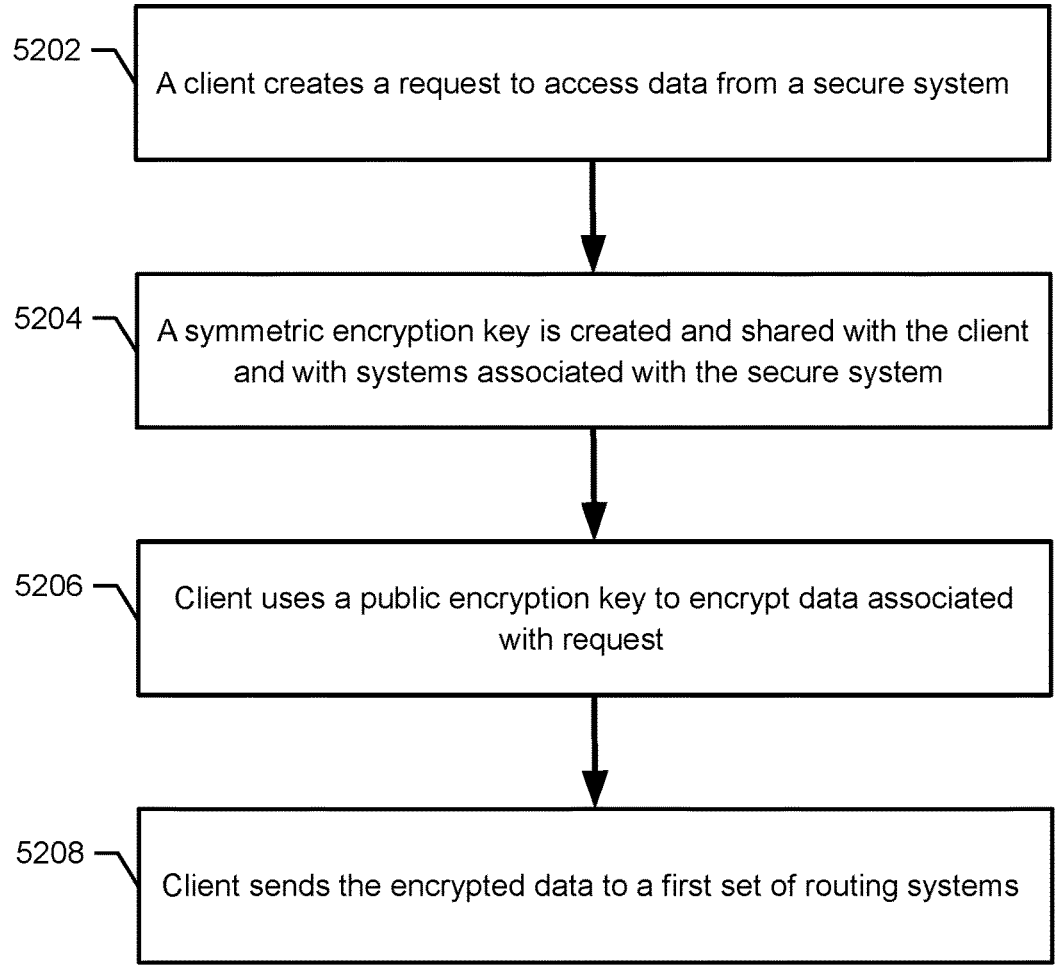
FIG. 52 is a flow diagram depicting an embodiment of a method associated with generating a client request to access data from a secure system.

FIG. 52 is a flow diagram depicting an embodiment of a method 5200 associated with generating a client request to access data from a secure system. Method 5200 provides details of how a client such as client 4102 generates a request to access data from, for example, secure network 4118. In some embodiments, the request may be a request to access a patient medical record in a secure database. At 5202, a client creates a request to access data from a secure system such as secure network 4118. At 5204, a symmetric encryption key is created. In some embodiments, the symmetric encryption key is created by the client. In other embodiments, if data is being passed between two routing systems associated with the overall system architecture, then the symmetric encryption key may be generated by one of the routing systems. This symmetric encryption key is shared with both the client and the systems associated with the secure system using, for example, an SMS message. Next, at 5206 the client uses the symmetric encryption key to encrypt the data associated with the request. In some embodiments, the data associated with the request may include not only the request, but may also include data such as authentication information (user name, passwords and so on). Finally, at 5208, the client sends the encrypted data to a first set of routing systems such as routing system bank 4104.

Figure 53A:
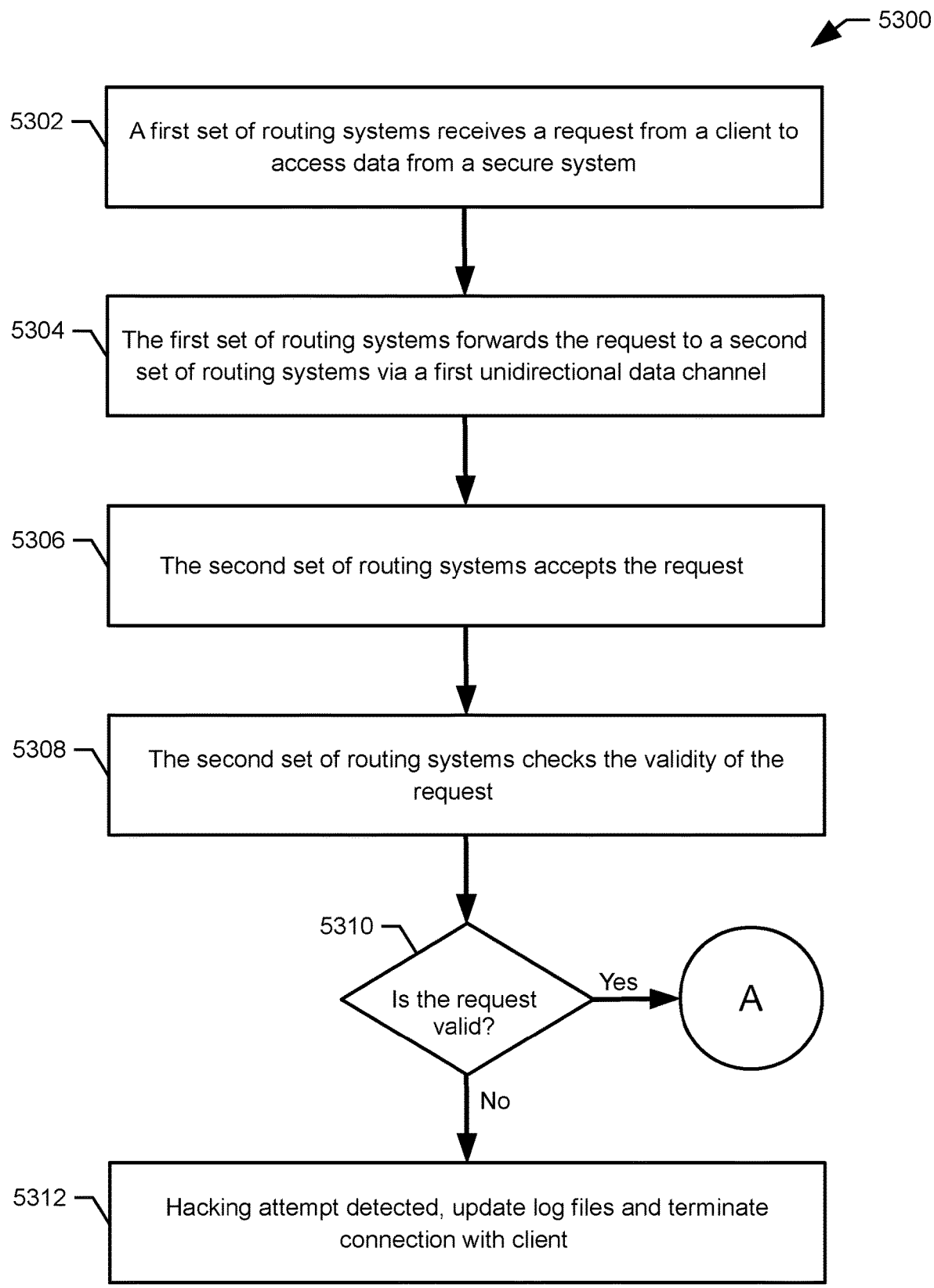
FIGS. 53A-53C are flow diagrams depicting an embodiment of a method describing the routing system operations associated with fulfilling a client request.

FIG. 53A is a flow diagram depicting an embodiment of a method 5300 describing the routing system operations associated with fulfilling a client request (for example, a client request generated by method 5200). Initially, at 5302, a first set of routing systems receives a request from a client to access data from a secure system. In some embodiments, the client may be similar to client 4102. In other embodiments, the first set of routing systems may be similar to routing system bank 4104, while secure system may be similar to secure network 4118. At 5304, the first set of routing systems forwards the request to a second set of routing systems via a first unidirectional data channel. In some embodiments, the second set of routing systems may be realized by a routing system such as routing system 4114. In other embodiments, the second set of routing systems may be realized using multiple routing systems. The first unidirectional data channel corresponds to a firebreak such as firebreak 4412; the associated data diode analogy applies to the first unidirectional data channel as well. At 5306, the second set of routing systems accepts the request, and at 5038 the second set of routing systems checks the validity of the request. In some embodiments, step 5308 may include the second set of routing systems performing functions such as decrypting the encrypted data received from the client using appropriate decryption keys (for example, a public/private key set corresponding to the symmetric encryption key as discussed in the description of FIG. 52). The second set of routing systems may also decode the request that might be encoded in a Base 64 protocol as described earlier. In other embodiments, step 5308 may also include user authentication, for example verifying user credentials such as the user name and the corresponding password.

At 5310, the method checks to see if the request is valid. In other words, the method checks to see if the user request has passed the validation checks described above. If validation checks have failed, the method determines that the request is not valid, and the method proceeds to 5312, where a possible hacking attempt is detected. In this case, the system updates the log files such as the files associated with logs block 4610, and terminates the connection with the client. On the other hand, if the request passes all validation checks, the method proceeds to A, with a continued description in the next figure.

Figure 53B:
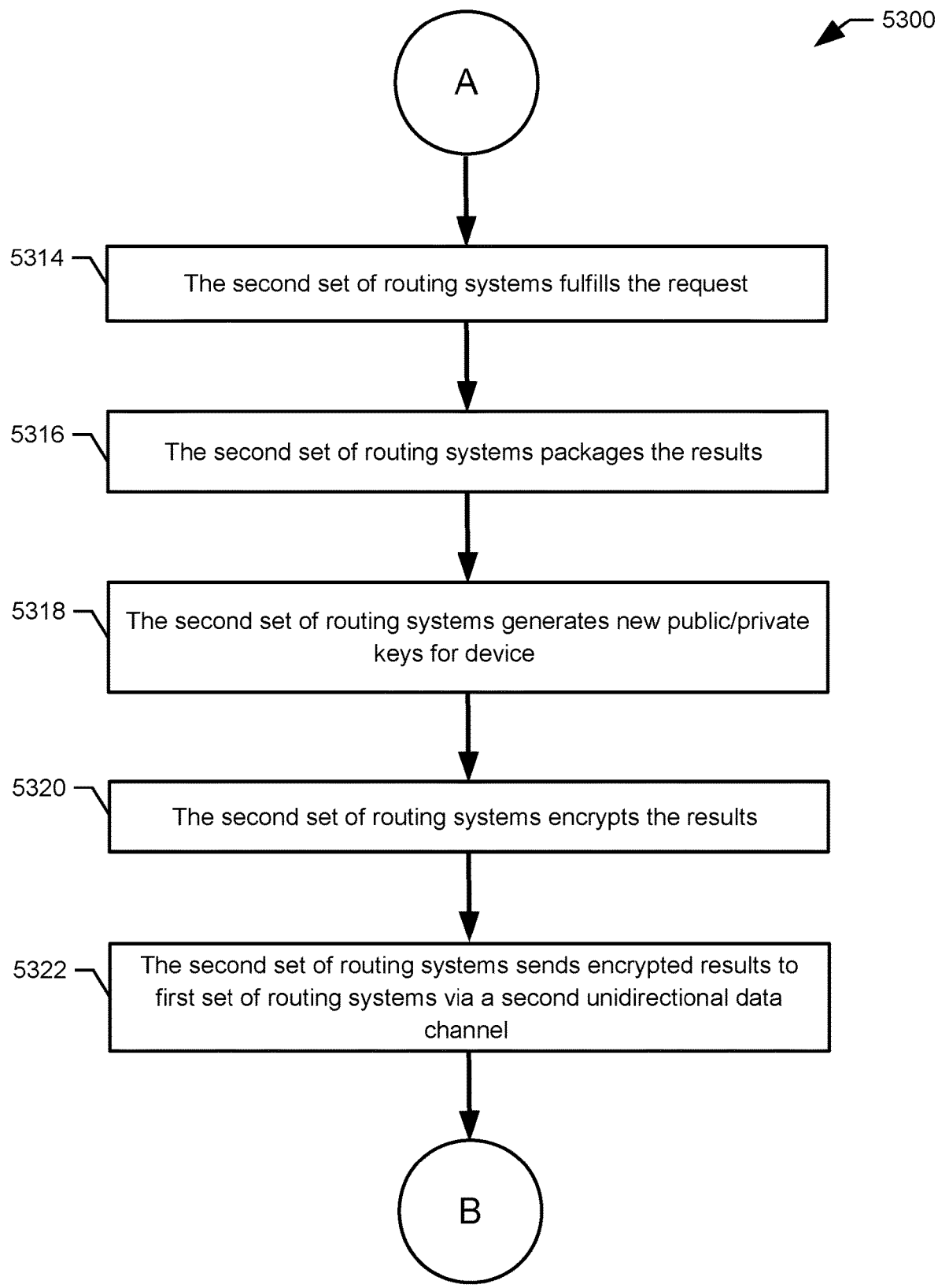

FIG. 53B is a continuation from FIG. 53A, depicting the method 5300 describing the routing system operations associated with fulfilling a client request. Starting at A, the method goes to 5314, where the second set of routing systems fulfills the request. In some embodiments, request fulfillment may include retrieving one or more files as requested by the client. Next, at 5316, the second set of routing systems packages the results, where the results may include data associated with the request. In some embodiments, process of packaging the results may include appropriately formatting the data, and also possibly encoding the data in Base 64 format. At 5318, the method generates a new set of public and private encryption keys for the associated device, where the associated device corresponds to the computing device associated with the client (requestor). Next, at 5320, the second set of routing systems encrypts the data using the new set of encryption keys, and at 5322 the second set of routing systems sends the encrypted data to the first set of routing systems via a second unidirectional data channel. In some embodiments, the second unidirectional data channel corresponds to a firebreak such as firebreak 4410; the associated data diode analogy applies to the second unidirectional data channel as well. The method then proceeds to B, with a continued description in the next figure.

Figure 53C:
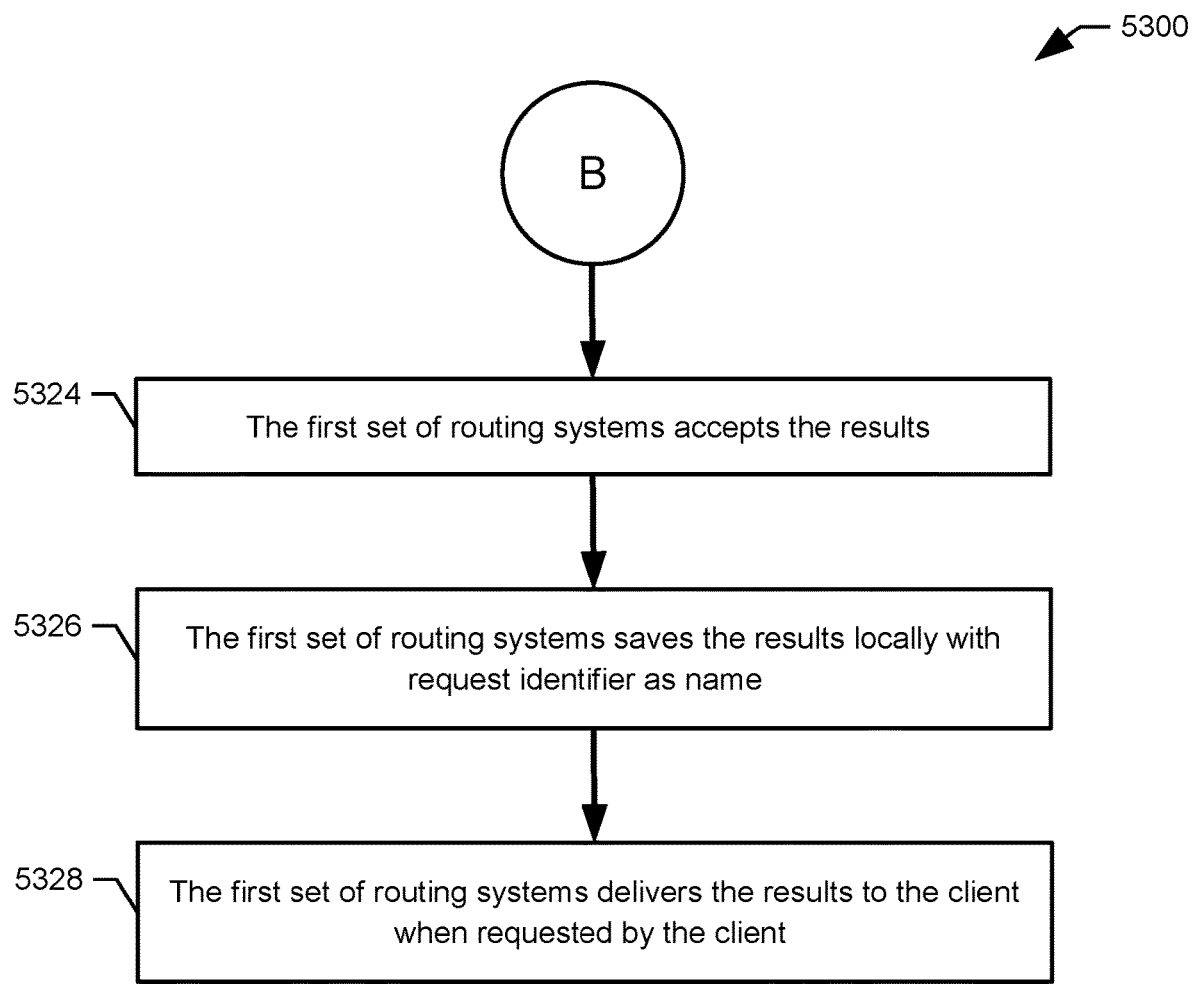

FIG. 53C is a continuation from FIG. 53B, depicting the method 5300 describing the routing system operations associated with fulfilling a client request. At 5324, the first set of routing systems accepts the encrypted data from the second set of routing systems. Next, at 5326, the first set of routing systems saves the results (encrypted data) locally with the request identifier as the name, where the request identifier corresponds to a unique identifier corresponding to this specific client request. Using a request identifier in this way allows the first set of routing systems to distinguish between multiple clients in the case of multiple client access. Finally, at 5328, the first set of routing systems delivers the results to the client when requested by the client. The client device is configured to appropriately decrypt the data using the decryption keys, while also using the Base 64 protocol format to decode the associated data.

Figure 54:
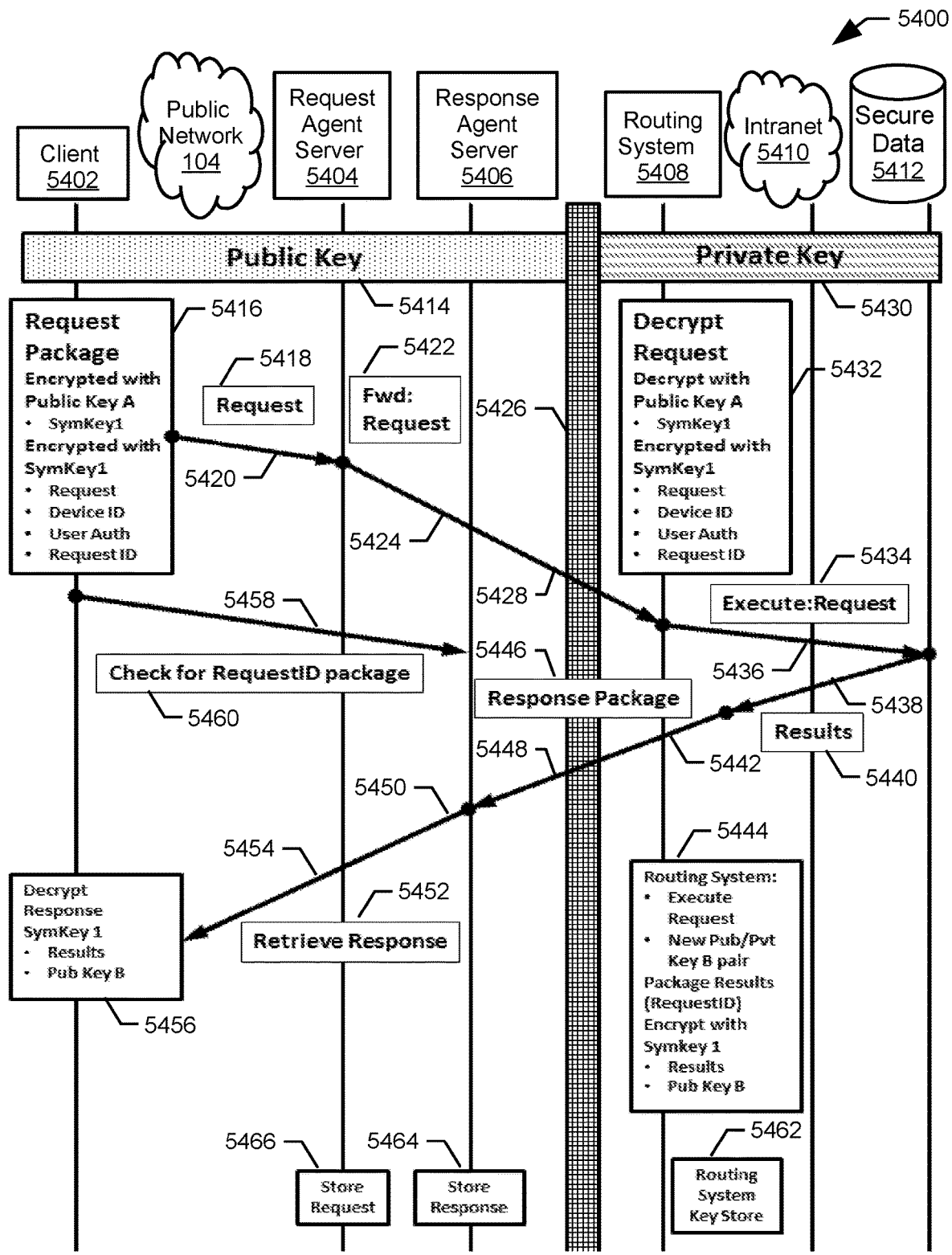
FIG. 54 depicts an embodiment of an information flow associated with a data request transaction fulfilled using a routing system architecture.

FIG. 54 depicts an embodiment of an information flow 5400 associated with a data request transaction fulfilled using a routing system architecture. Information flow 5400 provides a detailed illustration of the sequence of events associated with the flow diagrams described above. In some embodiments, a client 5402 constructs a request package 5416 corresponding to a client request. Client 5402 has access to a public encryption key—a public key 5414, referred to in FIG. 54 as Public Key A for an initial transaction. Public Key A is an encryption key associated with a secure data database 5412; the request package 5416 is associated with client 5402 requesting access to secure database 5412. Public Key A is shared with client 5402 as a part of an initialization process which could be via a phone conversation or via an SMS message as discussed earlier. As a part of request package 5416, client 5402 encrypts a symmetric encryption key, Symmetric Key 1, using Public Key A. Symmetric Key 1 is shared with a routing system 5408 as a part of request package 5416. Symmetric Key 1 is also used to encrypt the remainder of the request package 5416, which includes the request, associated user authentication data (including username, password and other relevant authentication information), and a request ID. The request ID is used as a unique identifier associated with this request. Request package 5416 is then transmitted 5420 as a request 5418 via a public network 104 such as the Internet as a request to a request agent server 5404 associated with secure data database 5412. In some embodiments, request agent server 5404 is similar in functionality to request server 4408 as described above. Request agent server 5404 is interfaced with firebreak 5426. The function of request agent server 5404 is to forward request 5418 as shown by a Fwd: Request block 5422, along a path 5424 to firebreak 5426, and across firebreak 5426 (along a path 5428) where the request is received by routing system 5408. Alternatively, request agent server 5404 may also store request 5418 as depicted by a store request block 5466 if routing system 5408 is busy servicing other requests, until routing system 5408 is free to accept the stored request.

Upon receipt of the encrypted request, routing system 5408 uses a private key 5430, referred to as Private Key A for the initial transaction, to decrypt and recover Symmetric Key 1. (Private Key A is the private key corresponding to Public Key A.) Symmetric Key 1 is then used to retrieve the remainder of the request package—the request, the device ID, the user authentication data and the request ID. This two-step decryption process is shown by a schematic 5432. If all authentication checks are cleared, routing system 5408 executes the request as depicted by an execute: request block 5434 by accessing secure data database 5412 along a path 5436 via an intranet 5410. In some embodiments, path 5436 might be through a firewall associated with intranet 5410. The execution of the request could be, for example, a retrieval 5438 of a specific data record, denoted by a results schematic 5440. Results as denoted by results schematic 5440 from the execution of the request or transaction are then prepared to be transmitted back to client 5402. The request ID is also included as a part of the data package. Routing system uses a routing system key store 5462 (possibly a key repository) to generate (or retrieve) a new public/private key pair, denoted by Public Key B and Private Key B respectively. Routing system 5408 encrypts the Public Key B along with the transaction results using Symmetric Key 1 to form a return data package, also referred to as a response package 5446. The steps taken to encrypt response package 5446 as discussed above are denoted by a schematic 5444. Response package 5446 is transmitted back along path 5442, across firebreak 5426 along path 5448, to a response agent server 5406. In some embodiments, response agent server 5406 may be similar to response server 4406. Response agent server 5406 stores response package 5446 upon receipt (denoted by a store response block 5464) until response agent server 5406 is queried by client 5402 along path 5458 with the corresponding request ID. If the request ID matches, response agent server 5406 retrieves response package 5446 from store response block 5464, as denoted by a retrieve response block 5452. Response agent server 5406 then transmits response package 5446 to client 5402. Alternatively, response agent server 5406 can periodically check for a request ID package from client 5402, denoted by a check for requestID block 5460. Client 5402 receives response package 5446 via a path 5450 and a path 5454, decrypts the contents using Symmetric Key 1, and then stores Public Key B to be used for the next transaction as depicted by a schematic 5456. In this way, encryption keys are refreshed and cycled at every transaction. Client 5402 can now generate Symmetric Key 2 to prevent any replay attacks from occurring. An important feature of this key exchange method is that there are no sessions needed for system operation; each transaction is self-contained, with a single information exchange counting as an independent transaction. In this sense, the system is "memoryless," since each transaction does not rely on data from an earlier transaction as long as the encryption keys are successfully updated and refreshed.

Figure 55:
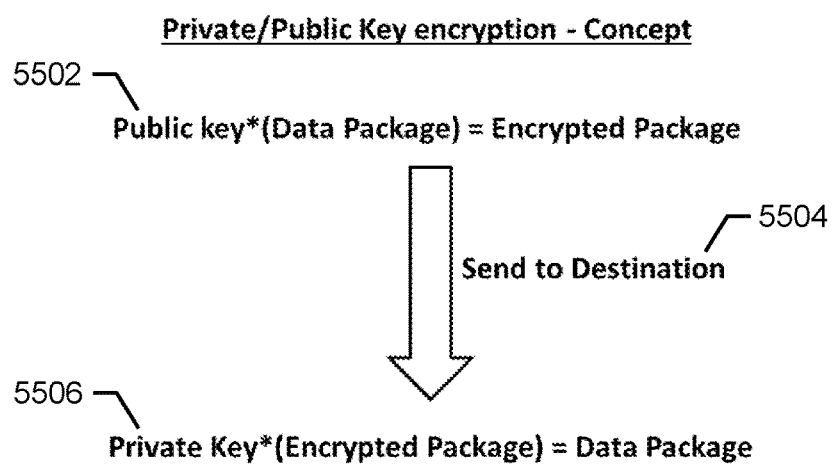
FIG. 55 depicts a concept of encryption and decryption processes using public and private keys.

FIG. 55 depicts a concept of encryption and decryption processes 5500 using public and private keys. The public key is used to encrypt the data package before transmission 5502, as:

Public Key*(Data Package)=Encrypted Package, where the encrypted package is created after the data package is acted on (encrypted) by the public key. The encrypted package is transmitted to the destination along a path 5504, where it is decrypted by the private key to retrieve the data package. This decryption process is represented by 5506:

Private Key*(Encrypted Package)=Data Package.

Figure 56:
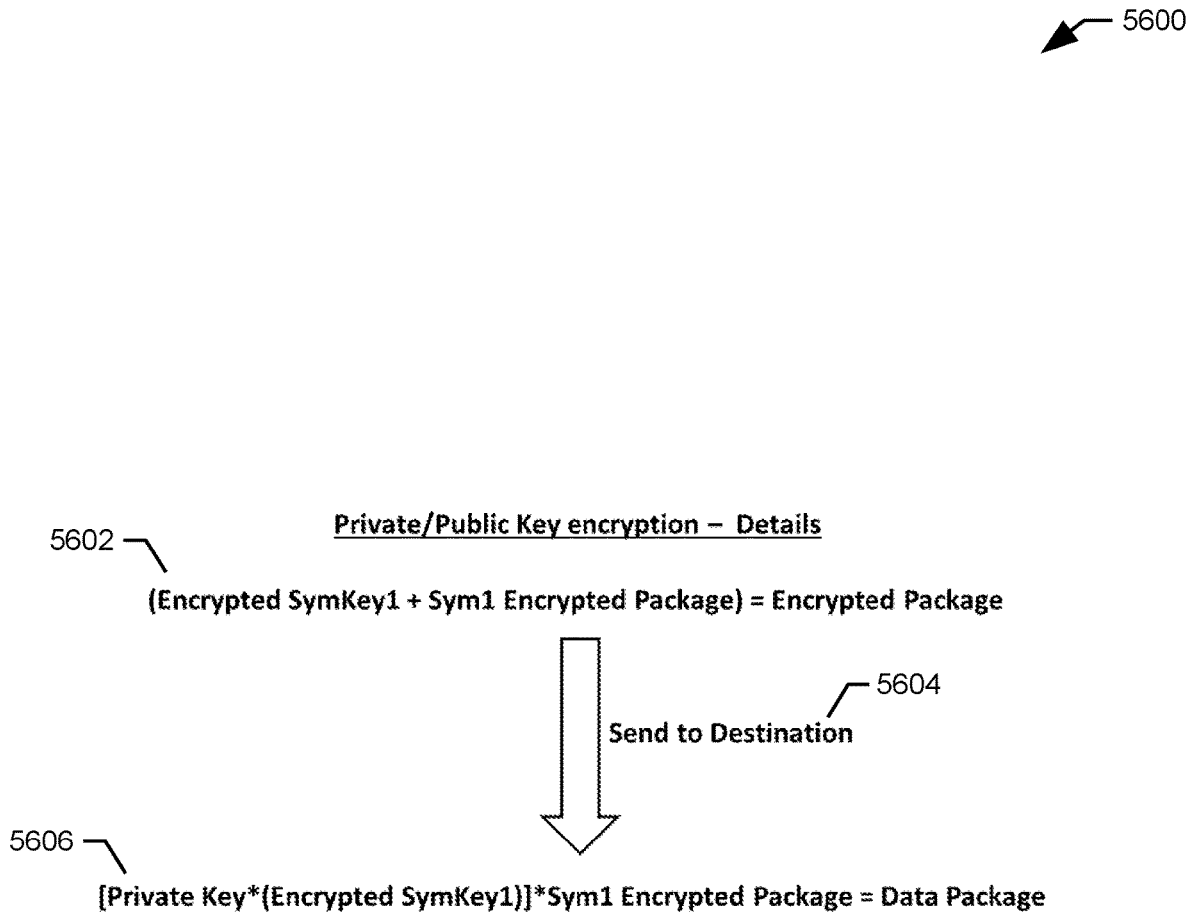
FIG. 56 depicts details of encryption and decryption processes using public and private keys.

FIG. 56 depicts details of encryption and decryption processes 5600 using public and private keys. In some embodiments symmetric key, say Symmetric Key 1, is shared a priori between a client (for example, client 5402) and the a routing system (for example, routing system 5408), and Symmetric Key 1 is used to encrypt the data package as discussed in the description of FIG. 54. Furthermore, a public key is used to encrypt the symmetric key. The combination of the encrypted symmetric key and the encrypted data package sent to the destination is given by 5602:

(Public Key*(Symmetric Key 1)+Symmetric Key 1*(Data Package)).

Here, (Public Key*(Symmetric Key 1)=Encrypted Sym-Key1, and

Symmetric Key 1*(Data Package))=Sym1 Encrypted Package.

The encrypted package is sent to the destination along a path 5604. At 5606, the recipient first retrieves the symmetric key as:

Private Key*(Public Key*(Symmetric Key 1))=Symmetric Key 1, and then uses the symmetric key to decrypt the encrypted package:

Symmetric Key 1*(Symmetric Key 1*(Data Package))=Data Package.

This process can also be written as:

[Private Key*(Encrypted SymKey1)]*Sym1 Encrypted Package=Data Package.

The public/private key pairs are changed (refreshed) at every transaction. In this way, using a combination of public/private keys and a symmetric key, information is kept private and secure.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
a first set of one or more routing systems interfaced with a network connection via a network interface, wherein the first set of one or more routing systems comprising at least one hardware processor;
a second set of one or more routing systems interfaced with a secure system, wherein the second set of one or more routing systems comprising at least one hardware processor;
the second set of routing systems receiving information from the first set of routing systems exclusively via a first unidirectional data channel that does not permit reverse data transmission;
the first set of routing systems receiving information from the second set of routing systems exclusively via a second unidirectional data channel that does not permit reverse data transmission; and
the first and second sets of routers wherein the first and second unidirectional data channels render the secure system not visible from the network interface.

2. The apparatus of claim 1, wherein the first unidirectional data channel and the second unidirectional data channel are uncoupled.

3. The apparatus of claim 1, wherein the first unidirectional data channel and the second unidirectional data channel are each implemented using a parallel port connection.

4. The apparatus of claim 1, wherein the first unidirectional data channel and the second unidirectional data channel are each implemented using a Wi-Fi connection.

5. The apparatus of claim 1, wherein data is encrypted using encryption keys.

6. The apparatus of claim 5, wherein a new set of encryption keys is used for each separate data transaction.

7. The apparatus of claim 1, wherein a remote client requests information from the secure system via the network interface.

8. The apparatus of claim 7, wherein the request is encrypted using one or more encryption keys.

9. The apparatus of claim 8, wherein the request is routed to the second set of routing systems via the first set of routing systems and via the first unidirectional data channel.

10. The apparatus of claim 9, wherein the second set of routing systems is configured to decrypt the encrypted request.

11. The apparatus of claim 8, wherein the requested information is encrypted by the second set of routing systems using one or more encryption keys.

12. The apparatus of claim 11, wherein the encrypted requested information is transmitted to the remote client from the second set of routing systems, via the second unidirectional data channel, by the first set of routing systems, to the remote client.

13. The apparatus of claim 12, wherein the remote client receives the encrypted requested information and decrypts the encrypted requested information.

14. An apparatus comprising:
one or more first routers connected to a public computer network via a network interface; and
one or more second routers connected to a secure computer system;
one or more first unidirectional data channels that do not permit reverse data transmission;
one or more second unidirectional data channels that do not permit reverse data transmission;
the one or more first routers receiving information from the one or more second routers exclusively via the one or more first unidirectional channels;
the one or more second routers receiving information from the one or more first routers exclusively via the one or more second unidirectional channels; and
the one or more first unidirectional channels and the one or more second unidirectional data channels rendering the secure computer system invisible to the network interface.

15. An apparatus comprising:
a first router connected to a public computer network via a network interface; and
a second router connected to a secure computer system;
a first unidirectional data channel that does not permit reverse data transmission;
a second unidirectional data channel that does not permit reverse data transmission;
the first router receiving information from the second router exclusively via the first unidirectional channel;
the second router receiving information from the first router exclusively via the second unidirectional channel; and the first unidirectional data channel and the second unidirectional data channel rendering the secure computer system invisible to the network interface.

16. The apparatus of claim 15, further comprising a remote client sending an encrypted request for information to the secure computer system via the network interface and the second unidirectional channel.

17. The apparatus of claim 16, wherein the remote client receives the information in an encrypted form from the secure computer system via the first unidirectional channel.

* * * * *